(12) United States Patent
Ohashi

(10) Patent No.: US 12,548,172 B2
(45) Date of Patent: Feb. 10, 2026

(54) MOTION DETERMINATION APPARATUS, LEARNING APPARATUS, MOTION DETERMINATION METHOD, LEARNING METHOD, AND PROGRAM

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 673 days.

(21) Appl. No.: 17/909,484

(22) PCT Filed: Mar. 30, 2020

(86) PCT No.: PCT/JP2020/014609
§ 371 (c)(1),
(2) Date: Sep. 6, 2022

(87) PCT Pub. No.: WO2021/199177
PCT Pub. Date: Oct. 7, 2021

(65) Prior Publication Data
US 2023/0112409 A1    Apr. 13, 2023

(51) Int. Cl.
*G06T 7/246* (2017.01)
*G06F 3/01* (2006.01)

(52) U.S. Cl.
CPC .............. *G06T 7/251* (2017.01); *G06F 3/012* (2013.01)

(58) Field of Classification Search
CPC ........... G06T 7/251; G06T 2207/30196; G06T 2207/30204; G06T 7/246; G06F 3/012; G06F 3/011; G06F 3/017; G01P 13/00
See application file for complete search history.

(56) References Cited

U.S. PATENT DOCUMENTS

2004/0119716 A1    6/2004  Park
2011/0009241 A1    1/2011  Lane et al.
(Continued)

FOREIGN PATENT DOCUMENTS

CN    110841275 A    2/2020
EP      3067783 A1   9/2016
(Continued)

OTHER PUBLICATIONS

International Search Report for corresponding PCT Application No. PCT/JP2020/014609, 4 pages, dated May 26, 2020.
(Continued)

*Primary Examiner* — Mekonen T Bekele
(74) *Attorney, Agent, or Firm* — Kilpatrick Townsend & Stockton LLP

(57) ABSTRACT

A motion determination apparatus, a learning apparatus, a motion determination method, a learning method, and a program capable of precisely representing motions of the overall body of a user without attaching trackers to the feet of the user are provided. A speed specification section specifies, on the basis of sensing data output from a tracker attached to a region of the upper body of a user, a direction of a speed of the region. An operative foot specification section specifies, on the basis of the specified direction of the speed, one of the left foot and the right foot of the user as an operative foot and specifies the other as an inoperative foot. A motion determination section determines, for each of the left foot and the right foot, a motion of the foot on the basis of whether the foot is the operative foot or the inoperative foot.

10 Claims, 30 Drawing Sheets

(56) References Cited

U.S. PATENT DOCUMENTS

2014/0378281 A1   12/2014  Mazi
2016/0081594 A1    3/2016  Gaddipati et al.
2016/0367853 A1* 12/2016  Hirohama .............. G06V 40/23
2019/0204909 A1    7/2019  Xiao

FOREIGN PATENT DOCUMENTS

JP      2002259984 A    9/2002
JP      2007319347 A  12/2007
JP      2011251013 A  12/2011
JP      2014211404 A  11/2014
JP      2019025134 A   2/2019

OTHER PUBLICATIONS

CN202080095931.8, "Office Action", Feb. 27, 2025, 20 pages.
CN202080095931.8, "Office Action", Nov. 4, 2025, 13 pages.

\* cited by examiner

MOTION DETERMINATION APPARATUS, LEARNING APPARATUS, MOTION DETERMINATION METHOD, LEARNING METHOD, AND PROGRAM

TECHNICAL FIELD

The present invention relates to a motion determination apparatus, a learning apparatus, a motion determination method, a learning method, and a program.

BACKGROUND ART

There is known a body tracking technology for estimating, on the basis of data indicating positions and directions of a plurality of trackers attached to a user, positions and directions of a plurality of regions that are included in the body of the user and that include regions to which the trackers are not attached by inverse kinematics (IK). Use of such a body tracking technology as just described makes it possible, for example, to display computer graphics in which motions of the whole body of the user in a real space are represented.

SUMMARY

Technical Problem

Currently, in order to make it possible to precisely represent motions of the whole body of a user, it is necessary for the user to attach trackers to the feet such that movements of the feet are tracked by the trackers. However, attachment of the trackers to the feet is cumbersome to the user.

The present invention has been made in the light of the subject described above, and one object of the present invention is to provide a motion determination apparatus, a learning apparatus, a motion determination method, a learning method, and a program capable of precisely representing motions of the overall body of a user without the necessity for the user to attach trackers to the feet.

Solution to Problem

To solve the problems, a motion determination apparatus according to the present invention includes a speed specification section that specifies, on the basis of sensing data output from a tracker attached to a region of an upper body of a user, a direction of a speed of the region, an operative foot specification section that specifies, on the basis of the specified direction of the speed, one of a left foot and a right foot of the user as an operative foot and specifies the other as an inoperative foot, and a motion determination section that determines, for each of the left foot and the right foot, a motion of the foot on the basis of whether the foot is the operative foot or the inoperative foot.

According to one aspect of the present invention, the motion determination section determines the motions of the left foot and the right foot such that a movement of the operative foot is greater than a movement of the inoperative foot.

Furthermore, according to one aspect of the present invention, in a case where the specified direction of the speed is a left foot direction of the user, the left foot of the user is specified as the operative foot, and in a case where the specified direction of the speed is a right foot direction of the user, the right foot of the user is specified as the operative foot.

Furthermore, according to one aspect of the present invention, the motion determination apparatus further includes an input data generation section that generates input data that includes region data indicating a height of a head of the user, a direction of the head of the user, a position of the head of the user with reference to a position of a left hand of the user, and a position of the head of the user with reference to a position of a right hand of the user and feature data indicating a feature of a time series transition of the region data, a feature extraction section that outputs new feature data in response to input of the input data, and an estimation section that estimates, on the basis of the feature data, a position of the left foot of the user with reference to the position of the head of the user and a position of the right foot of the user with reference to the position of the head of the user. The feature extraction section outputs, in response to input of the input data that includes the region data at a latest timing and the feature data indicating the feature of the time series transition of the region data, the feature data indicating the feature of the time series transition, of the region data, occurred until the latest timing, the estimation section estimates, on the basis of the feature data indicating the feature of the time series transition, of the region data, occurred until the latest timing, a position of the left foot of the user with reference to the position of the head of the user and a position of the right foot of the user with reference to the position of the head of the user at the latest timing, the operative foot and the inoperative foot are individually associated with coefficients different from each other, and the motion determination section determines, for each of the left foot and the right foot, a position of the foot at the latest timing on the basis of the position of the foot estimated by the estimation section at the latest timing and the coefficient associated with the foot.

According to this aspect, the motion determination section may determine a position obtained by interpolating the position of the foot estimated by the estimation section at the latest timing and the position of the foot determined by the motion determination section at a timing immediately preceding the latest timing as the position of the foot at the latest timing.

Moreover, the motion determination section may determine a position spaced away from the position of the operative foot determined at the immediately preceding timing by a distance obtained by multiplying a distance between the position of the operative foot estimated at the latest timing and the position of the operative foot determined at the immediately preceding timing by a first coefficient as the position of the operative foot, the motion determination section may determine a position spaced away from the position of the inoperative foot determined at the immediately preceding timing by a distance obtained by multiplying a distance between the position of the inoperative foot estimated at the latest timing and the position of the inoperative foot determined at the immediately preceding timing by a second coefficient as the position of the inoperative foot, and the first coefficient may be greater than the second coefficient.

Furthermore, the estimation section may estimate, on the basis of the feature data indicating a feature of the time series transition occurred until the latest timing, a position on a horizontal plane of the left foot of the user with reference to the position of the head of the user and a position on the horizontal plane of the right foot of the user with reference to the position of the head of the user at the latest timing, and the estimation section may estimate a position of the foot in a heightwise direction on the basis of a magnitude of the speed of the foot at a timing immediately preceding the latest timing.

Furthermore, in a case where a specified magnitude of the speed exceeds a predetermined threshold value and a specified direction of the speed is a left foot direction of the user, the left foot of the user may be specified as the operative foot, in a case where the specified magnitude of the speed exceeds the threshold value and the specified direction of the speed is a right foot direction of the user, the right foot of the user may be specified as the operative foot, and in a case where the specified magnitude of the speed is equal to or smaller than the threshold value and a distance between the position of the foot estimated immediately before by the estimation section and a position of the foot determined immediately before by the motion determination section on the basis of the position is equal to or smaller than a predetermined distance, one of the operative foot and the inoperative foot may be changed to the other, and the other may be changed to the one.

Furthermore, the motion determination apparatus further includes an input controlling section that controls whether or not the input data is to be input to the feature extraction section, in response to a specified magnitude of the speed. When control is performed such that the input data is not input to the feature extraction section, the motion determination section may determine a position of the foot at the latest timing on the basis of an estimation result obtained immediately before by the estimation section having been used already for determination of the position of the foot.

Furthermore, according to one aspect of the present invention, the motion determination section determines rotation of the foot at a horizontal axis that serves as a reference, on the basis of a distance from a line that extends in a vertical direction and serves as a reference to the position of the foot.

Furthermore, a learning apparatus according to the present invention includes an input data generation section that generates input data that includes region data that indicates a height of a head of a user, a direction of the head of the user, a position of the head of the user with reference to a position of a left hand of the user, and a position of the head of the user with reference to a position of a right hand of the user and feature data indicating a feature of a time series transition of the region data, a feature extraction section that outputs new feature data in response to input of the input data, an estimation section that estimates, on the basis of the feature data, a position of a left foot of the user with reference to the position of the head of the user and a position of a right foot of the user with reference to the position of the head of the user, and a learning section that learns at least one of the feature extraction section and the estimation section on the basis of a result of the estimation. The feature extraction section outputs, in response to input of the input data including the region data at a latest timing and the feature data indicating the feature of the time series transition of the region data, the feature data indicating the feature of the time series transition, of the region data, occurred until the latest timing, and the learning section executes the learning on the basis of results of estimation, by the estimation section, of the position of the left foot of the user with reference to the position of the head of the user and the position of the right foot of the user with reference to the position of the head of the user at the latest timing, the positions of the left foot and the right foot of the user being obtained on the basis of the feature data indicating the feature of the time series transition, of the region data, occurred until the latest timing.

Furthermore, a motion determination method according to the present invention includes a step of specifying, on the basis of sensing data output from a tracker attached to a region of an upper body of a user, a direction of a speed of the region, a step of specifying, on the basis of the specified direction of the speed, one of a left foot and a right foot of the user as an operative foot and specifying the other as an inoperative foot, and a step of determining, for each of the left foot and the right foot, a motion of the foot on the basis of whether the foot is the operative foot or the inoperative foot.

Furthermore, a learning method according to the present invention includes an input data generation step of generating input data that includes region data that indicates a height of a head of a user, a direction of the head of the user, a position of the head of the user with reference to a position of a left hand of the user, and a position of the head of the user with reference to a position of a right hand of the user and feature data indicating a feature of a time series transition of the region data, a feature extraction step, by a feature extraction section, of outputting the new feature data in response to input of the input data, an estimation step, by an estimation section, of estimating, on the basis of the feature data, a position of a left foot of the user with reference to the position of the head of the user and a position of a right foot of the user with reference to the position of the head of the user, and a learning step of learning at least one of the feature extraction section and the estimation section on the basis of a result of the estimation. The feature extraction step includes outputting, by the feature extraction section, in response to input of the input data including the region data at a latest timing and the feature data indicating the feature of the time series transition of the region data, the feature data indicating the feature of the time series transition, of the region data, occurred until the latest timing, and the learning step includes executing the learning on the basis of results of estimation, by the estimation section, of the position of the left foot of the user with reference to the position of the head of the user and the position of the right foot of the user with reference to the position of the head of the user at the latest timing, the positions of the left foot and the right foot of the user being obtained on the basis of the feature data indicating the feature of the time series transition, of the region data, occurred until the latest timing.

Furthermore, a program according to the present invention causes a computer to execute a procedure of specifying, on the basis of sensing data output from a tracker attached to a region of an upper body of a user, a direction of a speed of the region, a procedure of specifying, on the basis of the specified direction of the speed, one of a left foot and a right foot of the user as an operative foot and specifying the other as an inoperative foot, and a procedure of determining, for each of the left foot and the right foot, a motion of the foot on the basis of whether the foot is the operative foot or the inoperative foot.

Furthermore, another program according to the present invention causes a computer to execute an input data generation procedure of generating input data that includes region data that indicates a height of a head of a user, a direction of the head of the user, a position of the head of the user with reference to a position of a left hand of the user, and a position of the head of the user with reference to a position of a right hand of the user and feature data indicating a feature of a time series transition of the region data, a feature extraction procedure, by a feature extraction section, of outputting the new feature data in response to input of the input data, an estimation procedure, by an estimation section, of estimating, on the basis of the feature data, a position of a left foot of the user with reference to the position of the head of the user and a position of a right foot of the user with reference to the position of the head of the user, and a learning procedure of learning at least one of the feature extraction section and the estimation section on the basis of a result of the estimation. The feature extraction procedure includes outputting, by the feature extraction section, in response to input of the input data including the region data at a latest timing and the feature data indicating the feature of the time series transition of the region data, the feature data indicating the feature of the time series transition, of the region data, occurred until the latest timing, and the learning procedure includes executing the learning on the basis of results of estimation, by the estimation section, of the position of the left foot of the user with reference to the position of the head of the user and the position of the right foot of the user with reference to the position of the head of the user at the latest timing, the positions of the left foot and the right foot of the user being obtained on the basis of the feature data indicating the feature of the time series transition, of the region data, occurred until the latest timing.

DESCRIPTION OF EMBODIMENT

<System Configuration>

Figure 1:
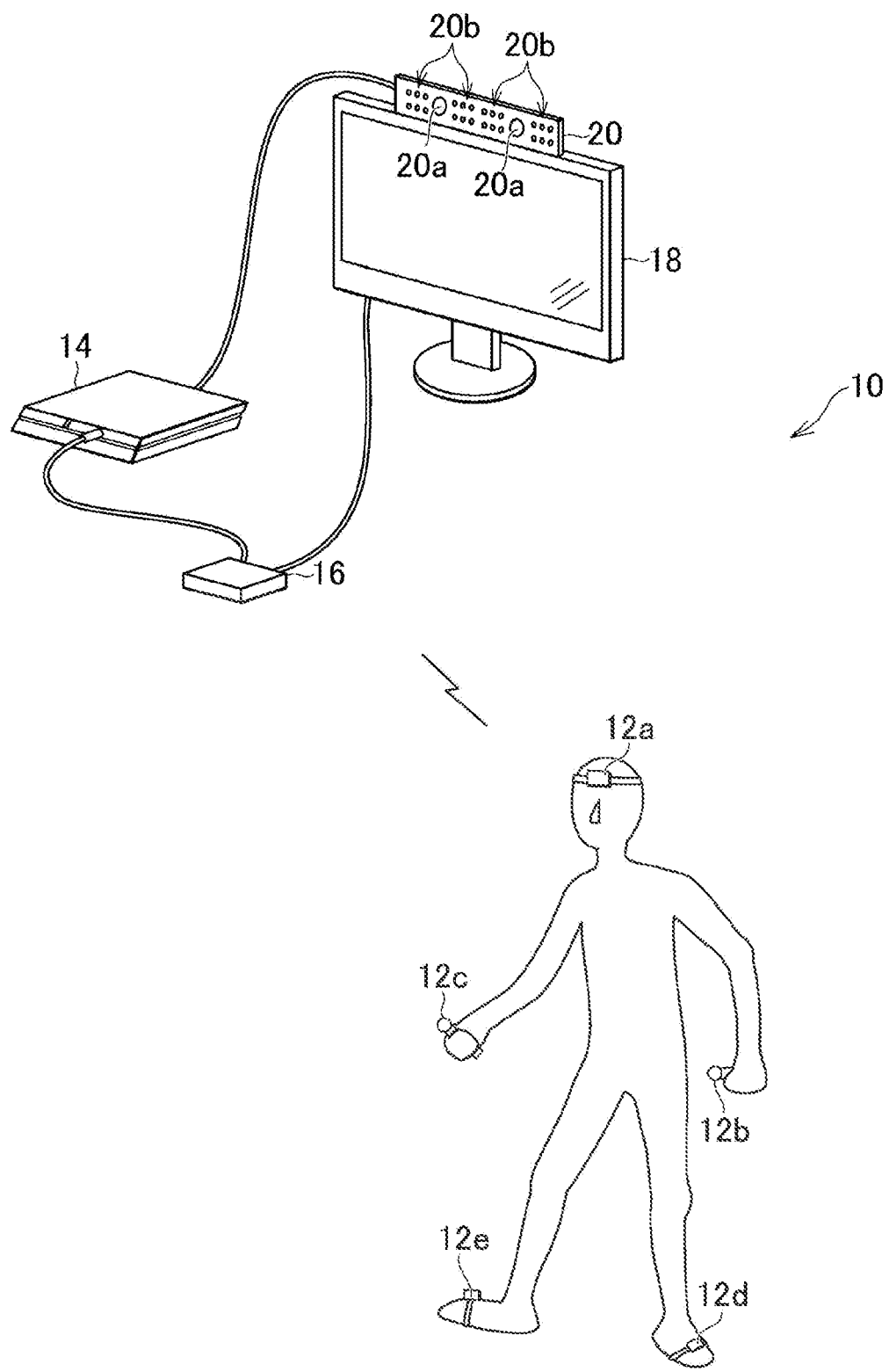
FIG. 1 is a configuration diagram depicting an example of an entertainment system according to one embodiment of the present invention.
Figure 2:
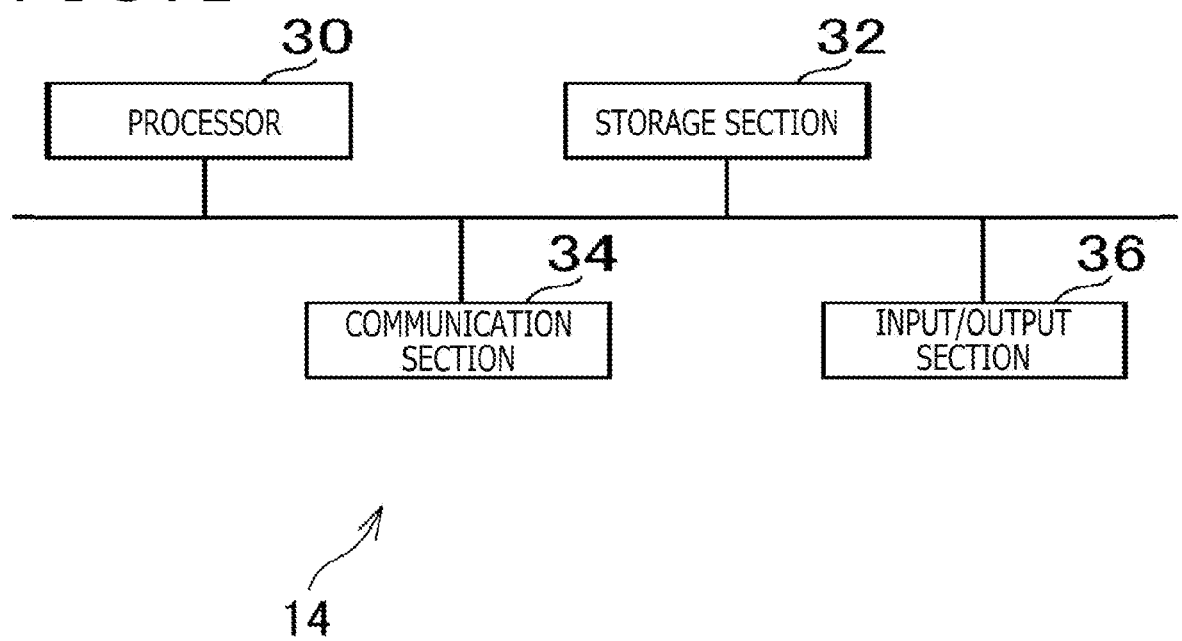
FIG. 2 is a configuration diagram depicting an example of an entertainment apparatus according to one embodiment of the present invention.

FIG. 1 is a diagram depicting an example of a configuration of an entertainment system 10 according to one embodiment of the present invention. FIG. 2 is a diagram depicting an example of a configuration of an entertainment apparatus 14 according to the present embodiment.

As depicted in FIG. 1, the entertainment system 10 according to the present embodiment includes a plurality of trackers 12 (trackers 12a to 12e in the example of FIG. 1), the entertainment apparatus 14, a relay apparatus 16, a display 18, and a camera microphone unit 20.

The trackers 12 according to the present embodiment are devices that, for example, track positions and directions of the trackers 12. Each of the trackers 12 may be configured herein with, for example, various kinds of sensors such as a camera, an inertial measurement unit (IMU), a geomagnetic sensor (azimuth sensor), an acceleration sensor, a motion sensor, and a GPS (Global Positioning System) module. In addition, each of the trackers 12 may identify the position and the direction of the tracker 12 on the basis of sensing data that is measurement results by the sensors provided in the tracker 12.

Alternatively, for example, each of the trackers 12 may identify the position and the direction of the tracker 12 on the basis of an image captured by a camera 20a included in the camera microphone unit 20, to be described later and containing an image of the tracker 12.

In the present embodiment, the trackers 12a, 12b, 12c, 12d, and 12e are attached to a head, a left hand, a right hand, a left foot, and a right foot of a user, respectively. As depicted in FIG. 1, herein, the trackers 12b and 12c may be grasped by user's hands. In the present embodiment, the positions and the directions identified by the trackers 12a, 12b, 12c, 12d, and 12e correspond to positions and directions of the head, the left hand, the right hand, the left foot, and the right foot of the user, respectively. In this way, in the present embodiment, the plurality of trackers 12 identify the positions and the directions of a plurality of regions included in a user's body.

Examples of the entertainment apparatus 14 according to the present embodiment include computers such as a game console, a DVD (Digital Versatile Disc) player, a Blu-ray (registered trademark) player. The entertainment apparatus 14 according to the present embodiment generates a video picture and a sound by, for example, execution of a game program or reproduction of content stored or recorded in an optical disk. The entertainment apparatus 14 according to the present embodiment then outputs a video picture signal representing the generated video picture and an audio signal representing the generated sound to the display 18 via the relay apparatus 16.

As depicted in, for example, FIG. 2, the entertainment apparatus 14 according to the present embodiment includes a processor 30, a storage section 32, a communication section 34, and an input/output section 36.

The processor 30 is a program control device such as a CPU (Central Processing Unit) operating in accordance with, for example, a program installed in the entertainment apparatus 14. The processor 30 according to the present embodiment also includes a GPU (Graphics Processing Unit) that draws an image on a frame buffer on the basis of a graphics command and data supplied from the CPU.

The storage section 32 is, for example, a storage element such as a ROM (Read Only Memory) and a RAM (Random Access Memory) or a hard disk drive. A program and the like executed by the processor 30 are stored in the storage section 32. Furthermore, an area of the frame buffer where an image is drawn by the GPU is allocated in the storage section 32 according to the present embodiment.

The communication section 34 is, for example, a communication interface such as a wireless LAN (Local Area Network) module.

The input/output section 36 is an input/output port such as an HDMI (registered trademark) (High-definition Multimedia Interface) port or a USB (Universal Serial Bus) port.

The relay apparatus 16 according to the present embodiment is a computer that relays the video picture signal and the audio signal output from the entertainment apparatus 14 and that outputs the video picture signal and the audio signal to the display 18.

The display 18 according to the present embodiment is, for example, a liquid crystal display, and displays thereon the video picture represented by the video picture signal output from the entertainment apparatus 14.

The camera microphone unit 20 according to the present embodiment includes the camera 20a that outputs, for example, an image obtained by imaging a subject to the entertainment apparatus 14, and a microphone 20b that acquires a surrounding sound, converts the sound into audio data, and outputs the audio data to the entertainment apparatus 14. Furthermore, the camera 20a according to the present embodiment is a stereo camera.

The trackers 12 and the relay apparatus 16 are configured to be capable of mutually transmitting and receiving data by, for example, wireless communication. The entertainment apparatus 14 and the relay apparatus 16 are connected to each other via, for example, an HDMI cable or a USB cable, and configured to be capable of mutually transmitting and receiving data. The relay apparatus 16 and the display 18 are connected to each other via, for example, an HDMI cable. The entertainment apparatus 14 and the camera microphone unit 20 are connected to each other by, for example, an AUX (Auxiliary) cable.

Figure 3:
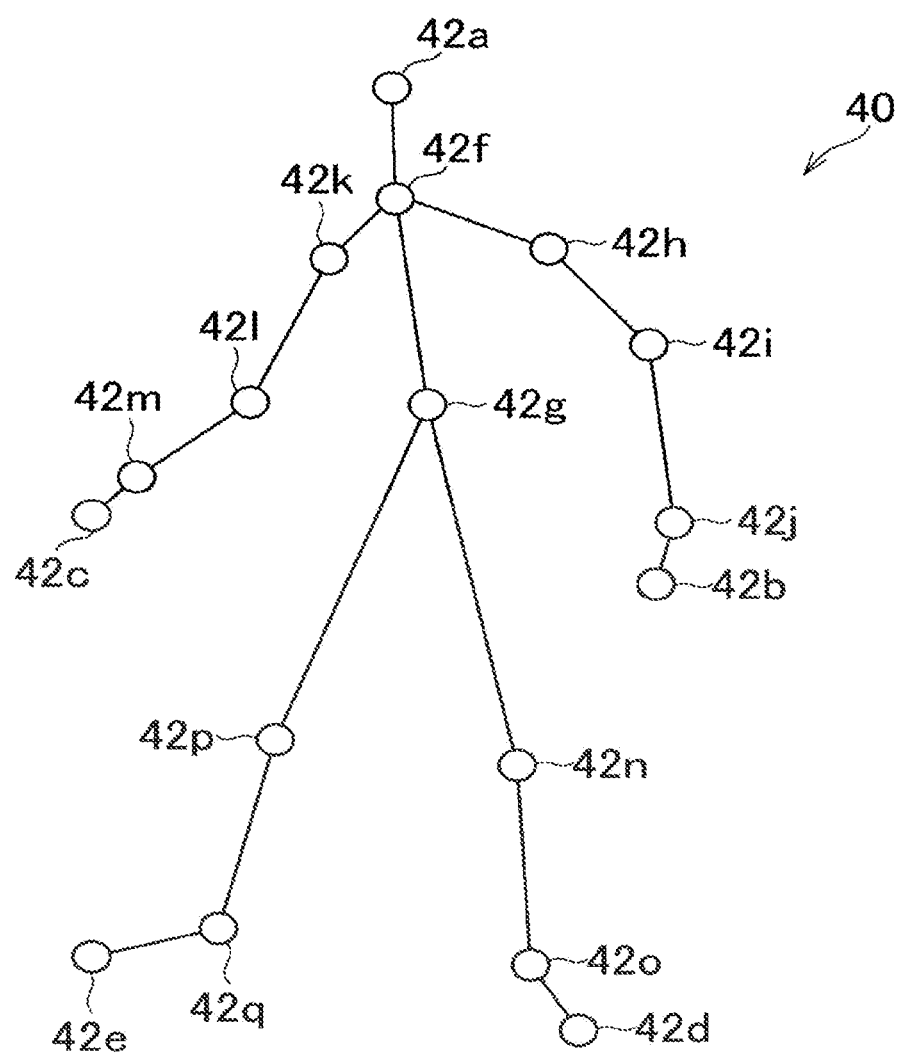
FIG. 3 is a diagram depicting an example of a skeleton model.

In the present embodiment, at a time of, for example, executing a game program by the entertainment apparatus 14, various types of processing such as game processing in response to the positions or directions of the plurality of regions included in the user's body in a skeleton model 40 depicted in FIG. 3 is executed. A video picture in response to a result of the processing is then displayed on, for example, the display 18.

<Example of Estimation of Direction of Chest Node or Lumbar Node and Example of Estimation of Directions of Left Wrist Node and Right Wrist Node>

As depicted in FIG. 3, the skeleton model 40 according to the present embodiment includes a head node 42a, a left hand node 42b, a right hand node 42c, a left foot node 42d, and a right foot node 42e. The head node 42a corresponds to the user's head to which the tracker 12a is attached. The left hand node 42b corresponds to the user's left hand to which the tracker 12b is attached. The right hand node 42c corresponds to the user's right hand to which the tracker 12c is attached. The left foot node 42d corresponds to the user's left foot to which the tracker 12d is attached. The right foot node 42e corresponds to the user's right foot to which the tracker 12e is attached.

In addition to the above nodes 42, the skeleton model 40 also includes a chest node 42f, a lumbar node 42g, a left shoulder node 42h, a left elbow node 42i, and a left wrist node 42j. Further, the skeleton model 40 includes a right shoulder node 42k, a right elbow node 42l, a right wrist node 42m, a left knee node 42n, a left ankle node 42o, a right knee node 42p, and a right ankle node 42q.

As depicted in FIG. 3, the head node 42a and the chest node 42f are connected herein to each other by a link. Furthermore, the chest node 42f and the lumbar node 42g are connected to each other by a link.

Moreover, the chest node 42f and the left shoulder node 42h are connected to each other by a link. Furthermore, the left shoulder node 42h and the left elbow node 42i are connected to each other by a link. Moreover, the left elbow node 42i and the left wrist node 42j are connected to each other by a link. Furthermore, the left wrist node 42j and the left hand node 42b are connected to each other by a link.

Moreover, the chest node 42f and the right shoulder node 42k are connected to each other by a link. Furthermore, the right shoulder node 42k and the right elbow node 42l are connected to each other by a link. Moreover, the right elbow node 42l and the right wrist node 42m are connected to each other by a link. Furthermore, the right wrist node 42m and the right hand node 42c are connected to each other by a link.

Moreover, the lumbar node 42g and the left knee node 42n are connected to each other by a link. Furthermore, the left knee node 42n and the left ankle node 42o are connected to each other by a link. Moreover, the left ankle node 42o and the left foot node 42d are connected to each other by a link.

Furthermore, the lumbar node 42g and the right knee node 42p are connected to each other by a link. Moreover, the right knee node 42p and the right ankle node 42q are connected to each other by a link. Furthermore, the right ankle node 42q and the right foot node 42e are connected to each other by a link.

The nodes 42 correspond to the respective regions included in the user's body. Furthermore, in the present embodiment, body tracking can be performed on the basis of, for example, positions and directions identified for the plurality of trackers 12. Estimation of a position relative to a reference position in an initial state and a direction relative to a reference direction in the initial state, for example, is executed herein for each of the plurality of nodes 42 included in the skeleton model 40.

A position and a direction of the head node 42a, for example, can be determined herein on the basis of data indicating the position and the direction identified for the tracker 12a. Likewise, a position and a direction of the left hand node 42b can be determined on the basis of data indicating the position and the direction identified for the tracker 12b. Furthermore, a position and a direction of the right hand node 42c can be determined on the basis of data indicating the position and the direction identified for the tracker 12c. Moreover, a position and a direction of the left foot node 42d can be determined on the basis of data indicating the position and the direction identified for the tracker 12d. Furthermore, a position and a direction of the right foot node 42e can be determined on the basis of data indicating the position and the direction identified for the tracker 12e.

It is conceivable herein that positions and directions of the other nodes 42 are estimated on the basis of data indicating the determined positions and the determined directions of the head node 42a, the left hand node 42b, the right hand node 42c, the left foot node 42d, and the right foot node 42e by inverse kinematics (IK).

In this case, however, without information regarding a direction of the chest node 42f or the lumbar node 42g, it is impossible to estimate the positions and the directions of the other nodes 42 by the inverse kinematics. It is particularly difficult to estimate the directions of the other nodes 42.

Furthermore, even if data indicating the position and the direction of the left hand node 42b is present, it is often difficult to estimate the position and the direction of the left elbow node 42i by the inverse kinematics without information regarding the direction of the left wrist node 42j. For example, when the user makes a motion of moving only a hand such as a handwaving motion, an estimation result that the position of the elbow greatly moves is often obtained although the elbow does not actually greatly move.

Likewise, even if data indicating the position and the direction of the right hand node 42c is present, it is often difficult to estimate the position and the direction of the right elbow node 42l by the inverse kinematics without information regarding the direction of the right wrist node 42m.

To address the problem, the present embodiment enables accurate estimation of the direction of the chest node 42f or the lumbar node 42g on the basis of the data indicating the positions and the directions of the head node 42a, the left hand node 42b, the right hand node 42c, the left foot node 42d, and the right foot node 42e as follows. In addition, the present embodiment enables accurate estimation of the directions of the left wrist node 42j and the right wrist node 42m on the basis of the data indicating the positions and the directions of the head node 42a, the left hand node 42b, the right hand node 42c, the left foot node 42d, and the right foot node 42e as follows.

It is noted that the position and the direction of each of the trackers 12a to 12e are assumed to be identified at, for example, a predetermined sampling rate in the present embodiment. It is also assumed that data indicating the position and the direction of the tracker 12 is transmitted to the entertainment apparatus 14 in response to identification of the position and the direction of the tracker 12. It is further assumed that the entertainment apparatus 14 executes the estimation of the direction described above based on the data.

Learning of a machine learning model used in estimation of the direction of the chest node 42f and the estimation of the direction of the chest node 42f using the learned machine learning model will be described hereinafter. It is noted that a method described hereinafter is similarly applicable to learning of a machine learning model used in estimation of the direction of the lumbar node 42g and the estimation of the direction of the lumbar node 42g using the learned machine learning model.

Figure 4:
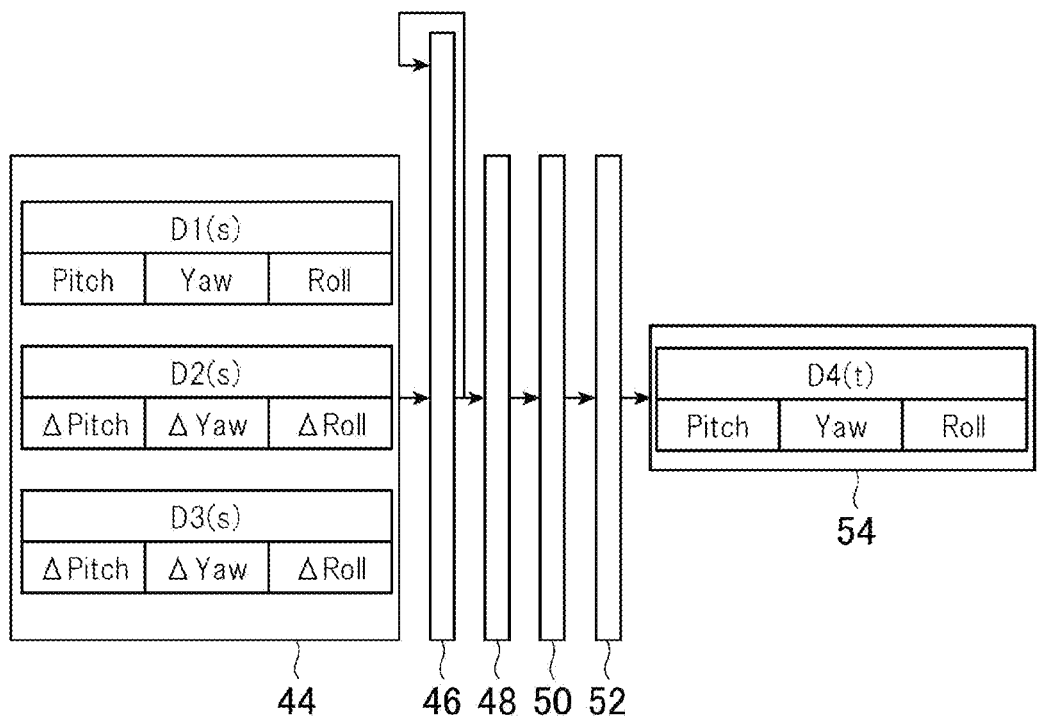
FIG. 4 is a diagram depicting an example of learning of a machine learning model used in estimation of a direction of a chest node.

FIG. 4 is a diagram depicting an example of learning of a machine learning model used in estimation of the direction of the chest node 42f. As depicted in FIG. 4, the machine learning model used in the estimation of the direction of the chest node **42*f* includes an input layer 44, an intermediate block 46, a first intermediate layer 48, a second intermediate layer 50, and an output layer 52**.

In the present embodiment, in learning of the machine learning model depicted in FIG. 4, learning data containing, for example, a plurality of pieces of region data made to correspond to respective timings which are different from one another and each indicating a position, a posture, or a motion about any of the regions of the body at each timing is acquired. Learning data containing, for example, a plurality of pieces of region data made to correspond to the respective timings which are different from one another and each indicating a direction of the head, an angular speed of the left hand, and an angular speed of the right hand at each timing is acquired. It is assumed herein that the learning data containing, for example, t pieces of region data is acquired.

On the basis of, for example, a series of t pieces of sensing data output from each of the trackers 12 attached to the head, the left hand, the right hand, and the chest when the user having the trackers 12 attached thereto makes various motions, a series of t pieces of region data made to correspond to the series oft respective pieces of sensing data may be generated herein. In addition, on the basis of the t-th sensing data, supervisory data indicating the direction of the chest that is made to correspond to the t-th sensing data may be generated. Learning data containing the series of t pieces of region data and the supervisory data may be then generated.

Alternatively, on the basis of, for example, a series of t pieces of sensing data output from each of the trackers 12 attached to the head, the left hand, and the right hand when the user having the trackers 12 attached thereto makes various motions in a state in which the direction of the chest is a specific direction, a series of t pieces of region data made to correspond to the t pieces of sensing data, respectively may be generated. Learning data containing the series of t pieces of region data and the supervisory data indicating the specific direction of the chest as described above may be then generated.

In another alternative, on the basis of, for example, an image sequence containing t frames of the user making various motions captured from an external camera, learning data containing a series of t pieces of region data made to correspond to the t frames, respectively and supervisory data indicating the direction of the chest that is made to correspond to the t-th frame may be generated. In addition, learning data containing the series of t pieces of region data and the supervisory data described above may be generated on the basis of an operation of an operator viewing such an image sequence.

The pieces of region data contained in the learning data are then sequentially input to the input layer 44 in chronological order of the corresponding timings. It is assumed herein that each region data contains, for example, head direction data D1 indicating the direction of the head, left hand angular speed data D2 indicating the angular speed of the left hand, and right hand angular speed data D3 indicating the angular speed of the right hand.

For example, data indicating the direction of the tracker **12*a* at the corresponding timing that is the s-th oldest is expressed as head direction data $D1(s)$ herein. In addition, data indicating the angular speed of the tracker 12*b* at the corresponding timing that is the s-th oldest is expressed as left hand angular speed data $D2(s)$. Furthermore, data indicating the angular speed of the tracker 12*c*** at the corresponding timing that is the s-th oldest is expressed as right hand angular speed data $D3(s)$. A value s is herein an integer equal to or greater than 1 and equal to or smaller than t.

Furthermore, in the present embodiment, as depicted in FIG. 4, the head direction data $D1(s)$ contains three elements that are a pitch angle (Pitch), a yaw angle (Yaw), and a roll angle (Roll). The pitch angle, the yaw angle, and the roll angle correspond to, for example, a pitch angle, a yaw angle, and a roll angle with respect to the reference direction described above, respectively.

Furthermore, in the present embodiment, as depicted in FIG. 4, the left hand angular speed data $D2(s)$ contains three elements that are a pitch angular speed ($\Delta$Pitch), a yaw angular speed ($\Delta$Yaw), and a roll angular speed ($\Delta$Roll). The pitch angular speed, the yaw angular speed, and the roll angular speed correspond herein to a difference between the pitch angles with respect to the reference direction at two continuous timings, a difference between the yaw angles with respect to the reference direction at two continuous timings, and a difference between the roll angles with respect to the reference direction at two continuous timings, respectively.

Moreover, in the present embodiment, as depicted in FIG. 4, the right hand angular speed data $D3(s)$ contains three elements that are a pitch angular speed ($\Delta$Pitch), a yaw angular speed ($\Delta$Yaw), and a roll angular speed ($\Delta$Roll). As described above, the pitch angular speed, the yaw angular speed, and the roll angular speed correspond to a difference between the pitch angles with respect to the reference direction at two continuous timings, a difference between the yaw angles with respect to the reference direction at two continuous timings, and a difference between the roll angles with respect to the reference direction at two continuous timings, respectively.

A difference between, for example, a value of data indicating the direction at a timing immediately preceding a certain timing and a value of data indicating the direction at the certain timing may be used herein as a value indicating the angular speed.

In the present embodiment, the pieces of region data each containing nine (3×3) elements are input to the input layer 44.

Furthermore, input data obtained by connecting the region data input to the input layer 44 with an output from the intermediate block 46 in response to an immediately preceding input is input to the intermediate block 46. The intermediate block 46 is, in the present embodiment, for example, an RNN (Recurrent Neural Network) (LSTM (Long short-term memory) block) into which an LSTM is implemented.

The output from the intermediate block 46 is herein data indicating a feature of a time-series transition of the position, the posture, or the motion about any of the regions of the body about which the region data indicates the position, the posture, or the motion. The data output from the intermediate block 46 will be referred to as "feature data," hereinafter. For example, state variables of the LSTM correspond to the feature data.

It is assumed herein that the input data containing, for example, the region data made to correspond to a certain timing and the feature data indicating the feature of the time-series transition described above at a timing preceding the certain timing is input to the intermediate block 46. In this case, the intermediate block 46 outputs the feature data indicating the feature of the time-series transition until the timing. It is assumed that the input data containing, for example, the s-th region data and the feature data indicating the feature of the time-series transition described above until the timing corresponding to the (s−1)-th region is input to the intermediate block 46. In this case, the intermediate block 46 outputs the feature data indicating the feature of the time-series transition until the timing corresponding to the s-th region data. The feature data indicating the feature of the time-series transition described above until the timing corresponding to the s-th region data will be referred to as "s-th feature data," hereinafter.

T-th feature data that is an output from the intermediate block 46 with respect to an input of the input data containing the last region data (t-th region data) is then input to the first intermediate layer 48. The output from the first intermediate layer 48 is then input to the second intermediate layer 50. Each of the first intermediate layer 48 and the second intermediate layer 50 is, for example, a fully-connected layer using a rectified linear function (ReLU) as an activation function.

The output from the second intermediate layer 50 is then input to the output layer 52. The output layer 52 is, for example, a layer using a linear function as an activation function. Chest direction data $D4(t)$ corresponding to an estimation result of the direction of the chest at the latest timing (t-th timing) is then output from the output layer 52 as an output 54. As depicted in FIG. 4, the chest direction data $D4(t)$ contains three elements that are a pitch angle (Pitch), a yaw angle (Yaw), and a roll angle (Roll). The pitch angle, the yaw angle, and the roll angle correspond to, for example, a pitch angle, a yaw angle, and a roll angle with respect to the reference direction described above, respectively.

It is noted that the supervisory data described above also contains, for example, three elements that are a pitch angle (Pitch), a yaw angle (Yaw), and a roll angle (Roll), similarly to the chest direction data $D4(t)$.

In the present embodiment, learning of the intermediate block 46, the first intermediate layer 48, the second intermediate layer 50, and the output layer 52 is then executed on the basis of, for example, the chest direction data $D4(t)$ indicating the estimation result. A difference between, for example, the supervisory data contained in the learning data that contains the series of region data described above and the chest direction data $D4(t)$ indicating the estimation result may be identified herein. Supervised learning for updating values of parameters of the intermediate block 46, the first intermediate layer 48, the second intermediate layer 50, and the output layer 52 may be then executed on the basis of the identified difference.

In the present embodiment, learning is performed by, for example, the learning data containing the t pieces of region data from the first region data to the t-th region data. Learning may be performed herein by, for example, the learning data containing the t pieces of region data from the first region data to the t-th region data and the supervisory data made to correspond to the t-th region data. The estimation of the direction of the chest node 42f is then executed using the learned machine learning model completed with the learning by, for example, a plurality of pieces of different learning data.

Figure 5:
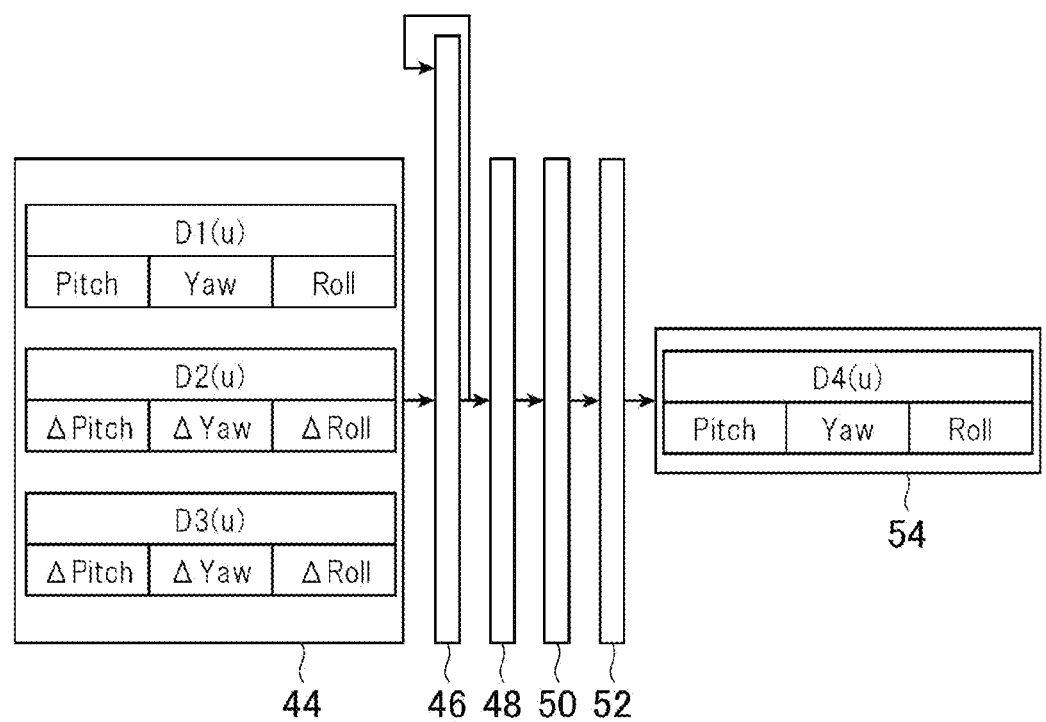
FIG. 5 is a diagram depicting an example of estimation of the direction of the chest node using the machine learning model depicted in FIG. 4.

FIG. 5 is a diagram depicting an example of the estimation of the direction of the chest node 42f using the learned machine learning model.

As described above, in the present embodiment, it is assumed, for example, that the position and the direction of each of the trackers 12a to 12e are identified at the predetermined sampling rate. It is also assumed that data indicating the position and the direction of each tracker 12 is transmitted to the entertainment apparatus 14 in response to identification of the position and the direction of the tracker 12.

It is further assumed that region data indicating the position, the posture, or the motion about any of the regions of the body is generated on the basis of the data indicating the position and the direction of each tracker 12 transmitted in this way. In the present embodiment, the region data is repeatedly generated in this way.

As described above, it is assumed herein that the region data contains the head direction data D1 indicating the direction of the head, the left hand angular speed data D2 indicating the angular speed of the left hand, and the right hand angular speed data D3 indicating the angular speed of the right hand. For example, the difference between the value of data indicating the direction at a timing immediately preceding a specific timing and the value of data indicating the direction at the specific timing may be used herein as the value indicating the angular speed at the specific timing.

In the present embodiment, the latest region data (last generated region data), for example, is input to the input layer 44. In FIG. 5, the head direction data D1 contained in the latest region data is expressed as head direction data $D1(u)$. In addition, the left hand angular speed data D2 contained in the latest region data is expressed as left hand angular speed data $D2(u)$. Furthermore, the right hand angular speed data D3 contained in the latest region data is expressed as right hand angular speed data $D3(u)$.

As described above, the head direction data $D1(u)$ contains three elements that are a pitch angle (Pitch), a yaw angle (Yaw), and a roll angle (Roll). Furthermore, the left hand angular speed data $D2(u)$ contains three elements that are a pitch angular speed ($\Delta$Pitch), a yaw angular speed ($\Delta$Yaw), and a roll angular speed ($\Delta$Roll). Moreover, the right hand angular speed data $D3(u)$ contains three elements that are a pitch angular speed ($\Delta$Pitch), a yaw angular speed ($\Delta$Yaw), and a roll angular speed ($\Delta$Roll).

The input data obtained by connecting the region data input to the input layer 44 and containing the nine (3×3) elements with the feature data that is the output from the intermediate block 46 in response to the immediately preceding input is then input to the intermediate block 46.

The feature data that is the output from the intermediate block 46 is then input to the first intermediate layer 48. The output from the first intermediate layer 48 is then input to the second intermediate layer 50.

The output from the second intermediate layer 50 is then input to the output layer 52. Chest direction data $D4(u)$ corresponding to an estimation result of the direction of the chest at the timing is then output from the output layer 52 as the output 54.

Learning may be executed herein in advance by data indicating a direction of the lumbar made to correspond to a combination of the direction of the head, the angular speed of the left hand, and the angular speed of the right hand. In this case, the supervisory data contained in the learning data described above may be, for example, the data indicating the direction of the lumbar. In addition, the supervisory data may be generated in a similar manner as that described above on the basis of, for example, the sensing data output from each of the trackers 12 attached to the head, the left hand, the right hand, and the lumbar of the user making various motions, and an image sequence containing t frames of the user making various motions captured from the external camera.

An angular speed of the lumbar node 42g may be then estimated. In this case, the data D4 depicted in FIGS. 4 and 5 corresponds to an estimation result of the direction of the lumbar node 42g.

Furthermore, learning may be executed in advance by data indicating an angular speed of the chest made to correspond to a combination of the direction of the head, the angular speed of the left hand, and the angular speed of the right hand. In this case, the supervisory data contained in the learning data described above may be, for example, data indicating the direction of the chest. In addition, the supervisory data may be generated in a similar manner as that described above on the basis of, for example, the sensing data output from each of the trackers 12 attached to the head, the left hand, the right hand, and the chest of the user making various motions, and the image sequence containing t frames of the user making various motions captured from the external camera. An angular speed of the chest node 42f may be then estimated. In this case, the data D4 depicted in FIGS. 4 and 5 corresponds to an estimation result of the angular speed of the chest node 42f.

Moreover, learning may be executed in advance by data indicating an angular speed of the lumbar made to correspond to the combination of the direction of the head, the angular speed of the left hand, and the angular speed of the right hand. In this case, the supervisory data contained in the learning data described above may be, for example, the data indicating the direction of the lumbar. In addition, the supervisory data may be generated in a similar manner as that described above on the basis of, for example, the sensing data output from each of the trackers 12 attached to the head, the left hand, the right hand, and the lumbar of the user making various motions, and an image sequence containing t frames of the user making various motions captured from the external camera. An angular speed of the lumbar node 42g may be then estimated. In this case, the data D4 depicted in FIGS. 4 and 5 corresponds to an estimation result of the angular speed of the lumbar node 42g.

In the present embodiment, the estimation of the direction of the chest node 42f or the lumbar node 42g or the estimation of the angular speed of the chest node 42f or the lumbar node 42g is executed as described above.

Estimation of the direction of the left wrist node 42j will be described hereinafter. It is noted that a method described hereinafter is similarly applicable to estimation of the direction of the right wrist node 42m.

Figure 6:
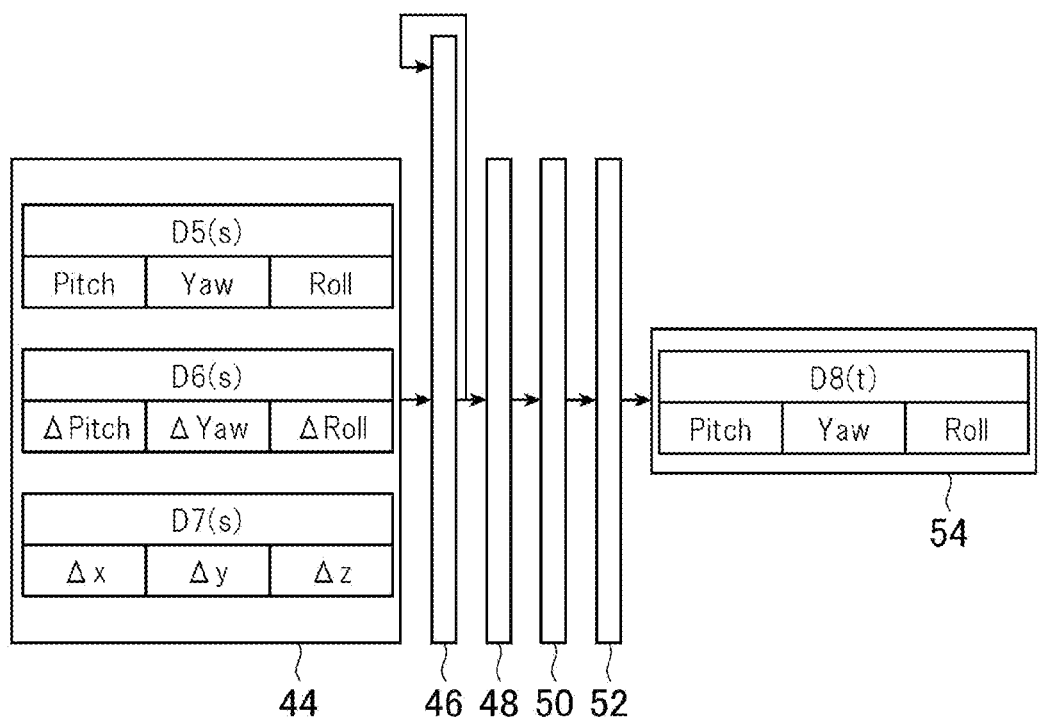
FIG. 6 is a diagram depicting an example of learning of a machine learning model used in estimation of a direction of a left wrist node or a right wrist node.

FIG. 6 is a diagram depicting an example of learning of a machine learning model used in estimation of the direction of the left wrist node 42j. As depicted in FIG. 6, the machine learning model used in the estimation of the direction of the left wrist node 42j includes the input layer 44, the intermediate block 46, the first intermediate layer 48, the second intermediate layer 50, and the output layer 52.

In the present embodiment, in learning of the machine learning model depicted in FIG. 6, learning data containing, for example, a plurality of pieces of region data made to correspond to respective timings which are different from one another and each indicating the position, the posture, or the motion about any of the regions of the body at each timing is acquired. Learning data containing, for example, a plurality of pieces of region data made to correspond to the respective timings which are different from one another and each indicating the direction of the left hand, the angular speed of the left hand, and a speed of the left hand is acquired. It is assumed herein that the learning data containing, for example, t pieces of region data is acquired.

The pieces of region data contained in the learning data are sequentially input to the input layer 44 in chronological order of the corresponding timings. It is assumed herein that the region data contains, for example, left hand direction data D5 indicating the direction of the left hand, left hand angular speed data D6 indicating the angular speed of the left hand, and left hand speed data D7 indicating the speed of the left hand.

On the basis of, for example, a series of t pieces of sensing data output from each of the trackers 12 attached to the left hand and the left wrist when the user having the trackers 12 attached thereto makes various motions, a series of t pieces of region data made to correspond to the series of t respective pieces of sensing data may be generated herein. In addition, on the basis of the t-th sensing data supervisory data indicating the direction of the left wrist that is made to correspond to the t-th sensing data may be generated. Learning data containing the series of t pieces of region data and the supervisory data may be then generated.

Alternatively, on the basis of, for example, the series of t pieces of sensing data output from the tracker 12 attached to the left hand when the user having the tracker 12 attached thereto makes various motions in a state in which the direction of the left wrist is a specific direction, a series of t pieces of region data made to correspond to the t pieces of sensing data, respectively may be generated. Learning data containing the series of t pieces of region data and the supervisory data indicating the specific direction of the left wrist as described above may be then generated.

In another alternative, on the basis of, for example, an image sequence containing t frames of the user making various motions captured from an external camera, learning data containing a series of t pieces of region data made to correspond to the t frames, respectively and supervisory data indicating the direction of the left wrist that is made to correspond to the t-th frame may be generated. In addition, learning data containing the series of t pieces of region data and the supervisory data described above may be generated on the basis of an operation of an operator viewing such an image sequence.

In FIG. 6, data indicating the direction of the tracker 12a at the corresponding timing that is the s-th oldest is expressed herein as left hand direction data D5($s$). In addition, data indicating the angular speed of the tracker 12b at the corresponding timing that is the s-th oldest is expressed as left hand angular speed data D6($s$). Furthermore, data indicating the speed of the tracker 12b at the corresponding timing that is the s-th oldest is expressed as left hand speed data D7($s$). A value s is herein an integer equal to or greater than 1 and equal to or smaller than t.

Furthermore, in the present embodiment, as depicted in FIG. 6, the left hand direction data D5($s$) contains three elements that are a pitch angle (Pitch), a yaw angle (Yaw), and a roll angle (Roll). The pitch angle, the yaw angle, and the roll angle correspond to, for example, a pitch angle, a yaw angle, and a roll angle with respect to the reference direction described above, respectively.

Moreover, in the present embodiment, as depicted in FIG. 6, the left hand angular speed data D6($s$) contains three elements that are a pitch angular speed ($\Delta$Pitch), a yaw angular speed ($\Delta$Yaw), and a roll angular speed ($\Delta$Roll). The pitch angular speed, the yaw angular speed, and the roll angular speed correspond herein to a difference between the pitch angles with respect to the reference direction at two continuous timings, a difference between the yaw angles with respect to the reference direction at two continuous timings, and a difference between the roll angles with respect to the reference direction at two continuous timings, respectively.

A difference between, for example, a value of data indicating the direction at a timing immediately preceding a certain timing and a value of data indicating the direction at the certain timing may be used herein as a value indicating the angular speed.

Moreover, in the present embodiment, as depicted in FIG. 6, the left hand speed data D7(s) contains three elements that are Δx, Δy, and Δz corresponding to speeds in three-axis directions, respectively. The speeds in the three-axis directions correspond to a difference between x coordinate values with respect to the reference position described above at two continuous specific timings, a difference between y coordinate values with respect to the reference position described above at two continuous specific timings, and a difference between z coordinate values with respect to the reference position described above at two continuous specific timings, respectively.

A difference between, for example, a value of data indicating the direction at a timing immediately preceding a certain timing and a value of data indicating the direction at the certain timing may be used herein as a value indicating the speed.

In the present embodiment, the pieces of region data each containing nine (3×3) elements are input to the input layer 44.

The input data obtained by connecting the region data input to the input layer 44 with an output from the intermediate block 46 in response to an immediately preceding input is then input to the intermediate block 46. For example, input data obtained by connecting s-th feature data with (s−1)-th feature data is input to the intermediate block 46.

Left wrist direction data D8(t) corresponding to an estimation result of the direction of the left wrist at the latest timing (t-th timing) is then finally output from the output layer 52 as the output 54 in a similar manner as that described with reference to FIG. 4. As depicted in FIG. 6, the left wrist direction data D8(t) contains three elements that are a pitch angle (Pitch), a yaw angle (Yaw), and a roll angle (Roll). The pitch angle, the yaw angle, and the roll angle correspond to, for example, a pitch angle, a yaw angle, and a roll angle with respect to the reference direction described above, respectively.

It is noted that the supervisory data described above also contains, for example, three elements that are a pitch angle (Pitch), a yaw angle (Yaw), and a roll angle (Roll), similarly to the left wrist direction data D8(t).

In the present embodiment, learning of the intermediate block 46, the first intermediate layer 48, the second intermediate layer 50, and the output layer 52 is then executed on the basis of, for example, the left wrist direction data D8(t) indicating the estimation result. A difference between, for example, the supervisory data contained in the learning data that contains the series of region data described above and the left wrist direction data D8(t) indicating the estimation result may be identified herein. Supervised learning for updating values of parameters of the intermediate block 46, the first intermediate layer 48, the second intermediate layer 50, and the output layer 52 may be then executed on the basis of the identified difference.

In the present embodiment, learning is performed by, for example, the learning data containing the t pieces of region data from the first region data to the t-th region data. Learning may be performed herein by, for example, the learning data containing the t pieces of region data from the first region data to the t-th region data and the supervisory data made to correspond to the t-th region data. The estimation of the direction of the left wrist node 42j is then executed using the learned machine learning model completed with learning by, for example, a plurality of pieces of different learning data.

Figure 7:
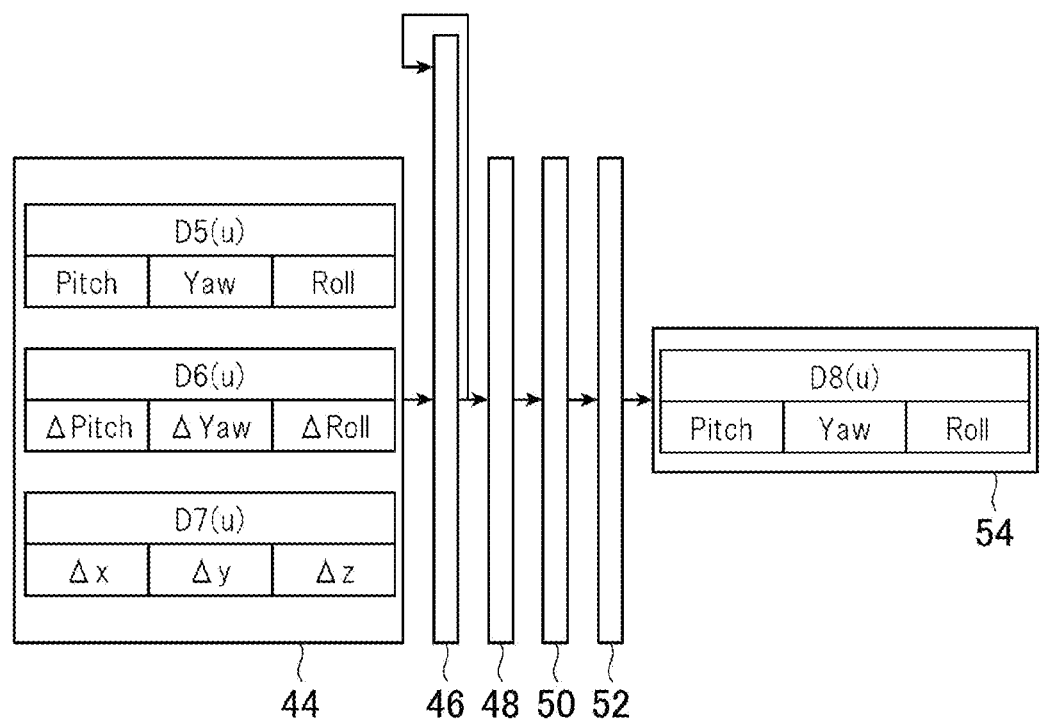
FIG. 7 is a diagram depicting an example of estimation of the left wrist node or the right wrist node using the machine learning model depicted in FIG. 6.

FIG. 7 is a diagram depicting an example of the estimation of the direction of the left wrist node 42j using the learned machine learning model.

As described above, in the present embodiment, the region data is repeatedly generated. As described above, it is assumed herein that the region data contains the left hand direction data D5 indicating the direction of the left hand, the left hand angular speed data D6 indicating the angular speed of the left hand, and the left hand speed data D7 indicating the speed of the left hand. For example, the difference between the value of data indicating the direction at a timing immediately preceding a specific timing and the value of data indicating the direction at the specific timing may be used herein as the value indicating the angular speed at the specific timing. Furthermore, for example, the difference between the value of data indicating the direction at a timing immediately preceding a specific timing and the value of data indicating the direction at the specific timing may be used as the value indicating the speed at the specific timing.

In the present embodiment, the latest region data (last generated region data), for example, is input to the input layer 44. In FIG. 7, the left hand direction data D5 contained in the latest region data is expressed as left hand direction data D5(u). In addition, the left hand angular speed data D6 contained in the latest region data is expressed as left hand angular speed data D6(u). Furthermore, the left hand speed data D7 contained in the latest region data is expressed as left hand speed data D7(u).

As described above, the left hand direction data D5(s) contains three elements that are a pitch angle (Pitch), a yaw angle (Yaw), and a roll angle (Roll). Furthermore, the left hand angular speed data D6(s) contains three elements that are a pitch angular speed (ΔPitch), a yaw angular speed (ΔYaw), and a roll angular speed (ΔRoll). Moreover, the left hand speed data D7(s) contains three elements that are Δx, Δy, and Δz corresponding to the speeds in the directions of the three axes, respectively.

The input data obtained by connecting the region data input to the input layer 44 and containing the nine (3×3) elements with the feature data that is the output from the intermediate block 46 in response to the immediately preceding input is then input to the intermediate block 46.

The feature data that is the output from the intermediate block 46 is then input to the first intermediate layer 48. The output from the first intermediate layer 48 is then input to the second intermediate layer 50.

The output from the second intermediate layer 50 is then input to the output layer 52. Left wrist direction data D8(u) corresponding to an estimation result of the direction of the left wrist at the timing is then output from the output layer 52 as the output 54.

Learning may be executed herein in advance by data indicating the angular speed of the left wrist made to correspond to a combination of the direction of the left hand, the angular speed of the left hand, and the position or speed of the left hand. In this case, the supervisory data contained in the learning data described above may be, for example, the data indicating the angular speed of the left wrist. In addition, the supervisory data may be generated in a similar manner as that described above on the basis of, for example, the sensing data output from each of the trackers 12 attached to the left hand and the left wrist of the user making various motions, and an image sequence containing t frames of the user making various motions captured from the external camera.

An angular speed of the left wrist node 42j may be then estimated. In this case, the data D8 depicted in FIGS. 6 and 7 corresponds to an estimation result of the angular speed of the left wrist node 42j.

Moreover, in the present embodiment, learning is executed for a similar machine learning model to the machine learning model depicted in FIGS. 6 and 7 by data indicating a direction of the right wrist made to correspond to a combination of a direction of the right hand, an angular speed of the right hand, and a speed of the right hand. In this case, the supervisory data contained in the learning data described above may be, for example, the data indicating the direction of the right wrist. In addition, the supervisory data may be generated in a similar manner as that described above on the basis of, for example, the sensing data output from each of the trackers 12 attached to the right hand and the right wrist of the user making various motions, and an image sequence containing t frames of the user making various motions captured from the external camera.

A direction of the right wrist node 42m using the learned machine learning model is then estimated. In this case, the data D8 depicted in FIGS. 6 and 7 corresponds to an estimation result of a direction of the right wrist node 42m.

Learning may be executed herein in advance by data indicating the angular speed of the right wrist made to correspond to a combination of the direction of the right hand, the angular speed of the right hand, and the position or speed of the right hand. In this case, the supervisory data contained in the learning data described above may be, for example, the data indicating the angular speed of the right wrist. In addition, the supervisory data may be generated in a similar manner as that described above on the basis of, for example, the sensing data output from each of the trackers 12 attached to the right hand and the right wrist of the user making various motions, and an image sequence containing t frames of the user making various motions captured from the external camera.

An angular speed of the right wrist node 42m may be then estimated. In this case, the data D8 depicted in FIGS. 6 and 7 corresponds to an estimation result of an angular speed of the right wrist node 42m.

As described above, in the present embodiment, the estimation of the directions or the angular speeds of the left wrist node 42j and the right wrist node 42m is executed.

In the present embodiment, the estimation of positions and directions of the other nodes 42 based on the estimation results described above is executed by inverse kinematics.

In the present embodiment, the positions and the directions of the nodes 42 included in the skeleton model 40 are estimated without user's having the tracker 12 attached to the chest or the lumbar. Furthermore, in the present embodiment, the direction of the left wrist node 42j and the direction of the right wrist node 42m are estimated from the data indicating the positions or directions of a limited number of trackers 12. The positions of the other nodes 42 which are, for example, positions of the left elbow node 42i and the right elbow node 42l can be then accurately estimated by the inverse kinematics on the basis of results of the estimation. As described above, according to the present embodiment, it is possible to perform accurate body tracking without user's having many trackers 12 attached thereto. Specifically, it is possible to perform accurate body tracking without user's having the trackers 12 attached to, for example, the chest, the lumbar, and the wrists.

Functions of the entertainment apparatus 14 according to the present embodiment and processing executed in the entertainment apparatus 14 will be further described.

Figure 8:
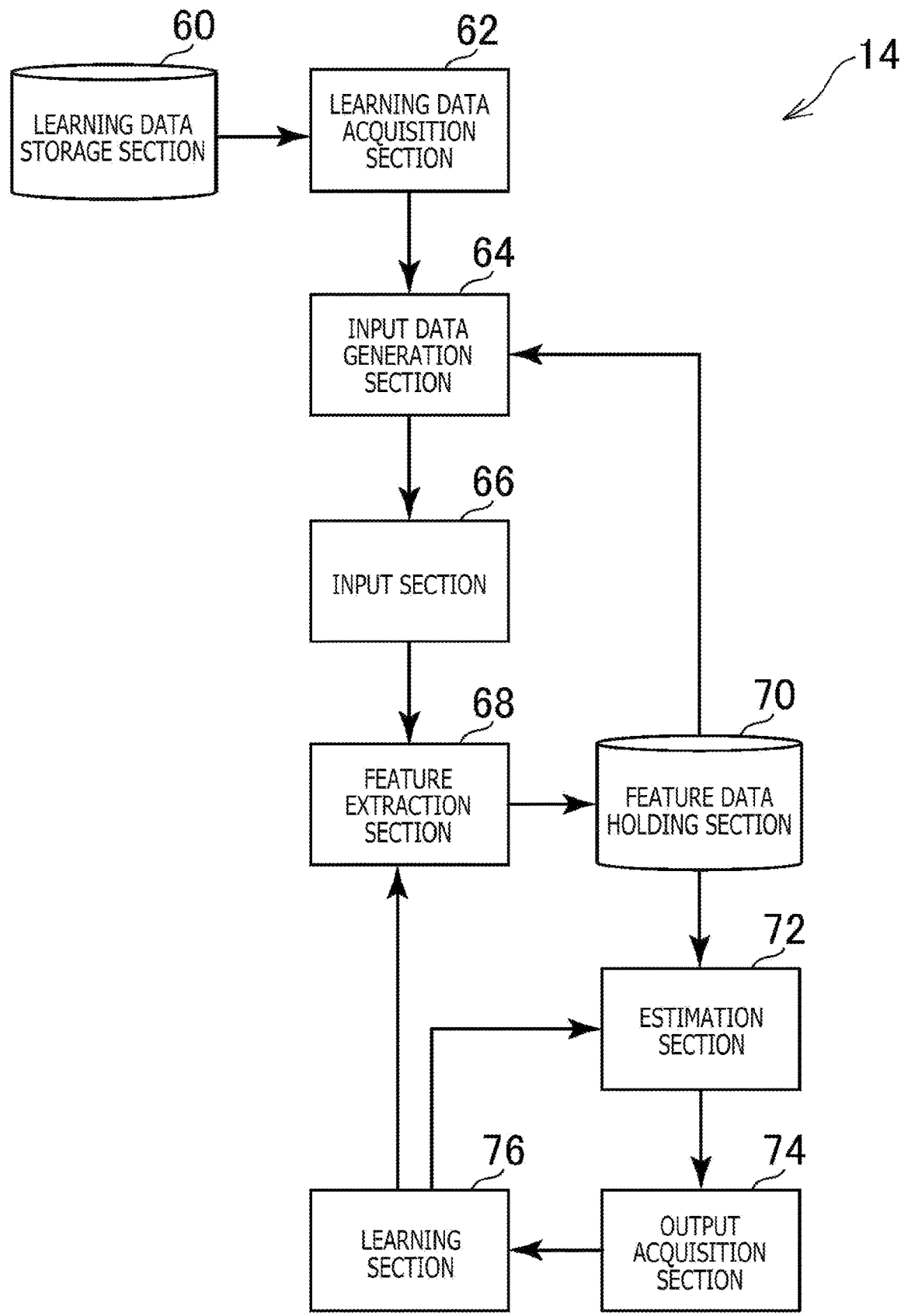
FIG. 8 is a functional block diagram depicting an example of functions implemented by the entertainment apparatus according to one embodiment of the present invention.

FIG. 8 is a functional block diagram depicting an example of functions, as a learning apparatus that executes learning of machine learning models, implemented in the entertainment apparatus 14 according to the present embodiment. It is noted that the entertainment apparatus 14 according to the present embodiment does not necessarily implement therein all functions depicted in FIG. 8 and may implement therein functions other than those depicted in FIG. 8.

As depicted in FIG. 8, the entertainment apparatus 14 serving as the learning apparatus functionally includes, for example, a learning data storage section 60, a learning data acquisition section 62, an input data generation section 64, an input section 66, a feature extraction section 68, a feature data holding section 70, an estimation section 72, an output acquisition section 74, and a learning section 76.

Figure 9:
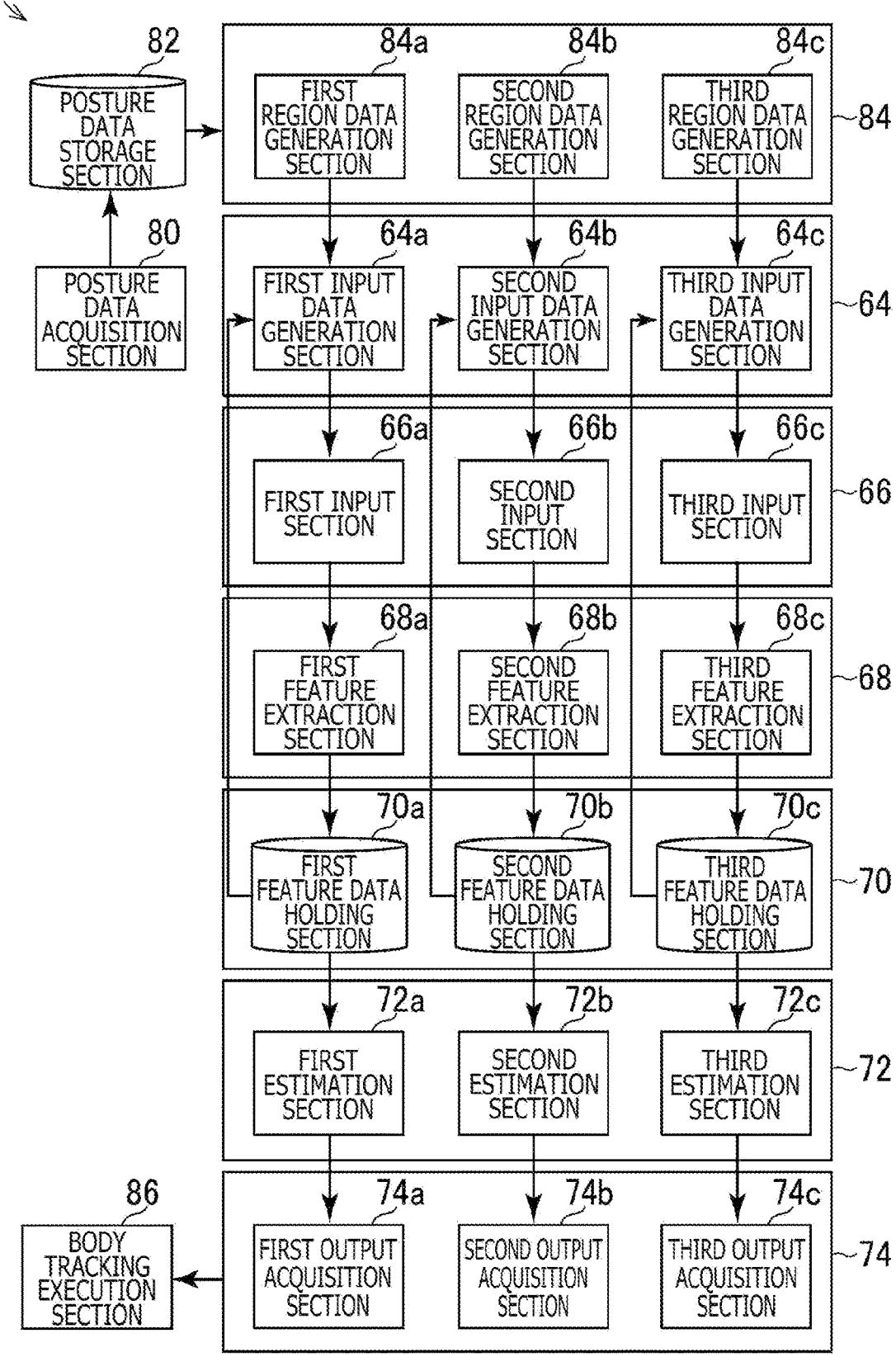
FIG. 9 is a functional block diagram depicting an example of functions implemented by the entertainment apparatus according to one embodiment of the present invention.

FIG. 9 is a functional block diagram depicting an example of functions, as an estimation apparatus executing estimation using learned machine learning models, implemented in the entertainment apparatus 14 according to the present embodiment. It is noted that the entertainment apparatus 14 according to the present embodiment does not necessarily implement therein all functions depicted in FIG. 9 and may implement therein functions other than those depicted in FIG. 9.

As depicted in FIG. 9, the entertainment apparatus 14 serving as the estimation apparatus functionally includes, for example, a posture data acquisition section 80, a posture data storage section 82, a region data generation section 84, the input data generation section 64, the input section 66, the feature extraction section 68, the feature data holding section 70, the estimation section 72, the output acquisition section 74, and a body tracking execution section 86.

The region data generation section 84 depicted in FIG. 9 includes a first region data generation section 84a, a second region data generation section 84b, and a third region data generation section 84c. Furthermore, the input data generation section 64 includes a first input data generation section 64a, a second input data generation section 64b, and a third input data generation section 64c. Moreover, the input section 66 includes a first input section 66a, a second input section 66b, and a third input section 66c. The feature extraction section 68 includes a first feature extraction section 68a, a second feature extraction section 68b, and a third feature extraction section 68c. Furthermore, the feature data holding section 70 includes a first feature data holding section 70a, a second feature data holding section 70b, and a third feature data holding section 70c. Moreover, the estimation section 72 includes a first estimation section 72a, a second estimation section 72b, and a third estimation section 72c. Further, the output acquisition section 74 includes a first output acquisition section 74a, a second output acquisition section 74b, and a third output acquisition section 74c.

The learning data storage section 60, the feature data holding section 70, and the posture data storage section 82 are implemented mainly in the storage section 32. The learning data acquisition section 62, the input data generation section 64, the input section 66, the output acquisition section 74, the learning section 76, the region data generation section 84, and the body tracking execution section 86 are implemented mainly in the processor 30. The posture data acquisition section 80 is implemented mainly in the processor 30 and the input/output section 36. The feature extraction section 68 and the estimation section 72 are implemented mainly in the processor 30 and the storage section 32.

The functions described above may be implemented by causing the processor 30 to execute a program that is installed into the entertainment apparatus 14, which is a computer, and that includes commands corresponding to the functions described above. This program may be supplied to the entertainment apparatus 14, for example, via a computer readable information storage medium such as an optical disk, a magnetic disk, a magnetic tape, a magneto-optical disk, or a flash memory, or via the Internet.

The functions of the entertainment apparatus 14 associated with the learning of the machine learning model will be described hereinafter with reference to FIG. 8.

The learning data storage section 60 stores, for example, a plurality of pieces learning data in the present embodiment. As described above, each learning data contains herein a plurality of pieces region data made to correspond to respective timings which are different from one another and each indicating the position, the posture, or the motion about any of the regions of the body at each timing. The learning data may also contain the supervisory data made to correspond to the region data made to correspond to the last timing.

The learning data acquisition section 62 acquires, for example, the learning data stored in the learning data storage section 60 and containing the plurality of pieces of region data in the present embodiment.

The input data generation section 64 generates, for example, input data input to the feature extraction section 68 in the present embodiment. As described above, the input data contains herein the region data described above and the feature data indicating the feature of the time-series transition of the position, the posture, or the motion about any of the regions of the body.

The input section 66 inputs, for example, the input data generated by the input data generation section 64 to the feature extraction section 68 in the present embodiment. The input section 66 inputs herein the input data containing, for example, the region data and the feature data output from the feature extraction section 68 in response to an immediately preceding input to the feature extraction section 68 sequentially in chronological order of the corresponding timings.

The feature extraction section 68 outputs, for example, new feature data in response to an input of the input data in the present embodiment. For example, the intermediate block 46 depicted in FIGS. 4 to 7 corresponds to the feature extraction section 68. As described above, the input data containing the region data and the feature data previously output from the feature extraction section 68 and indicating the feature of the time-series transition described above is input to the feature extraction section 68 sequentially in chronological order of timings. The feature extraction section 68 then outputs the feature data indicating the feature of the time-series transition described above until the timing in response to the input.

The feature data holding section 70 holds, for example, the feature data output from the feature extraction section 68 in the present embodiment. In the present embodiment, the feature data held in the feature data holding section 70 is used herein as the feature data contained in input data input to the feature extraction section 68 next.

The estimation section 72 estimates, in the present embodiment, for example, a position, a posture, or a motion of the other region of the body closer to a center of the body than any of the regions about which the feature data indicates the feature of the time-series transition of the position, the posture, or the motion, on the basis of the feature data. For example, the feature data indicating the feature of the time-series transition described above until the latest timing is input to the estimation section 72. The estimation section 72 then outputs an estimation result of the position, the posture, or the motion of the other region of the body closer to the center of the body than any of the regions about which the region data indicates the position, the posture, or the motion in response to an input of the feature data. For example, the first intermediate layer 48, the second intermediate layer 50, and the output layer 52 depicted in FIGS. 4 to 7 correspond to the estimation section 72.

An estimated value of the position, the posture, or the motion such as an estimated value of the direction (combination of the pitch angle, the yaw angle, and the roll angle) and an estimated value of the angular speed may be output herein as the estimation result. Alternatively, a score value that forms the basis of calculation of the estimated value of the position, the posture, or the motion may be output as the estimation result.

The output acquisition section 74 acquires, for example, the estimation result output from the estimation section 72 in the present embodiment.

The learning section 76 executes learning of, in the present embodiment, for example, at least one of the feature extraction section 68 or the estimation section 72 on the basis of the estimation result acquired by the output acquisition section 74. For example, the learning of only the estimation section 72 may be executed herein without executing the learning of the feature extraction section 68. In this case, parameter values of the feature extraction section 68 are not updated. Alternatively, for example, the learning of only the feature extraction section 68 may be executed without executing the learning of the estimation section 72. In this case, parameter values of the estimation section 72 are not updated. In another alternative, the learning of both the feature extraction section 68 and the estimation section 72 may be executed.

For example, learning (for example, update of the parameter values) may be executed herein once on the basis of the plurality of pieces of region data contained in one learning data. The learning may be then executed a plurality of times by executing the learning of each of the plurality of pieces of learning data.

In the present embodiment, the learning of the machine learning model that estimates the direction of the chest is executed by the region data containing, for example, the head direction data D1 indicating the direction of the head, the left hand angular speed data D2 indicating the angular speed of the left hand, and the right hand angular speed data D3 indicating the angular speed of the right hand. The feature extraction section 68 that is a learned machine learning model generated in this way is used as the first feature extraction section 68a depicted in FIG. 9. Furthermore, the estimation section 72 that is a learned machine learning model generated in this way is used as the first estimation section 72a depicted in FIG. 9.

Moreover, the learning of the machine learning model for estimating the direction of the left wrist is executed by the region data containing the left hand direction data D5 indicating the direction of the left hand, the left hand angular speed data D6 indicating the angular speed of the left hand, and the left hand speed data D7 indicating the speed of the left hand. The feature extraction section 68 that is a learned machine learning model generated in this way is used as the second feature extraction section 68*b* depicted in FIG. 9. Furthermore, the estimation section 72 that is a learned machine learning model generated in this way is used as the first estimation section 72*b* depicted in FIG. 9.

Moreover, the learning of the machine learning model for estimating the direction of the right wrist is executed by the region data containing the data indicating the direction of the right hand, the data indicating the angular speed of the right hand, and the data indicating the speed of the right hand. The feature extraction section 68 that is a learned machine learning model generated in this way is used as the second feature extraction section 68*c* depicted in FIG. 9. Furthermore, the estimation section 72 that is a learned machine learning model generated in this way is used as the first estimation section 72*c* depicted in FIG. 9.

The functions of the entertainment apparatus 14 associated with the estimation of the position, the posture, or the motion of any of the regions of the body will be described hereinafter with reference to FIG. 9.

The posture data acquisition section 80 acquires, for example, posture data indicating the positions and the directions of the trackers 12*a* to 12*e* identified at the predetermined sampling rate in the present embodiment. For example, the trackers 12 may generate herein the posture data indicating the positions and the directions of the trackers 12 at the predetermined sampling rate. The trackers 12 may then transmit the posture data generated by the trackers 12 to the entertainment apparatus 14 via the relay apparatus 16 in response to the generation. Alternatively, for example, the camera microphone unit 20 may generate the position data indicating the positions and the directions of the trackers 12*a* to 12*e* at the predetermined sampling rate. The camera microphone unit 20 may then transmit the posture data generated by the camera microphone unit 20 to the entertainment apparatus 14 in response to the generation.

The posture data storage section 82 stores, for example, the posture data acquired by the posture data acquisition section 80 in the present embodiment.

The first region data generation section 84*a* generates, for example, the region data contained in the input data input to the first feature extraction section 68*a* on the basis of the posture data stored in the posture data storage section 82 in the present embodiment. For example, the first region data generation section 84*a* generates herein the region data containing the head direction data D1 indicating the direction of the head, the left hand angular speed data D2 indicating the angular speed of the left hand, and the right hand angular speed data D3 indicating the angular speed of the right hand. The region data generated by the first region data generation section 84*a* in this way may be data indicating the positions, the postures, or the motions of a plurality of other regions (for example, the head, the left hand, and the right hand herein) included in the body.

The second region data generation section 84*b* generates, for example, the region data contained in the input data input to the second feature extraction section 68*b* on the basis of the posture data stored in the posture data storage section 82 in the present embodiment. For example, the second region data generation section 84*b* generates herein the region data containing the left hand direction data D5 indicating the direction of the left hand, the left hand angular speed data D6 indicating the angular speed of the left hand, and the left hand speed data D7 indicating the speed of the left hand. The region data generated by the second region data generation section 84*b* in this way may contain the data indicating the direction of the region (for example, the left hand herein) included in the body and the data indicating the angular speed of the region (for example, the left hand herein).

The third region data generation section 84*c* generates, for example, the region data contained in the input data input to the third feature extraction section 68*c* on the basis of the posture data stored in the posture data storage section 82 in the present embodiment. For example, the third region data generation section 84*c* generates herein the region data containing the data indicating the direction of the right hand, the data indicating the angular speed of the right hand, and the data indicating the speed of the right hand.

The input data generation section 64 generates, for example, the input data input to the feature extraction section 68 as described above in the present embodiment. The input data generation section 64 may generate herein the input data containing the region data at the latest timing and the feature data previously output from the feature extraction section 68 and indicating the feature of the time-series transition described above at a timing preceding the latest timing. The input data generation section 64 may generate herein, for example, the input data containing the region data and the feature data output from the feature extraction section 68 in response to an immediately preceding input. The first input data generation section 64*a* generates, for example, the input data input to the first feature extraction section 68*a*. Furthermore, the second input data generation section 64*b* generates, for example, the input data input to the second feature extraction section 68*b*. Moreover, the third input data generation section 64*c* generates, for example, the third feature extraction section 68*c*.

The input section 66 inputs, for example, the input data generated by the input data generation section 64 as described above to the feature extraction section 68 in the present embodiment. The first input section 66*a* inputs herein, for example, the input data generated by the first input data generation section 64*a* to the first feature extraction section 68*a*. Furthermore, the second input section 66*b* inputs, for example, the input data generated by the second input data generation section 64*b* to the second feature extraction section 68*b*. Moreover, the third input section 66*c* inputs, for example, the input data generated by the third input data generation section 64*c* to the third feature extraction section 68*c*.

The input data containing the region data at the latest timing and the feature data previously output from the feature extraction section 68 and indicating the feature of the time-series transition described above at the timing preceding the latest timing is then input to the feature extraction section 68. The feature extraction section 68 then outputs the feature data indicating the feature of the time-series transition described above until the latest timing, in response to the input. The first feature extraction section 68*a* outputs, for example, the feature data in response to the input of the input data by the first input section 66*a*. Furthermore, the second feature extraction section 68*b* outputs, for example, the feature data in response to the input of the input data by the second input section 66*b*. Moreover, the third feature extraction section 68*c* outputs, for example, the feature data in response to the input of the input data by the third input section 66*c*.

The first feature data holding section 70*a* then holds the feature data output from the first feature extraction section 68*a*. Furthermore, the second feature data holding section 70*b* holds the feature data output from the second feature extraction section 68*b*. Moreover, the third feature data holding section 70*c* holds the feature data output from the third feature extraction section 68*c*. In the present embodiment, the feature data held by the feature data holding section 70 is used herein as feature data contained in input data for next estimation.

The estimation section 72 estimates, for example, the position, the posture, or the motion of the other region of the body at the latest timing on the basis of the feature data indicating the feature of the time-series transition until the latest timing in the present embodiment. For example, the estimation section 72 estimates herein the position, the posture, or the motion of the other region of the body closer to the center of the body than the region about which the feature data indicates the feature of the time-series transition of the position, the posture, or the motion. The first estimation section 72*a* outputs, for example, an estimation result of the direction of the chest in response to an input of the feature data output from the first feature extraction section 68*a*. Furthermore, the second estimation section 72*b* outputs, for example, an estimation result of the direction of the left wrist in response to an input of the feature data output from the second feature extraction section 68*b*. Moreover, the third estimation section 72*c* outputs, for example, an estimation result of the direction of the right wrist in response to an input of the feature data output from the third feature extraction section 68*c*.

The output acquisition section 74 acquires, for example, the estimation result output from the estimation section 72 in the present embodiment. The first output acquisition section 74*a* acquires herein, for example, the estimation result output from the first estimation section 72*a*. Furthermore, the second output acquisition section 74*b* acquires, for example, the estimation result output from the second estimation section 72*b*. Moreover, the third output acquisition section 74*c* acquires, for example, the estimation result output from the third estimation section 72*c*.

In the skeleton model 40, the head node 42*a* and the chest node 42*f* are connected to each other via one link. Furthermore, in the skeleton model 40, the left hand node 42*b* and the chest node 42*f* are connected to each other via four links. Moreover, in the skeleton model 40, the right hand node 42*c* and the chest node 42*f* are connected to each other via four links. Furthermore, the chest node 42*f* is the node 42 closer to the center of the body than any of the head node 42*a*, the left hand node 42*b*, and the right hand node 42*c*. The first output acquisition section 74*a* then acquires, for example, the estimation result of the position, the posture, or the motion of the chest node 42*f* corresponding to the chest that is the region closer to the center of the body than any of the regions of the body about which the region data generated by the first region data generation section 84*a* indicates the position, the posture, or the motion.

Furthermore, in the skeleton model 40, the left hand node 42*b* and the left wrist node 42*j* are connected to each other via one link. Further, the left wrist node 42*j* is the node 42 closer to the center of the body than the left hand node 42*b*. The second output acquisition section 74*b* then acquires, for example, the estimation result of the position, the posture, or the motion of the left wrist node 42*j* corresponding to the left wrist that is the region closer to the center of the body than the region of the body about which the region data generated by the second region data generation section 84*b* indicates the position, the posture, or the motion.

Furthermore, the third output acquisition section 74*c* acquires, for example, the estimation result of the position, the posture, or the motion of the right wrist node 42*m* corresponding to the right wrist that is the region closer to the center of the body than the region of the body about which the region data generated by the third region data generation section 84*c* indicates the position, the posture, or the motion.

It is noted that the data output from the estimation section 72 and acquired by the output acquisition section 74 is not limited to the data indicating the direction or the angular speed (difference in direction) described above. For example, the estimation section 72 may output data indicating a speed (difference between positions), data indicating a position, data indicating an acceleration (difference between speeds), or data indicating an angular acceleration (difference between angular speeds). Moreover, the estimation section 72 may output data indicating a position, a posture, or a motion of a certain region relative to another region. More specifically, the estimation section 72 may output, for example, data indicating a difference between a direction of a hand and a direction of an arm (relative direction of the arm with reference to the direction of the hand).

The body tracking execution section 86 executes, in the present embodiment, for example, body tracking processing on the basis of the estimation result of the direction acquired by the output acquisition section 74 and the posture data acquired by the posture data acquisition section 80. For example, the body tracking execution section 86 executes herein the position and the direction of each of the plurality of nodes 42 included in the skeleton model 40. It is noted that the body tracking execution section 86 may execute the body tracking processing on the basis of the posture data stored in the posture data storage section 82.

For example, the position and the direction of the head node 42*a* may be determined herein on the basis of the posture data indicating the position and the direction of the tracker 12*a*. Furthermore, for example, the position and the direction of the left hand node 42*b* may be determined on the basis of the posture data indicating the position and the direction of the tracker 12*b*. Moreover, for example, the position and the direction of the right hand node 42*c* may be determined on the basis of the posture data indicating the position and the direction of the tracker 12*c*. Furthermore, for example, the position and the direction of the left foot node 42*d* may be determined on the basis of the posture data indicating the position and the direction of the tracker 12*d*. Moreover, for example, the position and the direction of the right foot node 42*e* may be determined on the basis of the posture data indicating the position and the direction of the tracker 12*e*.

Furthermore, the body tracking execution section 86 may estimate the positions of the nodes 42 that are not estimated and the directions of the nodes 42 that are not estimated by the inverse kinematics on the basis of the determined or estimated position or direction of the node 42.

It is considered that the direction of the node 42 corresponding to a region included in the body can be accurately estimated using a pattern of a temporal motion of rotation of the other node 42 connected to the node 42 via one or a plurality of links and farther from the center of the body than the region. In the present embodiment, therefore, the input data is designed to contain the region data indicating the position, the posture, or the motion of the region of the body at the latest timing and the feature data indicating the time-series transition of the position, the posture, or the motion about the region at the timing preceding the latest timing. The direction of the other region of the body closer to the center of the body than the region is then estimated on the basis of the input data.

Figure 10:
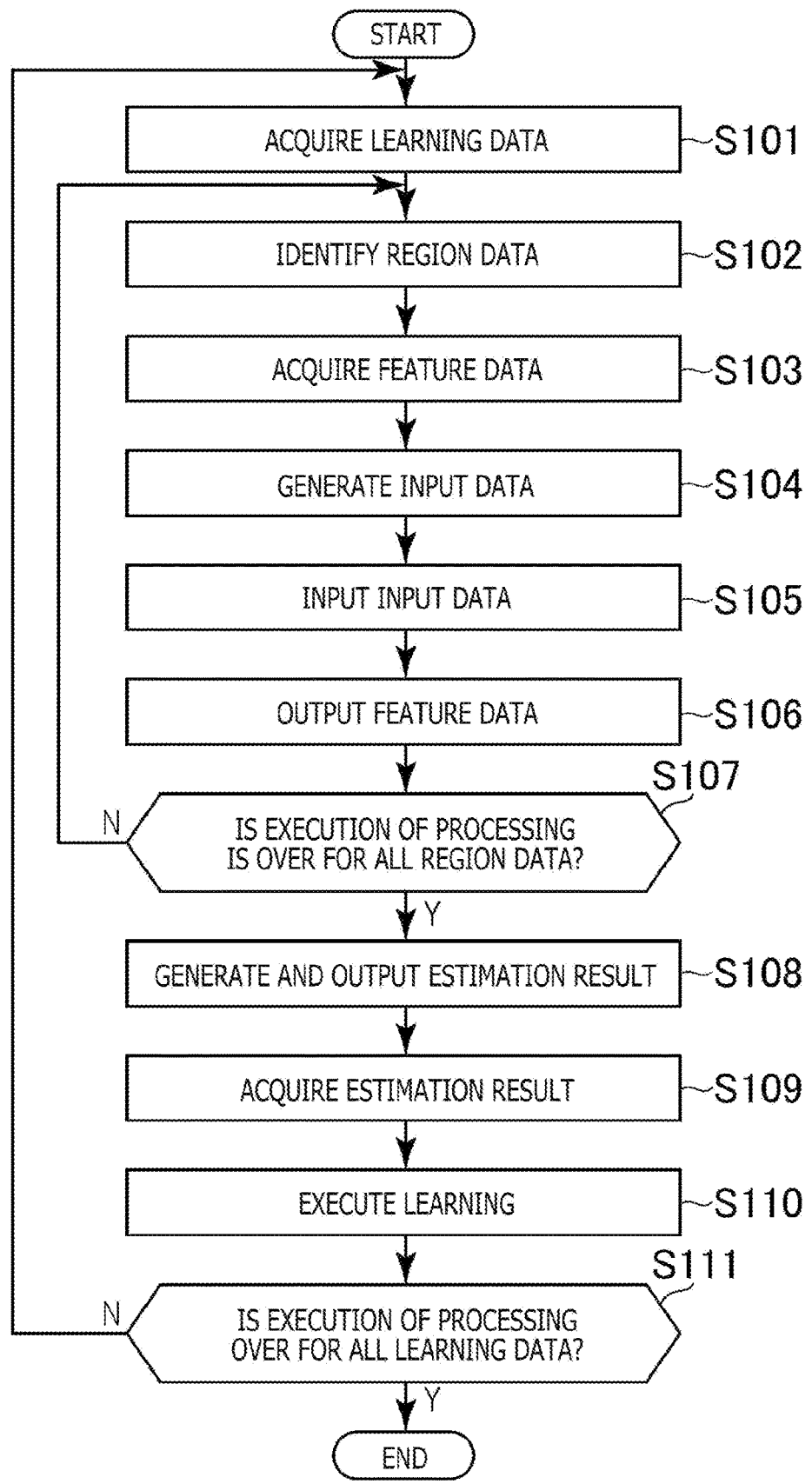
FIG. 10 is a flowchart depicting an example of a flow of processing performed by the entertainment apparatus according to one embodiment of the present invention.

An example of a flow of learning processing performed by the entertainment apparatus 14 according to the present embodiment will now be described herein with reference to a flowchart exemplarily depicted in FIG. 10. It is assumed that the learning data storage section 60 stores a plurality of pieces of learning data in the present processing example.

First, the learning data acquisition section 62 acquires one learning data on which processing depicted in S102 to S110 is not executed yet from among the learning data stored in the learning data storage section 60.

The input data generation section 64 then identifies the region data at the oldest corresponding timing among the region data contained in the learning data acquired in the processing illustrated in Step S101 and on which the processing illustrated in S103 to S106 is not executed yet (S102).

The input data generation section 64 then acquires feature data held in the feature data holding section 70 and output last from the feature extraction section 68 (S103). The feature data is feature data output from the feature extraction section 68 in response to an immediately preceding input.

The input data generation section 64 then generates input data by connecting the region data identified in the processing illustrated in S102 with the feature data acquired in the processing illustrated in S103 (S104). It is noted that the input data generation section 64 generates input data containing feature data to which predetermined initial values are set when no feature data is stored in the feature data holding section 70.

The input section 66 then inputs the input data generated in the processing illustrated in S104 to the feature extraction section 68 (S105).

The feature extraction section 68 then outputs the feature data in response to the input in the processing illustrated in S105 to the feature data holding section 70 (S106).

The estimation section 72 then confirms whether or not execution of the processing illustrated in S103 to S106 is over for all the region data contained in the learning data acquired in the processing illustrated in S101 (S107).

In a case in which execution of the processing illustrated in S103 to S106 is not over for all the region data contained in the learning data acquired in the processing illustrated in S101 (S107: N), the processing returns to the processing illustrated in S102.

On the other hand, it is assumed that execution of the processing illustrated in S103 to S106 is over for all the region data contained in the learning data acquired in the processing illustrated in S101 (S107: Y). In this case, the estimation section 72 generates and outputs an estimation result in response to the feature data held in the feature data holding section 70 and output last from the feature extraction section 68 (S108). The input section 66 may input herein, for example, the feature data output last from the feature extraction section 68 to the estimation section 72. The estimation section 72 may then output the estimation result in response to the input.

The output acquisition section 74 then acquires the estimation result output in the processing illustrated in S108 (S109).

The learning section 76 then executes learning of the feature extraction section 68 and the estimation section 72 on the basis of the estimation result acquired in the processing illustrated in S109 (S110). For example, parameter values set in the feature extraction section 68 and the estimation section 72 may be updated herein.

The learning section 76 then confirms whether or not execution of the processing illustrated in S102 to S110 is over for all the learning data stored in the learning data storage section 60 (S111).

In a case in which execution of the processing illustrated in S102 to S110 is not over for all the learning data stored in the learning data storage section 60 (S111: N), the processing returns to the processing illustrated in S101.

In a case in which execution of the processing illustrated in S102 to S110 is over for all the learning data stored in the learning data storage section 60 (S111: Y), the processing illustrated in the present processing example is ended.

In the present embodiment, the first feature extraction section 68a and the first estimation section 72a that are learned machine learning models are generated by executing the processing described above by the feature data containing the head direction data D1, the left hand angular speed data D2, and the right hand angular speed data D3. Furthermore, the second feature extraction section 68b and the second estimation section 72b that are learned machine learning models are generated by executing the processing described above by the region data containing the left hand direction data D5, the left hand angular speed data D6, and the left hand speed data D7. Moreover, the third feature extraction section 68c and the third estimation section 72c that are learned machine learning models are generated by executing the processing described above by the region data containing the right hand direction data, the right hand angular speed data, and the right hand speed data.

Next, an example of a flow of estimation processing for estimating the position and the direction of each of all nodes 42 included in the skeleton model 40, performed by the entertainment apparatus 14 according to the present embodiment will be described with reference to a flowchart exemplarily depicted in FIG. 11.

First, the posture data acquisition section 80 acquires posture data generated by each tracker 12 and indicating the position and the direction of the tracker 12 at the latest specific timing, and stores the posture data in the posture data storage section 82 (S201). The posture data acquisition section 80 acquires herein, for example, the posture data indicating the position and the direction of each of the trackers 12 about each of the trackers 12a to 12e.

The region data generation section 84 then generates region data on the basis of the posture data stored in the posture data storage section 82 (S202). In the processing illustrated in S202, the first region data generation section 84a generates, for example, the region data contained in the input data input to the first feature extraction section 68a. Furthermore, the second region data generation section 84b generates the region data contained in the input data input to the second feature extraction section 68b. Moreover, the third region data generation section 84c generates the region data contained in the input data input to the third feature extraction section 68c.

The input data generation section 64 then acquires feature data held in the feature data holding section 70 and output last from the feature extraction section 68 (S203). The feature data is feature data output from the feature extraction section 68 in response to an immediately preceding input. In the processing illustrated in S203, the first input data generation section 64a acquires, for example, the feature data held in the first feature data holding section 70a and output last from the first feature extraction section 68a. Furthermore, the second input data generation section 64b acquires the feature data held in the second feature data holding section 70b and output last from the second feature extraction section 68b. Moreover, the third input data generation section 64c acquires the feature data held in the third feature data holding section 70c and output last from the third feature extraction section 68c.

The input data generation section 64 then generates input data by connecting the region data generated in the processing illustrated in S202 with the feature data acquired in the processing illustrated in S203 (S204). It is noted that the input data generation section 64 generates input data containing feature data to which predetermined initial values are set when no feature data is stored in the feature data holding section 70. In the processing illustrated in S204, the first input data generation section 64a generates, for example, the input data input to the first feature extraction section 68a. Furthermore, the second input data generation section 64b generates the input data input to the second feature extraction section 68b. Moreover, the third input data generation section 64c generates the input data input to the third feature extraction section 68c.

The input section 66 then inputs the input data generated in the processing illustrated in S204 to the feature extraction section 68 (S205). In the processing illustrated in S205, the first input section 66a inputs, for example, the input data generated by the first input data generation section 64a to the first feature extraction section 68a. Furthermore, the second input section 66b inputs the input data generated by the second input data generation section 64b to the second feature extraction section 68b. Moreover, the third input section 66c inputs the input data generated by the third input data generation section 64c to the third feature extraction section 68c.

The feature extraction section 68 then outputs the feature data in response to the input in the processing illustrated in S205 to the feature data holding section 70 (S206). In the processing illustrated in S206, the first feature extraction section 68a outputs, for example, the feature data in response to the region data generated by the first region data generation section 84a to the first feature data holding section 70a. Furthermore, the second feature extraction section 68b outputs the feature data in response to the region data generated by the second region data generation section 84b to the second feature data holding section 70b. Moreover, the third feature extraction section 68c outputs the feature data in response to the region data generated by the third region data generation section 84c to the third feature data holding section 70c.

The estimation section 72 then generates and outputs an estimation result in response to the feature data that is the feature data output to the feature data holding section 70 in the processing illustrated in S206 and that is held in the feature data holding section 70 and output last from the feature extraction section 68 (S207). The input section 66 may input herein, for example, the feature data output last from the feature extraction section 68 to the estimation section 72. The estimation section 72 may then output the estimation result in response to the input. In the processing illustrated in S207, the first estimation section 72a generates and outputs, for example, the estimation result of the direction of the chest node 42f in response to the feature data output to the first feature data holding section 70a in the processing illustrated in S206. Furthermore, the second estimation section 72b generates and outputs the estimation result of the direction of the left wrist node 42j in response to the feature data output to the second feature data holding section 70b in the processing illustrated in S206. Moreover, the third estimation section 72c generates and outputs the estimation result of the direction of the right wrist node 42m in response to the feature data output to the third feature data holding section 70c in the processing illustrated in S206.

The output acquisition section 74 then acquires the estimation result output in the processing illustrated in S207 (S208). In the processing illustrated in S208, the first output acquisition section 74a acquires, for example, the estimation result of the direction of the chest node 42f output from the first estimation section 72a in the processing illustrated in S207. Furthermore, the second output acquisition section 74b acquires the estimation result of the direction of the left wrist node 42j output from the second estimation section 72b in the processing illustrated in S207. Moreover, the third output acquisition section 74c acquires the estimation result of the direction of the right wrist node 42m output from the third estimation section 72c in the processing illustrated in S207.

The body tracking execution section 86 then determines positions and directions of the head node 42a, the left hand node 42b, the right hand node 42c, the left foot node 42d, and the right foot node 42e in the present cycle (S209). The body tracking execution section 86 may determine herein, for example, the positions and the directions of the head node 42a, the left hand node 42b, the right hand node 42c, the left foot node 42d, and the right foot node 42e on the basis of the posture data acquired in the processing illustrated in S201.

The body tracking execution section 86 then estimates the positions and the directions of the remaining nodes 42 for which determination or acquisition of the estimation result is not performed in the processing illustrated in S208 and S209 among the positions and the directions of the nodes 42 included in the skeleton model 40 by the inverse kinematics (S210).

As described above, the estimation of the positions of the directions of all nodes 42 included in the skeleton model 40 in one cycle is executed. The processing then returns to the processing illustrated in S201.

In the processing illustrated in the processing examples described above, orders of executing steps are not limited to those described above.

It is noted that the first feature extraction section 68a and the first estimation section 72a may be machine learning models used for the estimation of not the direction of the chest node 42f as described above but the direction of the lumbar node 42g. In this case, the first output acquisition section 74a may acquire an estimation result of the direction of the lumbar node 42g.

<Example of Estimation of Rotation of Chest Node>

Furthermore, in the present embodiment, estimation of factors other than those described above may be executed using a machine learning model.

For example, only a rotation (Roll) of the chest with respect to the reference direction (for example, vertical direction) may be estimated as estimation of the direction of the chest.

Figure 12:
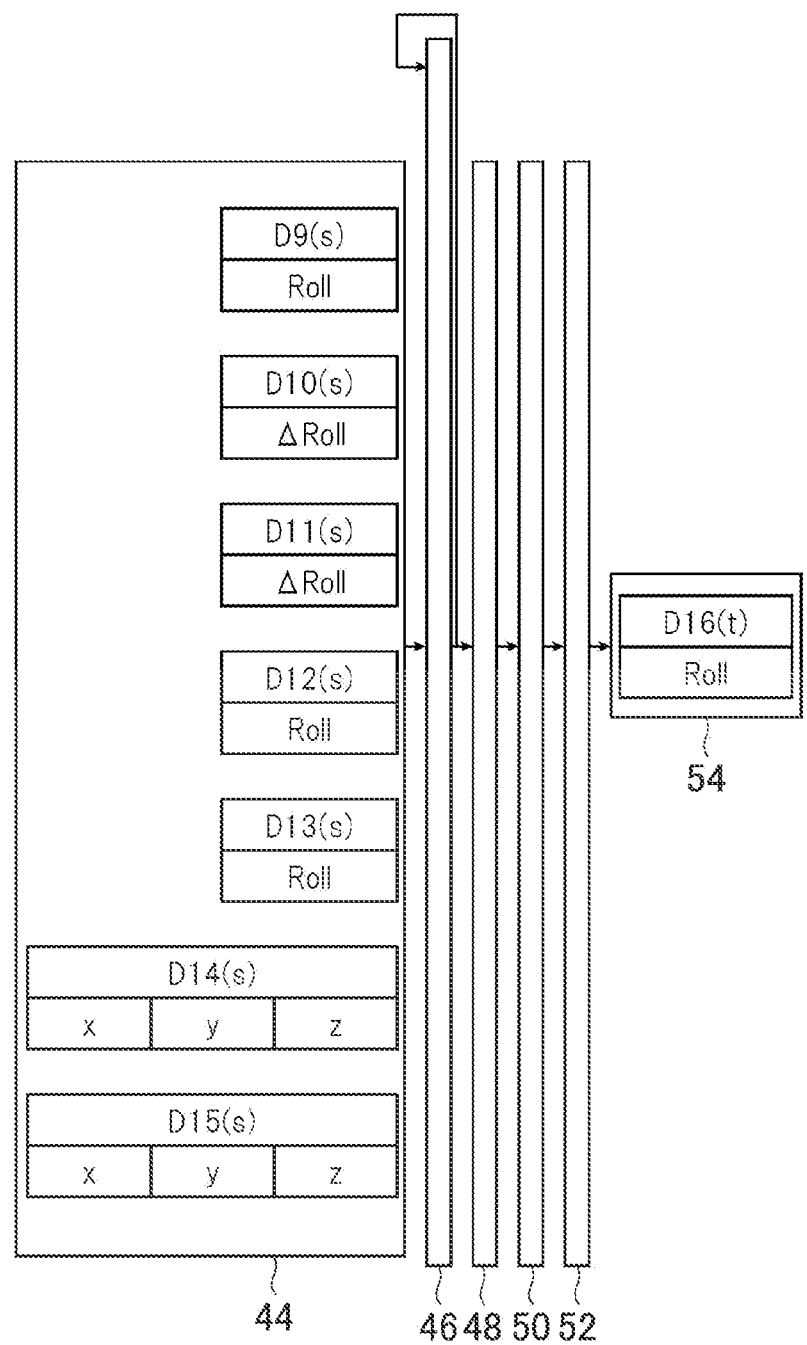
FIG. 12 is a diagram depicting an example of learning of a machine learning model used in estimation of rotation of the chest node.

FIG. 12 is a diagram depicting an example of learning of a machine learning model used in estimation of a rotation (Roll) of the chest node 42f. As depicted in FIG. 12, the machine learning model used in the estimation of the rotation of the chest node 42f includes the input layer 44, the intermediate block 46, the first intermediate layer 48, the second intermediate layer 50, and the output layer 52.

In the present embodiment, in learning of the machine learning model depicted in FIG. 12, learning data containing, for example, t pieces of region data made to correspond to respective timings which are different from one another and each indicating a rotation of the head, an angular speed of a rotation component of the right hand, an angular speed of a rotation component of the left hand, a rotation of the right foot, a rotation of the left foot, a position of the head based on a position of the right hand, and a position of the head based on a position of the left hand at the corresponding timing, and supervisory data is acquired.

For example, the supervisory data may be herein data indicating, for example, a rotation of the chest. In addition, the supervisory data may be generated in a similar manner as that described above on the basis of, for example, the sensing data output from each of the trackers 12 attached to the head, the right hand, the left hand, the right foot, the left foot, and the chest of the user making various motions, and an image sequence containing t frames of the user making various motions captured from the external camera.

As described above, the t pieces of region data contained in the learning data are then sequentially input to the input layer 44 in chronological order of the corresponding timings. It is assumed herein that each region data contains, for example, head rotation data D9 indicating the rotation of the head, right hand rotation angular speed data D10 indicating the angular speed of the rotation component of the right hand, right hand rotation angular speed data D11 indicating the angular speed of the rotation component of the left hand, right foot rotation data D12 indicating the rotation of the right foot, left foot rotation data D13 indicating the rotation of the left foot, right-hand-based head position data D14 indicating the position of the head based on the position of the right hand, and left-hand-based head position data D15 indicating the position of the head based on the position of the left hand.

Pieces of data D9 to D15 at the corresponding timing that is the s-th oldest are herein expressed as, for example, D9($s$) to D15($s$), respectively, similarly to the data described above. A value s is herein an integer equal to or greater than 1 and equal to or smaller than t.

Furthermore, in the present embodiment, as depicted in FIG. 12, the head rotation data D9($s$), the right foot rotation data D12($s$), and the left foot rotation data D13($s$) each contain one element (a roll angle (Roll)). Furthermore, the right hand rotation angular speed data D10($s$) and the right hand rotation angular speed data D11($s$) each contain one element (a roll angular speed ($\Delta$Roll)). The roll angular speed corresponds to a difference between the roll angles with respect to the reference direction described above between two continuous timings. It is noted that values of the Roll and $\Delta$Roll may be real numbers adjusted to fall in a range from $-2\pi$ to $2\pi$.

Moreover, in the present embodiment, as depicted in FIG. 12, the right-hand-based head rotation data D14($s$) contains three elements that are x, y, and z. The three elements correspond to an x coordinate value, a y coordinate value, and a z coordinate value, respectively of the position of the head based on the position of the right hand. Moreover, the left-hand-based head rotation data D15($s$) contains three elements that are x, y, and z. The three elements correspond to an x coordinate value, a y coordinate value, and a z coordinate value, respectively of the position of the head based on the position of the left hand.

In the present embodiment, the pieces of region data containing eleven elements described above are input to the input layer 44.

As described above, chest rotation data D16($t$) corresponding to an estimation result of the rotation of the chest at the latest timing (t-th timing) is then finally output from the output layer 52 as the output 54. As depicted in FIG. 12, the chest rotation data D16($t$) contains one element (a roll angle (Roll)). The roll angle corresponds to, for example, a roll angle with respect to the reference direction described above.

It is noted that the supervisory data described above also contains, for example, one element (a roll angle (Roll)) similarly to the chest rotation data D16($t$).

In the present embodiment, learning of the intermediate block 46, the first intermediate layer 48, the second intermediate layer 50, and the output layer 52 is then executed on the basis of, for example, the chest rotation data D16($t$) indicating the estimation result. A difference between, for example, the supervisory data contained in the learning data that contains the series of region data described above and the chest rotation data D16($t$) indicating the estimation result may be identified herein. Supervised learning for updating values of parameters of the intermediate block 46, the first intermediate layer 48, the second intermediate layer 50, and the output layer 52 may be then executed on the basis of the identified difference.

In the present embodiment, learning is performed by, for example, the learning data containing the t pieces of region data from the first region data to the t-th region data. Learning may be performed herein by, for example, the learning data containing the t pieces of region data from the first region data to the t-th region data and the supervisory data made to correspond to the t-th region data. The estimation of the rotation of the chest node 42$f$ is then executed using the learned machine learning model completed with the learning by, for example, a plurality of pieces of different learning data.

Figure 13:
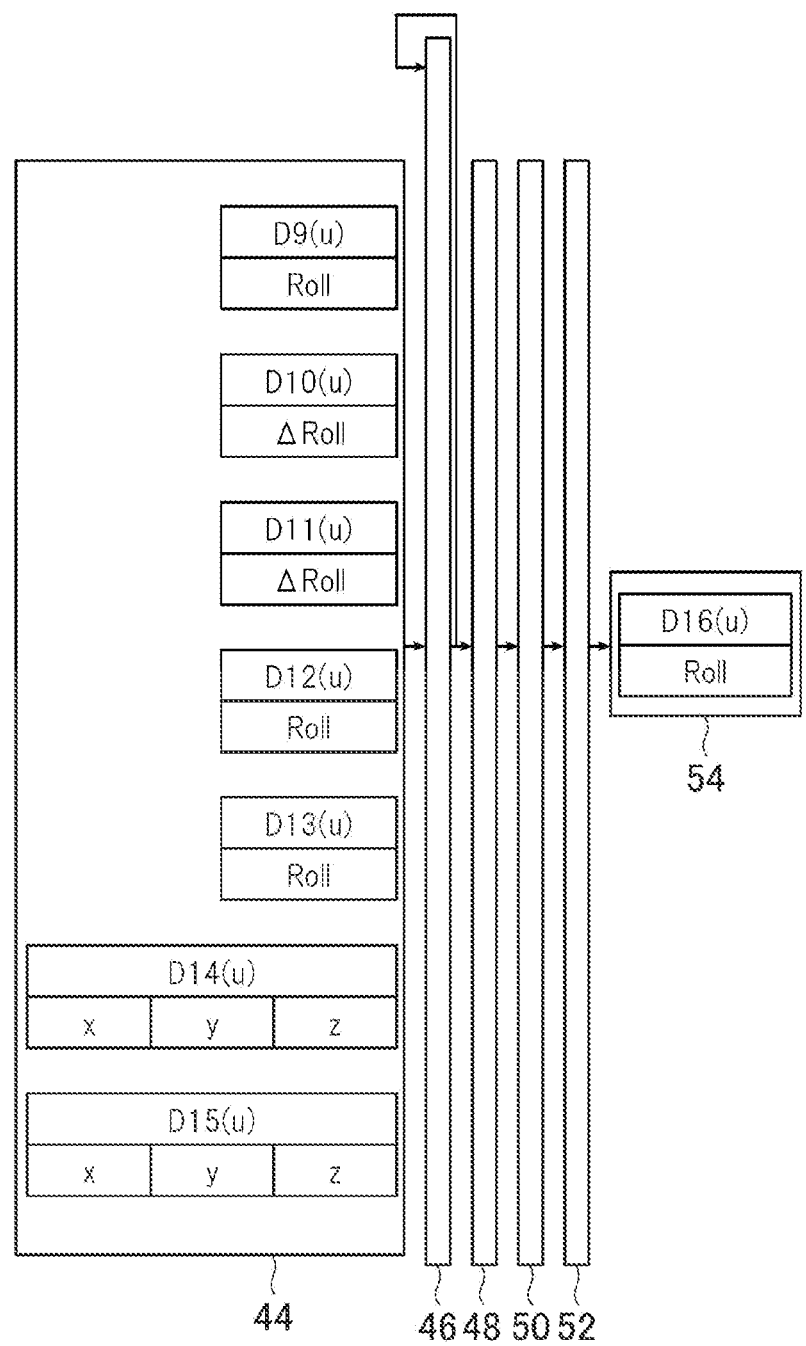
FIG. 13 is a diagram depicting an example of estimation of rotation of the chest node using the machine learning model depicted in FIG. 12.

FIG. 13 is a diagram depicting an example of the estimation of the rotation of the chest node 42$f$ using the learned machine learning model.

It is assumed herein that region data is generated on the basis of the data indicating the transmitted position and the transmitted direction of each tracker 12. It is assumed that each region data contains the head rotation data D9 indicating the rotation of the head, the right hand rotation angular speed data D10 indicating the angular speed of the rotation component of the right hand, the right hand rotation angular speed data D11 indicating the angular speed of the rotation component of the left hand, the right foot rotation data D12 indicating the rotation of the right foot, the left foot rotation data D13 indicating the rotation of the left foot, the right-hand-based head position data D14 indicating the position of the head based on the position of the right hand, and the left-hand-based head position data D15 indicating the position of the head based on the position of the left hand. For example, the difference between the value of data indicating the direction at a timing immediately preceding a specific timing and the value of data indicating the direction at the specific timing may be used herein as the value indicating the angular speed at the specific timing. Furthermore, as described above, in the present embodiment, the region data is repeatedly generated.

In the present embodiment, the latest region data (last generated region data), for example, is input to the input layer 44. In FIG. 13, pieces of data D9 to D15 contained in the latest region data are expressed as D9($u$) to D15($u$), respectively.

As described above, the head rotation data D9($u$), the right foot rotation data D12($u$), and the left foot rotation data D13($u$) each contain one element (a roll angle (Roll)). Furthermore, the right hand rotation angular speed data D10($u$) and the right hand rotation angular speed data D11($u$) each contain one element (a roll angular speed ($\Delta$Roll)). The roll angular speed corresponds to a difference between the roll angles with respect to the reference direction described above between two continuous timings. It is noted that values of the Roll and ΔRoll may be real numbers adjusted to fall in a range from −2π to 2π.

Furthermore, in the present embodiment, as depicted in FIG. 13, the right-hand-based head position data D14(*u*) contains three elements that are x, y, and z. The three elements correspond to an x coordinate value, a y coordinate value, and a z coordinate value, respectively of the position of the head based on the position of the right hand. Moreover, the left-hand-based head position data D15(*u*) contains three elements that are x, y, and z. The three elements correspond to an x coordinate value, a y coordinate value, and a z coordinate value, respectively of the position of the head based on the position of the left hand.

As described above, chest rotation data D16(*u*) corresponding to an estimation result of the rotation of the chest at the timing is then finally output from the output layer 52 as the output 54.

<Different Example of Estimation of Direction of Wrist>

Furthermore, in the present embodiment, the direction of the wrist may be estimated by a method different from the method described above.

Figure 14:
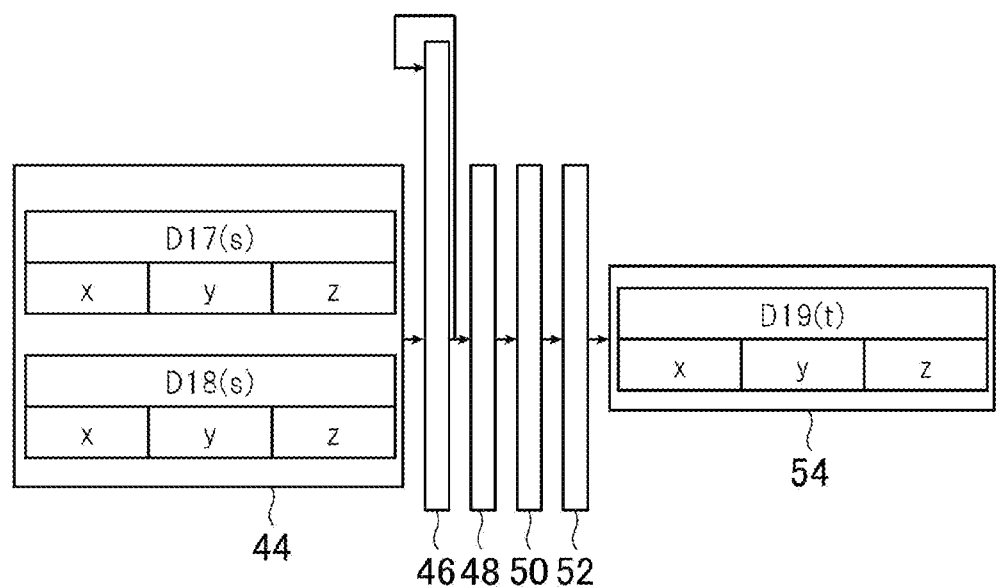
FIG. 14 is a diagram depicting an example of learning of a machine learning model used in estimation of a direction of the left wrist node.

FIG. 14 is a diagram depicting an example of learning of a machine learning model used in estimation of the direction of the left wrist node 42*j*. As depicted in FIG. 14, the machine learning model used in the estimation of the direction of the left wrist node 42*j* includes the input layer 44, the intermediate block 46, the first intermediate layer 48, the second intermediate layer 50, and the output layer 52.

In the present embodiment, in learning of the machine learning model depicted in FIG. 14, learning data containing, for example, t pieces of region data made to correspond to respective timings which are different from one another and each indicating a position of the chest based on the position of the left hand and a direction of the left hand, both of which are offset by the rotation of the chest (chest node 42*f*) (based on the rotation of the chest), at the corresponding timing, and supervisory data is acquired.

For example, the supervisory data may be herein data indicating, for example, the direction of the wrist. In addition, the supervisory data may be generated in a similar manner as that described above on the basis of, for example, the sensing data output from each of the trackers 12 attached to the left hand, the left wrist, and the chest of the user making various motions, and an image sequence containing t frames of the user making various motions captured from the external camera.

As described above, the t pieces of region data contained in the learning data are then sequentially input to the input layer 44 in chronological order of the corresponding timings. It is assumed herein that each region data contains, for example, left-hand-based chest position data D17 indicating the position of the chest based on the position of the left hand and offset by the rotation of the chest (chest node 42*f*), and left hand direction data D18 indicating the direction of the left hand offset by the rotation of the chest (chest node 42*f*).

In FIG. 14, pieces of data D17 and D18 at the corresponding timing that is the s-th oldest are expressed herein as, for example, D17(*s*) and D18(*s*), respectively, similarly to the data described above. A value s is herein an integer equal to or greater than 1 and equal to or smaller than t.

Moreover, in the present embodiment, as depicted in FIG. 14, the left-hand-based chest position data D17(*s*) contains three elements that are x, y, and z. The three elements correspond to an x coordinate value, a y coordinate value, and a z coordinate value, respectively of the position of the chest based on the position of the left hand and offset by the rotation of the chest (chest node 42*f*). Moreover, the left hand direction data D18(*s*) contains three elements that are x, y, and z. The three elements correspond to an x coordinate value, a y coordinate value, and a z coordinate value, respectively of a unit vector representing the direction of the left hand offset by the rotation of the chest (chest node 42*f*).

In the present embodiment, the pieces of region data containing six elements described above are input to the input layer 44.

Left wrist direction data D19(*t*) corresponding to an estimation result of the direction of the left wrist at the latest timing (t-th timing) is then finally output from the output layer 52 as the output 54 as described above. As depicted in FIG. 14, the left wrist direction data D19(*t*) contains three elements that are x, y, and z. The three elements correspond to an x coordinate value, a y coordinate value, and a z coordinate value, respectively of a unit vector representing the direction of the left wrist.

It is noted that the supervisory data described above also contains, for example, three elements that are x, y, and z for the left wrist direction data D19(*t*).

In the present embodiment, learning of the intermediate block 46, the first intermediate layer 48, the second intermediate layer 50, and the output layer 52 is then executed on the basis of, for example, the left wrist direction data D19(*t*) indicating the estimation result. A difference between, for example, the supervisory data contained in the learning data that contains the series of region data described above and the left wrist direction data D19(*t*) indicating the estimation result may be identified herein. Supervised learning for updating values of parameters of the intermediate block 46, the first intermediate layer 48, the second intermediate layer 50, and the output layer 52 may be then executed on the basis of the identified difference.

In the present embodiment, learning is performed by, for example, the learning data containing the t pieces of region data from the first region data to the t-th region data. Learning may be performed herein by, for example, the learning data containing the t pieces of region data from the first region data to the t-th region data and the supervisory data made to correspond to the t-th region data. The estimation of the direction of the left wrist node 42*j* is then executed using the learned machine learning model completed with learning by, for example, a plurality of pieces of different learning data.

Figure 15:
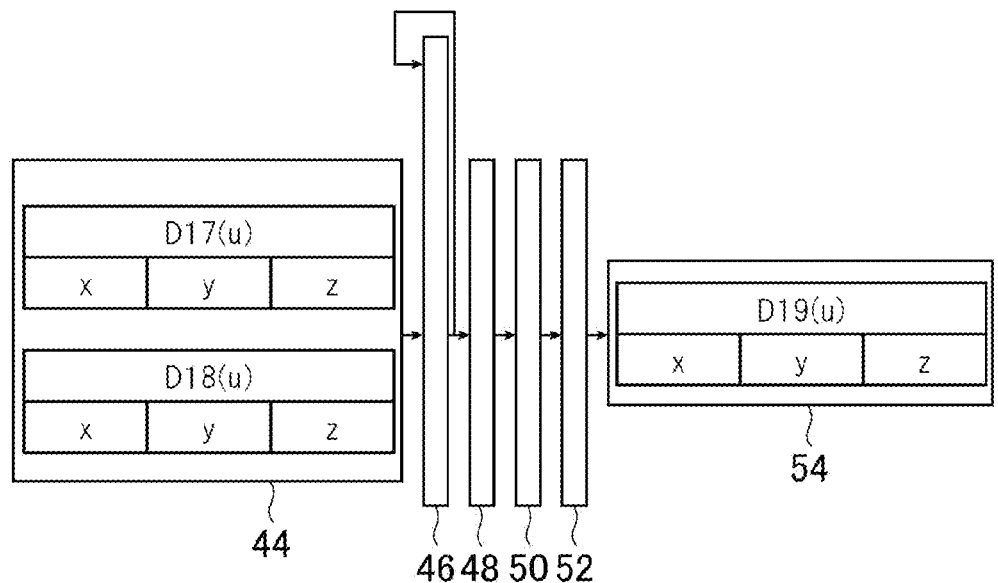
FIG. 15 is a diagram depicting an example of estimation of the direction of the left wrist node using the machine learning model depicted in FIG. 14.

FIG. 15 is a diagram depicting an example of the estimation of the direction of the left wrist node 42*j* using the learned machine learning model.

It is assumed herein that region data is generated on the basis of the data indicating the transmitted position and the transmitted direction of each tracker 12. It is assumed that each region data contains, for example, the left-hand-based chest position data D17 indicating the position of the chest based on the position of the left hand and offset by the rotation of the chest (chest node 42*f*), and the left hand direction data D18 indicating the direction of the left hand offset by the rotation of the chest (chest node 42*f*). Furthermore, as described above, in the present embodiment, the region data is repeatedly generated.

In the present embodiment, the latest region data (last generated region data), for example, is input to the input layer 44. In FIG. 15, pieces of data D17 and D18 contained in the latest region data are expressed as D17(*u*) and D18(*u*), respectively.

As described above, the left-hand-based chest position data D17(*u*) contains three elements that are x, y, and z. The three elements correspond to an x coordinate value, a y coordinate value, and a z coordinate value, respectively of the position of the chest based on the position of the left hand and offset by the rotation of the chest (chest node 42f). Moreover, the left hand direction data D18(u) contains three elements that are x, y, and z. The three elements correspond to an x coordinate value, a y coordinate value, and a z coordinate value, respectively of a unit vector representing the direction of the left hand offset by the rotation of the chest (chest node 42f).

Left wrist direction data D19(t) corresponding to an estimation result of the direction of the left wrist at the timing is then finally output from the output layer 52 as the output 54 as described above.

Likewise, the direction of the right wrist may be estimated.

<Example of Estimation of Height of Head Node>

Furthermore, in the present embodiment, the user does not necessarily have, for example, the tracker 12a attached to the head. A height of the head node 42a may be then estimated using a machine learning model.

Figure 16:
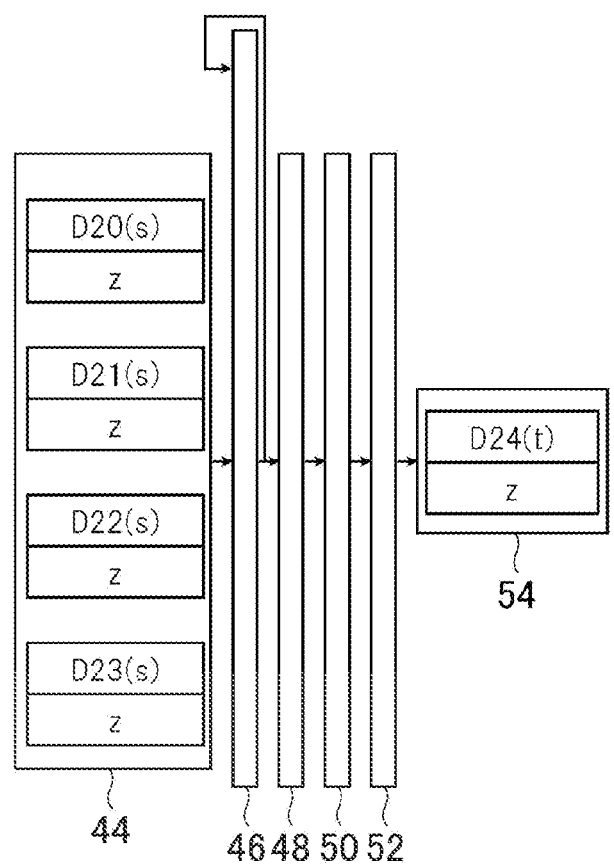
FIG. 16 is a diagram depicting an example of learning of a machine learning model used in estimation of a height of a head node.

FIG. 16 is a diagram depicting an example of learning of a machine learning model used in estimation of the height of the head node 42a. As depicted in FIG. 16, the machine learning model used in the estimation of the height of the head node 42a includes the input layer 44, the intermediate block 46, the first intermediate layer 48, the second intermediate layer 50, and the output layer 52.

In the present embodiment, in learning of the machine learning model depicted in FIG. 16, learning data containing, for example, t pieces of region data made to correspond to respective timings which are different from one another and each indicating a height of the right hand, a height of the left hand, a height component of the direction of the right hand, and a height component of the direction of the left hand at the corresponding timing, and supervisory data is acquired.

For example, the supervisory data may be herein data indicating, for example, the height of the head. In addition, the supervisory data may be generated in a similar manner as that described above on the basis of, for example, the sensing data output from each of the trackers 12 attached to the head, the right hand, and the left hand of the user making various motions, and an image sequence containing t frames of the user making various motions captured from the external camera.

As described above, the t pieces of region data contained in the learning data are then sequentially input to the input layer 44 in chronological order of the corresponding timings. It is assumed herein that each region data contains, for example, right hand height data D20 indicating the height of the right hand, left hand height data D21 indicating the height of the left hand, right hand direction height component data D22 indicating the height component of the direction of the right hand, and left hand direction height component data D23 indicating the height component of the direction of the left hand.

In FIG. 16, pieces of data D20 to D23 at the corresponding timing that is the s-th oldest are expressed herein as, for example, D20(s) to D23(s), respectively, similarly to the data described above. A value s is herein an integer equal to or greater than 1 and equal to or smaller than t.

Furthermore, in the present embodiment, as depicted in FIG. 16, the right hand height data D20(s), the left hand height data D21(s), the right hand direction height component data D22(s), and the left hand direction height component data D23(s) each contain one element (a height z). As for the right hand height data D20(s) and the left hand height data D21(s), the height z represents a z coordinate value of a position. As for the right hand direction height component data D22(s) and the left hand direction height component data D23(s), the height z represents a height direction component of a unit vector representing the direction of each hand.

In the present embodiment, the pieces of region data containing four elements described above are input to the input layer 44.

As described above, head height data D24(t) corresponding to an estimation result of the height of the head at the latest timing (t-th timing) is then finally output from the output layer 52 as the output 54. As depicted in FIG. 16, the head height data D24(t) contains one element (a height z).

It is noted that the supervisory data described above also contains, for example, one element (a height z) similarly to the head height data D24(t).

In the present embodiment, learning of the intermediate block 46, the first intermediate layer 48, the second intermediate layer 50, and the output layer 52 is then executed on the basis of, for example, the head height data D24(t) indicating the estimation result. A difference between, for example, the supervisory data contained in the learning data that contains the series of region data described above and the head height data D24(t) indicating the estimation result may be identified herein. Supervised learning for updating values of parameters of the intermediate block 46, the first intermediate layer 48, the second intermediate layer 50, and the output layer 52 may be then executed on the basis of the identified difference.

In the present embodiment, learning is performed by, for example, the learning data containing the t pieces of region data from the first region data to the t-th region data. Learning may be performed herein by, for example, the learning data containing the t pieces of region data from the first region data to the t-th region data and the supervisory data made to correspond to the t-th region data. The estimation of the height of the head node 42a is then executed using the learned machine learning model completed with the learning by, for example, a plurality of pieces of different learning data.

Figure 17:
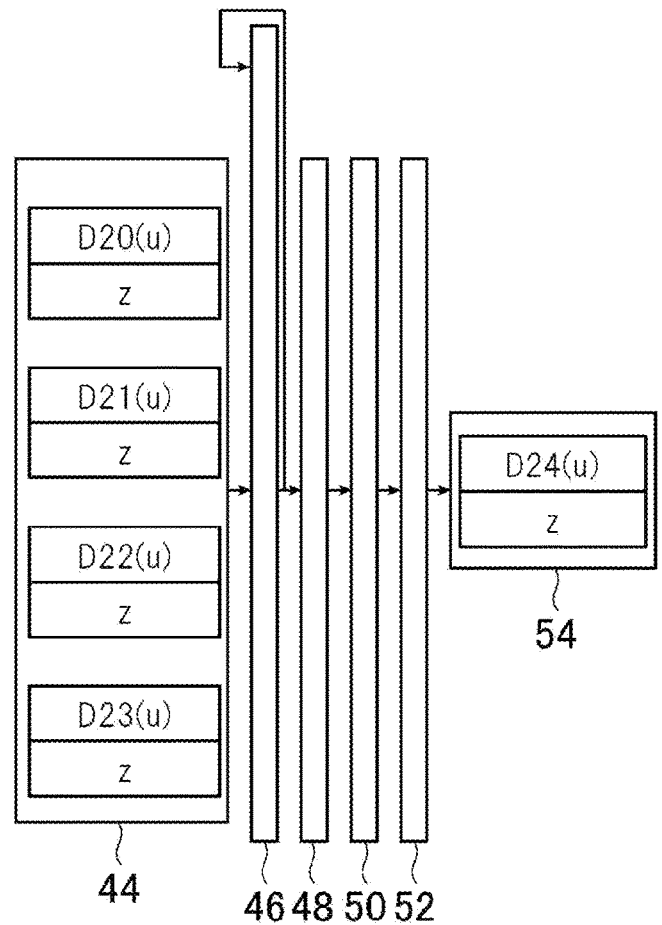
FIG. 17 is a diagram depicting an example of estimation of the height of the head node using the machine learning model depicted in FIG. 16.

FIG. 17 is a diagram depicting an example of estimation of the height of the head node 42a using the learned machine learning model.

It is assumed herein that region data is generated on the basis of the data indicating the transmitted position and the transmitted direction of each tracker 12. It is assumed that the region data contains the right hand height data D20 indicating the height of the right hand, the left hand height data D21 indicating the height of the left hand, the right hand direction height component data D22 indicating the height component of the direction of the right hand, and the left hand direction height component data D23 indicating the height component of the direction of the left hand. Furthermore, as described above, in the present embodiment, the region data is repeatedly generated.

In the present embodiment, the latest region data (last generated region data), for example, is input to the input layer 44. In FIG. 17, pieces of data D20 to D23 contained in the latest region data are expressed as D20(u) to D23(u), respectively.

As described above, the right hand height data D20(u), the left hand height data D21(u), the right hand direction height component data D22(u), and the left hand direction height component data D23(u) each contain one element (a height z). As for the right hand height data D20(u) and the left hand height data D21(u), the height z represents a Z coordinate value of a position. As for the right hand direction height component data D22(*u*) and the left hand direction height component data D23(*u*), the height z represents a height direction component of a unit vector representing the direction of each hand.

As described above, the head height data D24(*u*) corresponding to an estimation result of the height of the head at the timing is then finally output from the output layer 52 as the output 54.

It is noted that a position (XY coordinate values) of the head on a horizontal surface may be estimated by, for example, the other approach (for example, estimated using a position of a center of gravity of the skeleton model 40).

<Example of Sequential Estimation>

Figure 18:
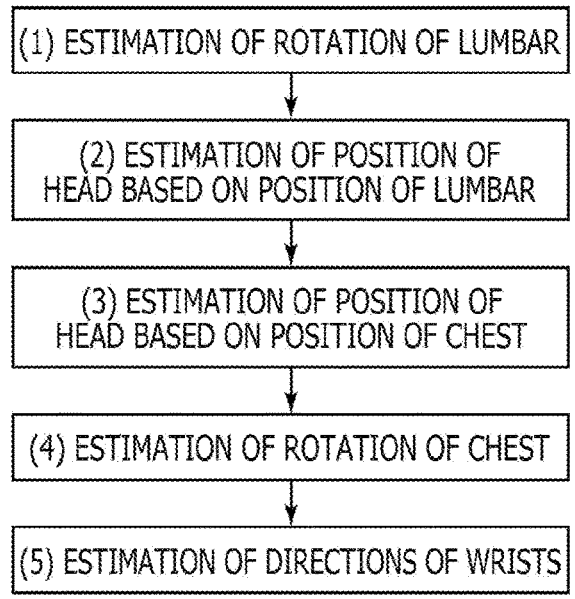
FIG. 18 is a schematic diagram depicting an example of sequential estimation.

Furthermore, in the present embodiment, the regions closer to the lumbar node 42*g* that is a root node may be estimated sequentially in order. For example, as depicted in FIG. 18, (1) estimation of a rotation of the lumbar node 42*g*, (2) estimation of a position of the head node 42*a* based on a position of the lumbar node 42*g*, (3) estimation of a position of the head node 42*a* based on a position of the chest node 42*f*, (4) estimation of a rotation of the chest node 42*f*, and (5) estimation of directions of the left wrist node 42*j* and the right wrist node 42*m* may be executed in sequence.

First, (1) estimation of a rotation of the lumbar node 42*g* will be described hereinafter.

Figure 19:
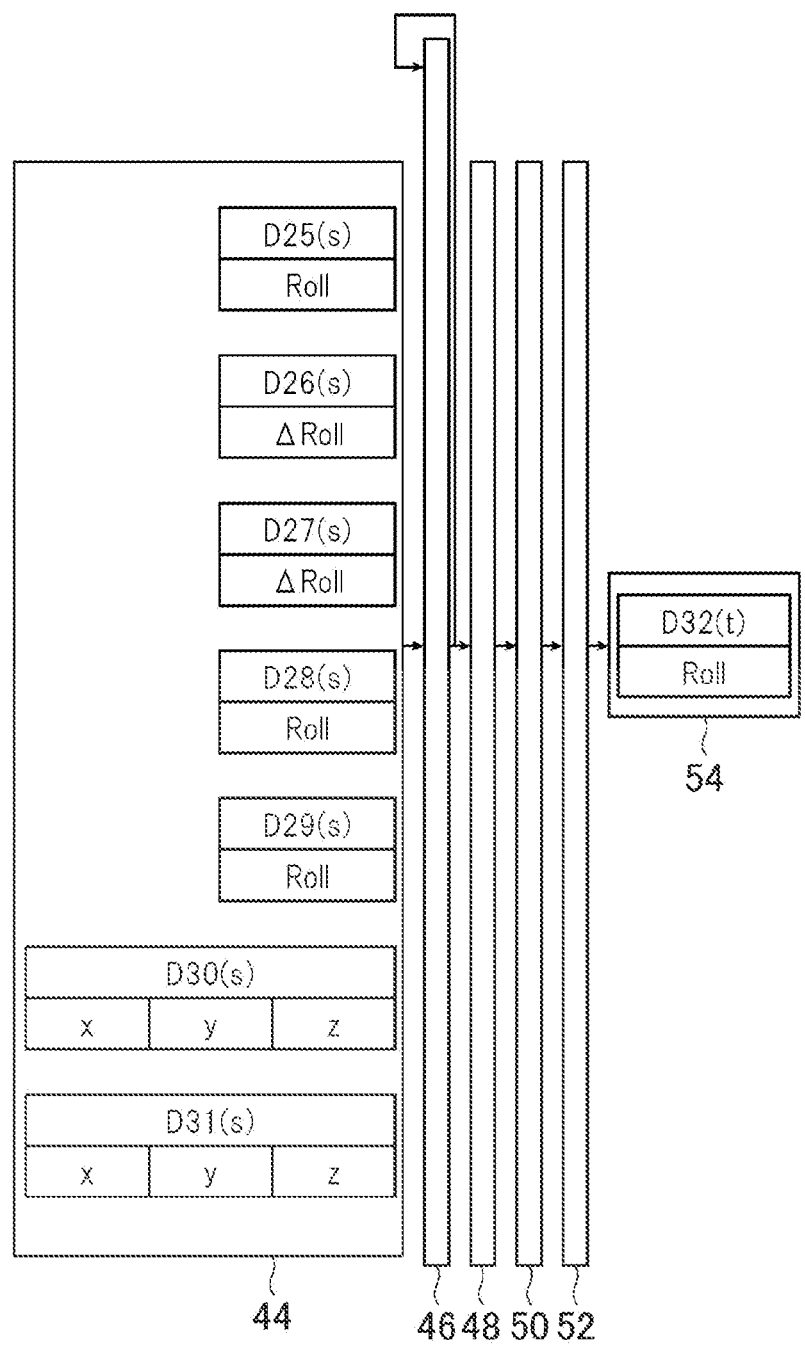
FIG. 19 is a diagram depicting an example of learning of a machine learning model used in estimation of rotation of a lumbar node.
Figure 20:
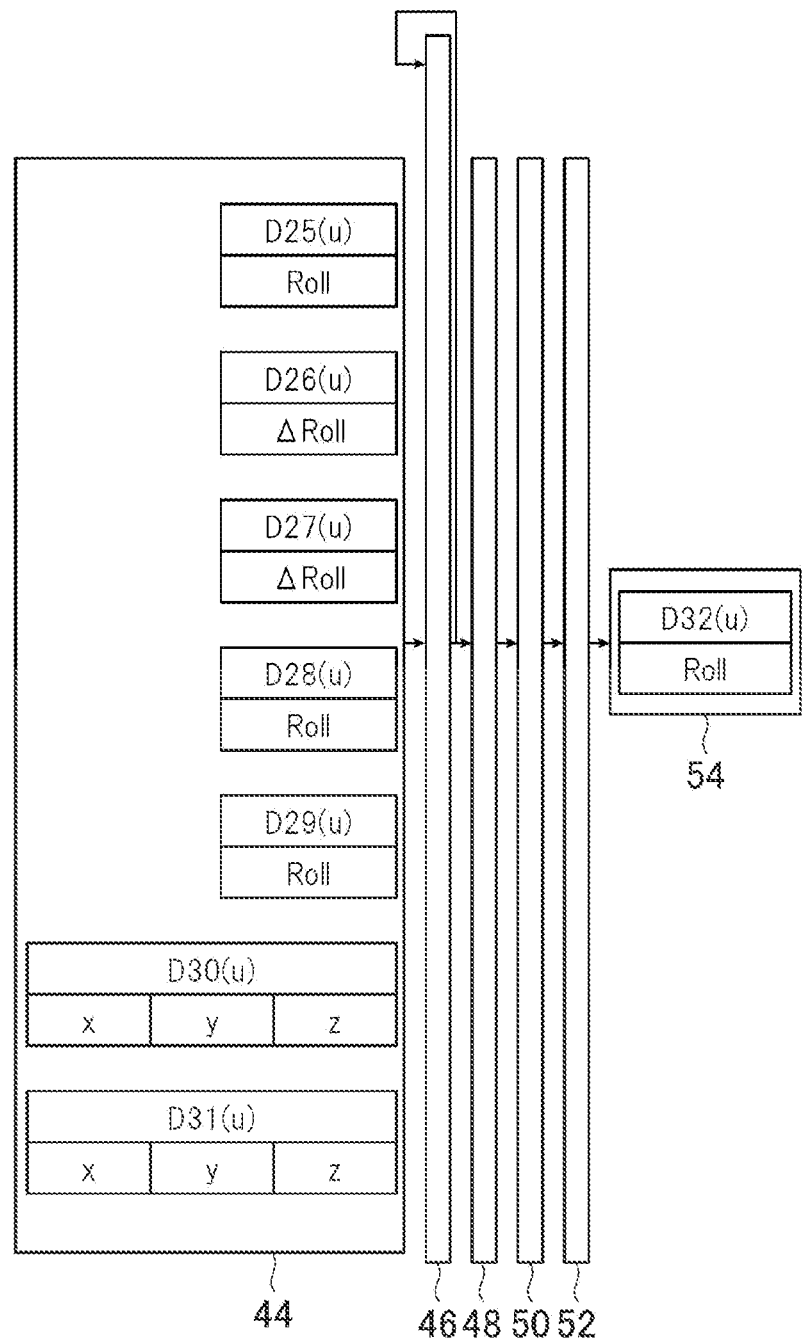
FIG. 20 is a diagram depicting an example of estimation of the direction of the lumbar node using the machine learning model depicted in FIG. 19.

FIG. 19 is a diagram depicting an example of learning of a machine learning model used in estimation of a rotation (Roll) of the lumbar node 42*g*. FIG. 20 is a diagram depicting an example of the estimation of the rotation of the lumbar node 42*g* using the learned machine learning model.

Description of the learning of the machine learning model depicted in FIG. 19 will be omitted since the learning can be performed by using data indicating a rotation of the lumbar as an alternative to the data indicating the rotation of the chest as supervisory data in the learning of the machine learning model described with reference to FIG. 12. The supervisory data may be generated in a similar manner as that described above on the basis of, for example, the sensing data output from each of the trackers 12 attached to the head, the right hand, the left hand, the right foot, the left foot, and the lumbar of the user making various motions, and an image sequence containing t frames of the user making various motions captured from the external camera.

It is noted that pieces of data D25(*s*) to D31(*s*) depicted in FIG. 19 are data similar to the data D9(*s*) to D15(*s*) depicted in FIG. 12. It is also noted that data D32(*t*) depicted in FIG. 19 is lumber rotation data corresponding to an estimation result of the rotation of the lumber at the latest timing (t-th timing).

Moreover, description of the estimation by the machine learning model depicted in FIG. 20 will be omitted since the estimation can be performed by inputting the latest region data in a similar manner as that in the estimation of the rotation (Roll) of the chest node 42*f* described with reference to FIG. 13.

It is noted that pieces of data D25(*u*) to D31(*u*) depicted in FIG. 20 are data similar to the data D9(*u*) to D15(*u*) depicted in FIG. 12. It is also noted that data D32(*u*) depicted in FIG. 20 is lumber rotation data corresponding to the estimation result of the rotation of the lumber output from the output layer 52 as the output 54.

Next, (2) estimation of a position of the head node 42*a* based on a position of the lumbar node 42*g* will be described. It is noted that the position of the head node 42*a* can be estimated on the basis of, for example, the position of the tracker 12*a*. Owing to this, if the position of the head node 42*a* based on the position of the lumbar node 42*g* is estimated, the position of the lumbar node 42*g* can be eventually estimated.

Figure 21:
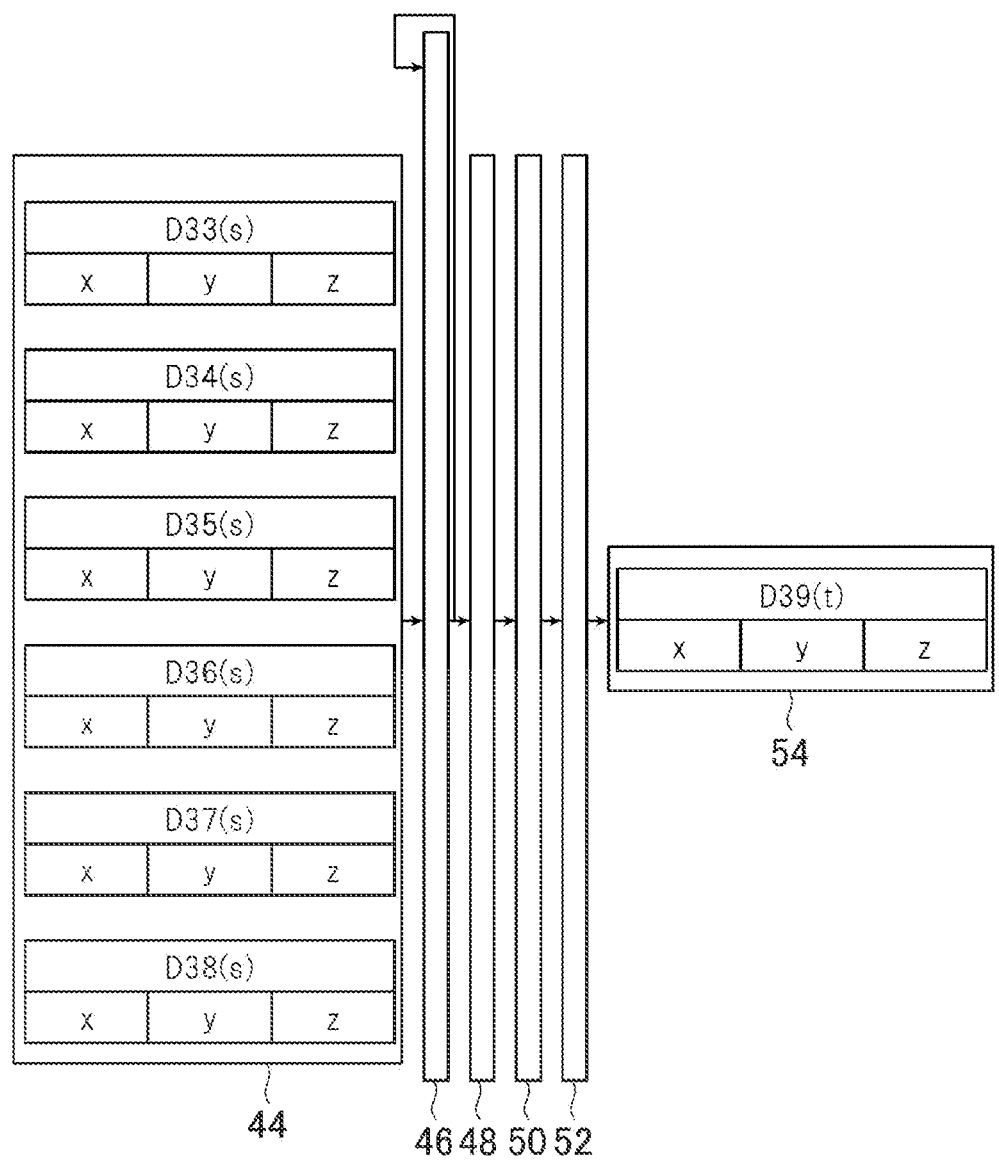
FIG. 21 is a diagram depicting an example of learning of a machine learning model used in estimation of a position of the head node based on a position of the lumbar node.

FIG. 21 is a diagram depicting an example of learning of a machine learning model used in estimation of the position of the head node 42*a* based on the position of the lumbar node 42*g*. As depicted in FIG. 21, a machine learning model used in the estimation of the position of the head node 42*a* based on the position of the lumbar node 42*g* includes the input layer 44, the intermediate block 46, the first intermediate layer 48, the second intermediate layer 50, and the output layer 52.

In the present embodiment, in learning of the machine learning model depicted in FIG. 21, learning data containing, for example, t pieces of region data made to correspond to respective timings which are different from one another and each indicating a direction of the right hand, a direction of the left hand, a position of the head based on a position of the right hand, a position of the head based on a position of the left hand, a position of the head based on a position of the right foot, and a position of the head based on a position of the left foot, all of which are offset by the rotation of the lumbar node 42*g* (based on the rotation of the lumbar node 42*g*), at the corresponding timing, and supervisory data is acquired.

For example, the supervisory data may be herein data indicating, for example, the position of the head based on the position of the lumbar offset by the rotation of the lumber (lumbar node 42*g*). In addition, the supervisory data may be generated in a similar manner as that described above on the basis of, for example, the sensing data output from each of the trackers 12 attached to the head, the right hand, the left hand, the right foot, the left foot, and the lumbar of the user making various motions, and an image sequence containing t frames of the user making various motions captured from the external camera.

As described above, the t pieces of region data contained in the learning data are then sequentially input to the input layer 44 in chronological order of the corresponding timings. It is assumed herein that each region data contains, for example, right hand direction data D33 indicating the direction of the right hand offset by the rotation of the lumbar node 42*g*, left hand direction data D34 indicating the direction of the left hand offset by the rotation of the lumbar node 42*g*, right-hand-based head position data D35 indicating the position of the head based on the position of the right hand and offset by the rotation of the lumbar node 42*g*, left-hand-based head position data D36 indicating the position of the head based on the position of the left hand and offset by the rotation of the lumbar node 42*g*, right-foot-based head position data D37 indicating the position of the head based on the position of the right foot and offset by the rotation of the lumbar node 42*g*, and left-foot-based head position data D38 indicating the position of the head based on the position of the left foot and offset by the rotation of the lumbar node 42*g*.

Pieces of data D33 to D38 at the corresponding timing that is the s-th oldest are herein expressed as, for example, D33(*s*) to D38(*s*), respectively, similarly to the data described above. A value s is herein an integer equal to or greater than 1 and equal to or smaller than t.

Moreover, in the present embodiment, as depicted in FIG. 21, the right hand direction data D33(*s*) contains three elements that are x, y, and z. The three elements correspond to an x coordinate value, a y coordinate value, and a z coordinate value, respectively of a unit vector representing the direction of the right hand offset by the rotation of the lumbar (lumbar node 42g). The left hand direction data D34(*s*) contains three elements that are x, y, and z. The three elements correspond to an x coordinate value, a y coordinate value, and a z coordinate value, respectively of a unit vector representing the direction of the left hand offset by the rotation of the lumbar (lumbar node 42g).

Furthermore, the right-hand-based head position data D35(*s*) contains three elements that are x, y, and z. The three elements correspond to an x coordinate value, a y coordinate value, and a z coordinate value, respectively of the position of the head based on the position of the right hand and offset by the rotation of the lumbar (lumbar node 42g). The left-hand-based head position data D36(*s*) contains three elements that are x, y, and z. The three elements correspond to an x coordinate value, a y coordinate value, and a z coordinate value, respectively of the position of the head based on the position of the left hand and offset by the rotation of the lumbar (lumbar node 42g).

Furthermore, the right-foot-based head position data D37(*s*) contains three elements that are x, y, and z. The three elements correspond to an x coordinate value, a y coordinate value, and a z coordinate value, respectively of the position of the head based on the position of the right foot and offset by the rotation of the lumbar (lumbar node 42g). The left-foot-based head position data D38(*s*) contains three elements that are x, y, and z. The three elements correspond to an x coordinate value, a y coordinate value, and a z coordinate value, respectively of the position of the head based on the position of the left foot and offset by the rotation of the lumbar (lumbar node 42g).

In the present embodiment, the pieces of region data containing 18 elements described above are input to the input layer 44.

As described above, lumbar-based head position data D39(*t*) corresponding to an estimation result of the position of the head based on the position of the lumbar and offset by the rotation of the lumbar (lumbar node 42g) at the latest timing (t-th timing) is then finally output from the output layer 52 as the output 54. As depicted in FIG. 21, the lumbar-based head position data D39(*t*) contains three elements that are x, y, and z. The three elements correspond to an x coordinate value, a y coordinate value, and a z coordinate value, respectively of the position of the head based on the position of the lumbar and offset by the rotation of the lumbar (lumbar node 42g).

It is noted that the supervisory data described above also contains, for example, three elements corresponding to an x coordinate value, a y coordinate value, and a z coordinate value, respectively of the position of the head based on the position of the lumbar and offset by the rotation of the lumbar (lumbar node 42g), similarly to the lumbar-based head position data D39(*t*).

In the present embodiment, learning of the intermediate block 46, the first intermediate layer 48, the second intermediate layer 50, and the output layer 52 is then executed on the basis of, for example, the lumbar-based head position data D39(*t*) indicating the estimation result. A difference between, for example, the supervisory data contained in the learning data that contains the series of region data described above and the lumbar-based head position data D39(*t*) indicating the estimation result may be identified herein. Supervised learning for updating values of parameters of the intermediate block 46, the first intermediate layer 48, the second intermediate layer 50, and the output layer 52 may be then executed on the basis of the identified difference.

In the present embodiment, learning is performed by, for example, the learning data containing the t pieces of region data from the first region data to the t-th region data. Learning may be performed herein by, for example, the learning data containing the t pieces of region data from the first region data to the t-th region data and the supervisory data made to correspond to the t-th region data. The estimation of the position of the head based on the position of the lumbar and offset by the rotation of the lumbar (lumbar node 42g) is then executed using the learned machine learning model completed with the learning by, for example, a plurality of pieces of different learning data.

Figure 22:
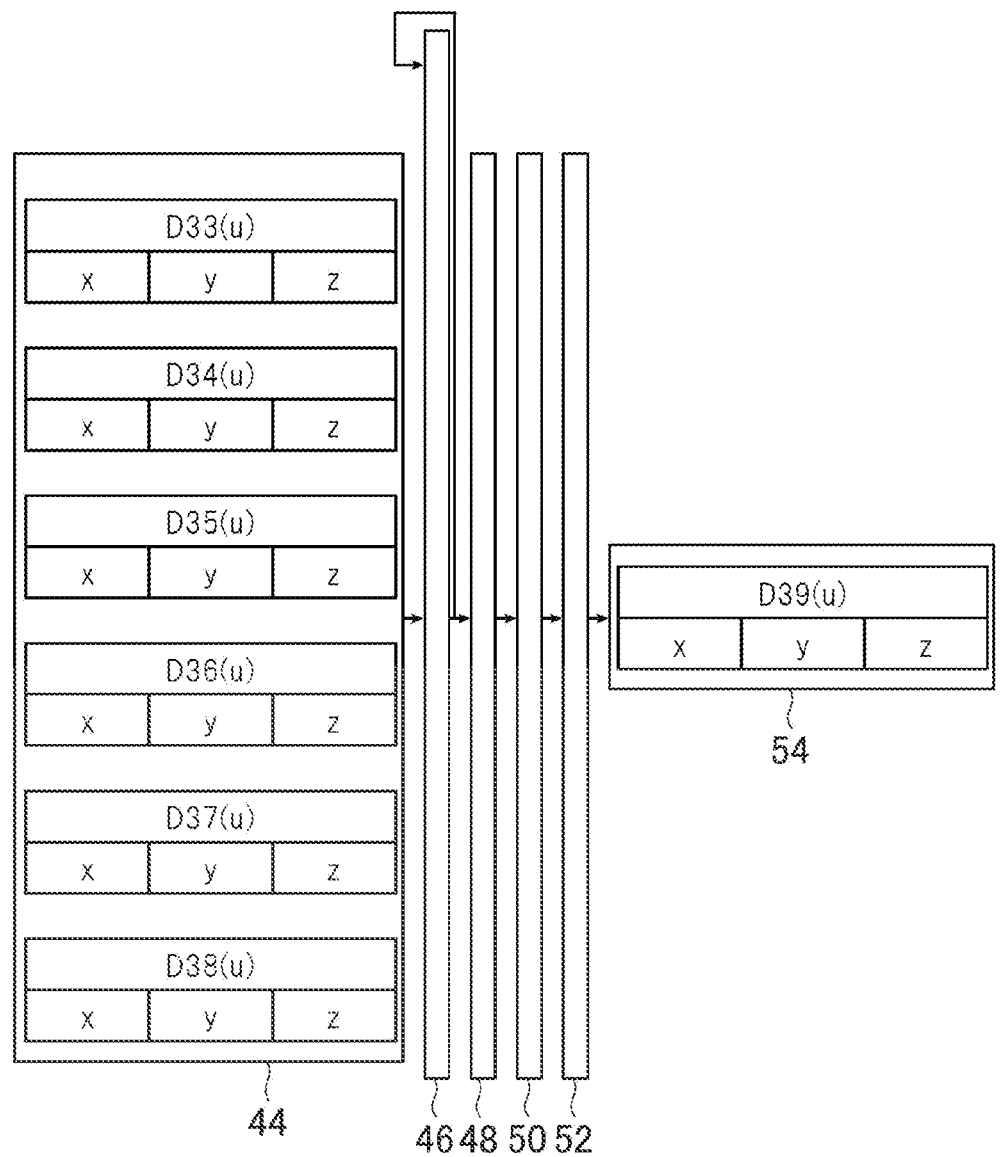
FIG. 22 is a diagram depicting an example of estimation of the position of the head node based on the position of the lumbar node using the machine learning model depicted in FIG. 21.

FIG. 22 is a diagram depicting an example of estimation of the position of the head node 42a based on the position of the lumbar node 42g using the learned machine learning model.

It is assumed herein that region data is generated on the basis of the data indicating the transmitted position and the transmitted direction of each tracker 12. It is assumed that each region data contains, for example, the right hand direction data D33 indicating the direction of the right hand offset by the rotation of the lumbar node 42g, the left hand direction data D34 indicating the direction of the left hand offset by the rotation of the lumbar node 42g, the right-hand-based head position data D35 indicating the position of the head based on the position of the right hand and offset by the rotation of the lumbar node 42g, the left-hand-based head position data D36 indicating the position of the head based on the position of the left hand and offset by the rotation of the lumbar node 42g, the right-foot-based head position data D37 indicating the position of the head based on the position of the right foot and offset by the rotation of the lumbar node 42g, and the left-foot-based head position data D38 indicating the position of the head based on the position of the left foot and offset by the rotation of the lumbar node 42g. Furthermore, as described above, in the present embodiment, the region data is repeatedly generated.

In the present embodiment, the latest region data (last generated region data), for example, is input to the input layer 44. In FIG. 22, pieces of data D33 to D38 contained in the latest region data are expressed as D33(*u*) to D38(*u*), respectively.

As described above, the right hand direction data D33(*u*) contains three elements that are x, y, and z. The three elements correspond to an x coordinate value, a y coordinate value, and a z coordinate value, respectively of a unit vector representing the direction of the right hand offset by the rotation of the lumbar (lumbar node 42g) estimated in the processing (1). The left hand direction data D34(*u*) contains three elements that are x, y, and z. The three elements correspond to an x coordinate value, a y coordinate value, and a z coordinate value, respectively of a unit vector representing the direction of the left hand offset by the rotation of the lumbar (lumbar node 42g) estimated in the processing (1).

Furthermore, the right-hand-based head position data D35(*u*) contains three elements that are x, y, and z. The three elements correspond to an x coordinate value, a y coordinate value, and a z coordinate value, respectively of the position of the head based on the position of the right hand and offset by the rotation of the lumbar (lumbar node 42g) estimated in the processing (1). The left-hand-based head position data D36(*u*) contains three elements that are x, y, and z. The three elements correspond to an x coordinate value, a y coordinate value, and a z coordinate value, respectively of the position of the head based on the position of the left hand and offset by the rotation of the lumbar (lumbar node 42g) estimated in the processing (1).

Furthermore, the right-foot-based head position data D37(u) contains three elements that are x, y, and z. The three elements correspond to an x coordinate value, a y coordinate value, and a z coordinate value, respectively of the position of the head based on the position of the right foot and offset by the rotation of the lumbar (lumbar node 42g) estimated in the processing (1). The left-foot-based head position data D38(u) contains three elements that are x, y, and z. The three elements correspond to an x coordinate value, a y coordinate value, and a z coordinate value, respectively of the position of the head based on the position of the left foot and offset by the rotation of the lumbar (lumbar node 42g) estimated in the processing (1).

As described above, lumbar-based head position data D39(u) corresponding to an estimation result of the position of the head based on the position of the lumbar and offset by the rotation of the lumbar (lumbar node 42g) at the latest timing is then finally output from the output layer 52 as the output 54.

Next, (3) estimation of a position of the head node 42a based on a position of the chest node 42f will be described. It is noted that the position of the head node 42a can be estimated on the basis of, for example, the position of the tracker 12a. Owing to this, if the position of the head node 42a based on the position of the chest node 42f is estimated, the position of the chest node 42f can be eventually estimated.

Figure 23:
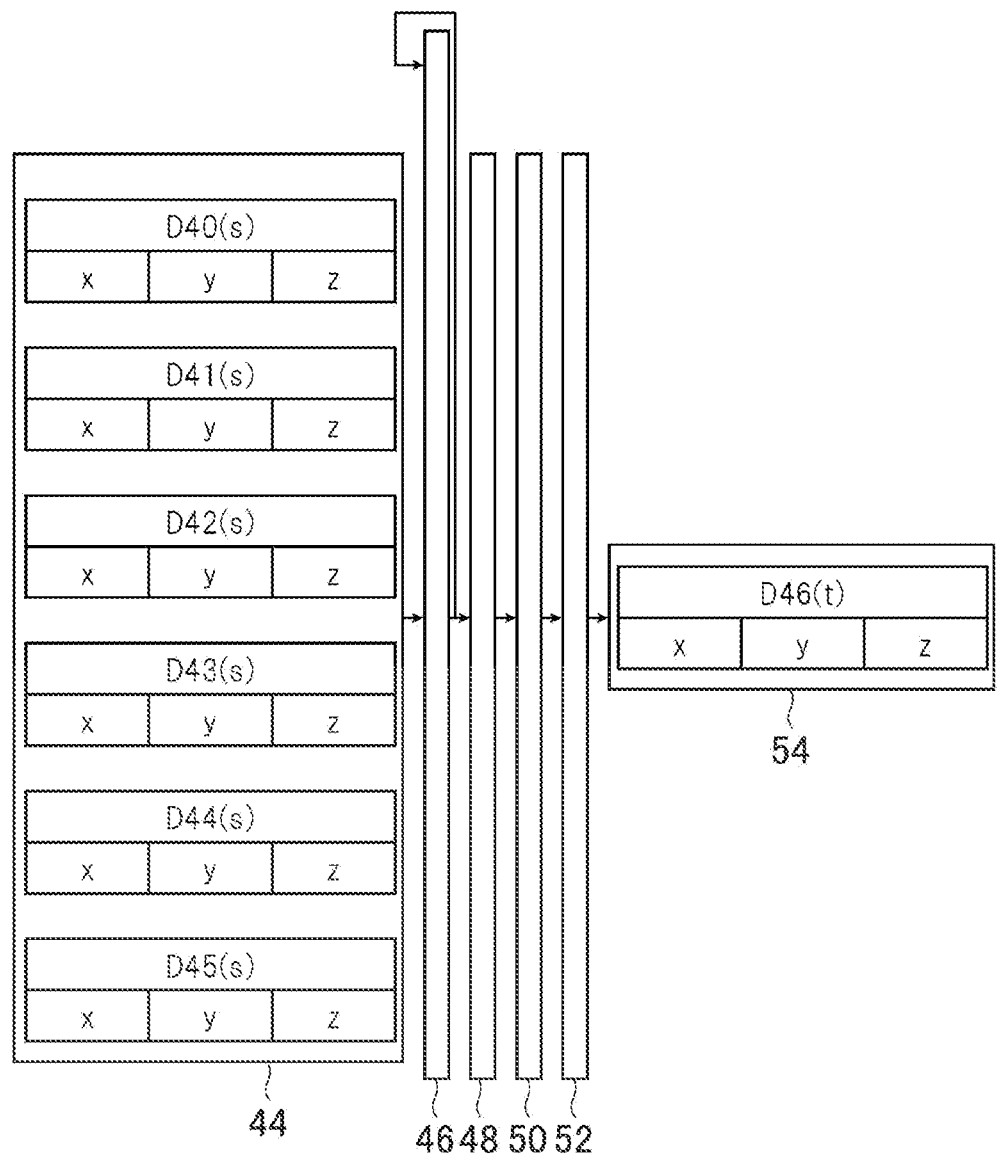
FIG. 23 is a diagram depicting an example of learning of a machine learning model used in estimation of a position of the head node based on a position of the chest node.
Figure 24:
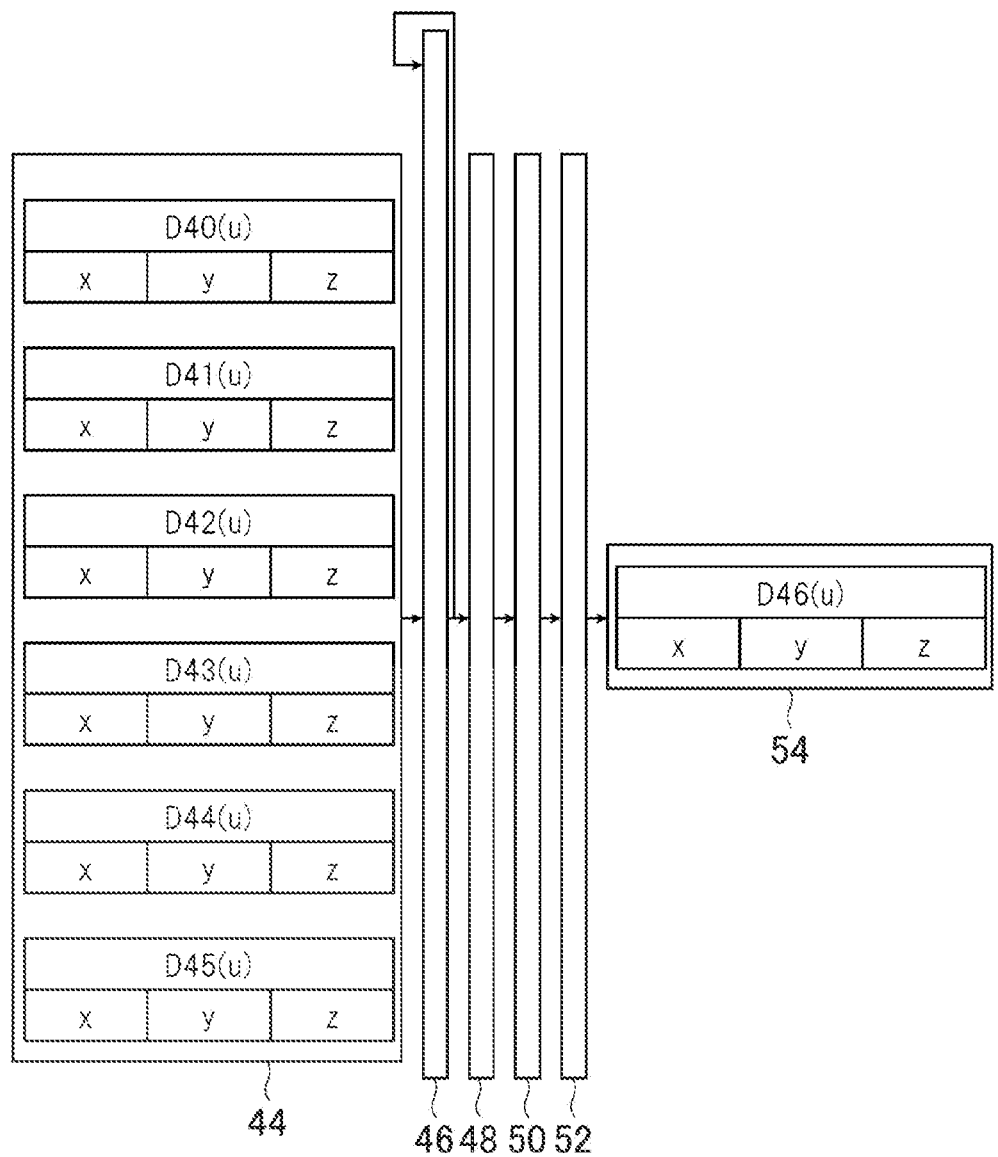
FIG. 24 is a diagram depicting an example of estimation of the position of the head node based on the position of the chest node using the machine learning model depicted in FIG. 23.

FIG. 23 is a diagram depicting an example of learning of a machine learning model used in estimation of the position of the head node 42a based on the position of the chest node 42f. FIG. 24 is a diagram depicting an example of estimation of the position of the head node 42a based on the position of the chest node 42f using the learned machine learning model.

Description of the learning of the machine learning model depicted in FIG. 23 will be omitted since the learning can be performed by using data indicating the position of the head based on the position of the chest and offset by the rotation of the lumbar (lumbar node 42g) as an alternative to the data indicating the position of the head based on the position of the lumbar and offset by the rotation of the lumber (lumbar node 42g) as supervisory data in the learning of the machine learning model described with reference to FIG. 21. The supervisory data may be generated in a similar manner as that described above on the basis of, for example, the sensing data output from each of the trackers 12 attached to the head, the right hand, the left hand, the right foot, the left foot, the lumbar, and the chest of the user making various motions, and an image sequence containing t frames of the user making various motions captured from the external camera.

It is noted that pieces of data D40(s) to D45(s) depicted in FIG. 23 are data similar to the data D33(s) to D38(s) depicted in FIG. 21. It is also noted that data D46(t) depicted in FIG. 23 is chest-based head position data corresponding to an estimation result of the position of the head based on the position of the chest and offset by the rotation of the lumbar (lumbar node 42g) at the latest timing (t-th timing).

Moreover, description of the estimation by the machine learning model depicted in FIG. 24 will be omitted since the estimation can be performed by inputting the latest region data in a similar manner as that in the estimation of the head node 42a based on the position of the lumbar node 42g described with reference to FIG. 22.

It is noted that pieces of data D40(u) to D45(u) depicted in FIG. 24 are data similar to the data D33(u) to D38(u) depicted in FIG. 22. The pieces of data D40(u) to D45(u) are data offset by the rotation of the lumbar (lumbar node 42g) estimated in the processing (1). Furthermore, data D46(u) depicted in FIG. 24 is chest-based head position data output from the output layer 52 as the output 54 and corresponding to an estimation result of the position of the head based on the position of the chest and offset by the rotation of the lumbar (lumbar node 42g).

Next, (4) estimation of a rotation of the chest node 42f will be described.

Figure 25:
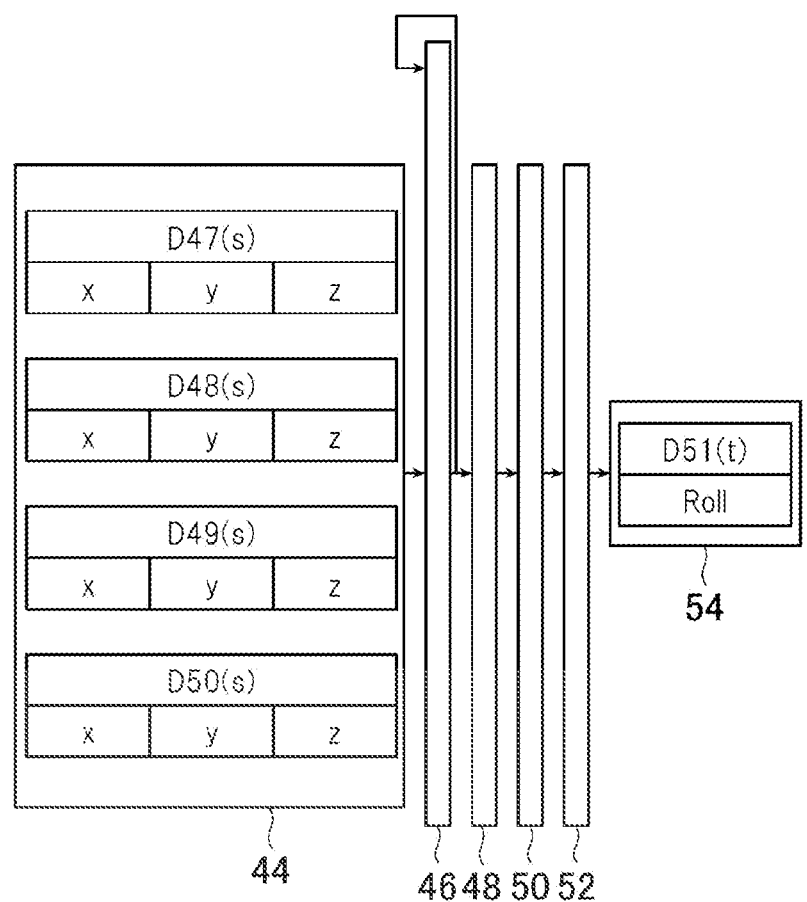
FIG. 25 is a diagram depicting an example of learning of a machine learning model used in estimation of rotation of the chest node.

FIG. 25 is a diagram depicting an example of learning of a machine learning model used in estimation of a rotation of the chest node 42f. As depicted in FIG. 25, the machine learning model used in the estimation of the rotation of the chest node 42f includes the input layer 44, the intermediate block 46, the first intermediate layer 48, the second intermediate layer 50, and the output layer 52.

In the present embodiment, in learning of the machine learning model depicted in FIG. 25, learning data containing, for example, t pieces of region data made to correspond to respective timings which are different from one another and each indicating a direction of the right hand, a direction of the left hand, a position of the chest based on a position of the right hand, and a position of the chest based on a position of the left hand, all of which are offset by the rotation of the lumbar node 42g (based on the rotation of the lumbar node 42g), at the corresponding timing, and supervisory data is acquired.

For example, the supervisory data may be herein data indicating, for example, a rotation of the chest. In addition, the supervisory data may be generated in a similar manner as that described above on the basis of, for example, the sensing data output from each of the trackers 12 attached to the head, the left hand, the right hand, the lumbar, and the chest of the user making various motions, and an image sequence containing t frames of the user making various motions captured from the external camera.

As described above, the pieces of region data contained in the learning data are then sequentially input to the input layer 44 in chronological order of the corresponding timings. It is assumed herein that each region data contains, for example, right hand direction data D47 indicating the direction of the right hand offset by the rotation of the lumbar node 42g, left hand direction data D48 indicating the direction of the left hand offset by the rotation of the lumbar node 42g, right-hand-based chest position data D49 indicating the position of the chest based on the position of the right hand and offset by the rotation of the lumbar node 42g, and left-hand-based chest position data D50 indicating the position of the chest based on the position of the left hand and offset by the rotation of the lumbar node 42g.

Pieces of data D47 to D50 at the corresponding timing that is the s-th oldest are herein expressed as, for example, D47(s) to D50(s), respectively, similarly to the data described above. A value s is herein an integer equal to or greater than 1 and equal to or smaller than t.

Moreover, in the present embodiment, as depicted in FIG. 25, the right hand direction data D47(s) contains three elements that are x, y, and z. The three elements correspond to an x coordinate value, a y coordinate value, and a z coordinate value, respectively of a unit vector representing the direction of the right hand offset by the rotation of the lumbar (lumbar node 42g). The left hand direction data D48(s) contains three elements that are x, y, and z. The three elements correspond to an x coordinate value, a y coordinate value, and a z coordinate value, respectively of a unit vector representing the direction of the left hand offset by the rotation of the lumbar (lumbar node 42g).

Furthermore, the right-hand-based chest position data D49(s) contains three elements that are x, y, and z. The three elements correspond to an x coordinate value, a y coordinate value, and a z coordinate value, respectively of the position of the chest based on the position of the right hand and offset by the rotation of the lumbar (lumbar node 42g). Furthermore, the left-hand-based chest position data D50(s) contains three elements that are x, y, and z. The three elements correspond to an x coordinate value, a y coordinate value, and a z coordinate value, respectively of the position of the chest based on the position of the left hand and offset by the rotation of the lumbar (lumbar node 42g).

In the present embodiment, the pieces of region data containing 12 elements described above are input to the input layer 44.

As described above, chest rotation data D51(t) corresponding to an estimation result of the rotation of the chest at the latest timing (t-th timing) is then finally output from the output layer 52 as the output 54. As depicted in FIG. 25, the chest rotation data D51(t) contains one element (a roll angle (Roll)). The roll angle corresponds to, for example, a roll angle with respect to the reference direction described above.

It is noted that the supervisory data described above also contains, for example, one element (a roll angle (Roll)) similarly to the chest rotation data D51(t). It is noted that a value of the Roll may be a real number adjusted to fall in a range from $-2\pi$ to $2\pi$.

In the present embodiment, learning of the intermediate block 46, the first intermediate layer 48, the second intermediate layer 50, and the output layer 52 is then executed on the basis of, for example, the chest rotation data D51(t) indicating the estimation result. A difference between, for example, the supervisory data contained in the learning data that contains the series of region data described above and the chest rotation data D51(t) indicating the estimation result may be identified herein. Supervised learning for updating values of parameters of the intermediate block 46, the first intermediate layer 48, the second intermediate layer 50, and the output layer 52 may be then executed on the basis of the identified difference.

In the present embodiment, learning is performed by, for example, the learning data containing the t pieces of region data from the first region data to the t-th region data. Learning may be performed herein by, for example, the learning data containing the t pieces of region data from the first region data to the t-th region data and the supervisory data made to correspond to the t-th region data. The estimation of the rotation of the chest is then executed using the learned machine learning model completed with the learning by, for example, a plurality of pieces of different learning data.

Figure 26:
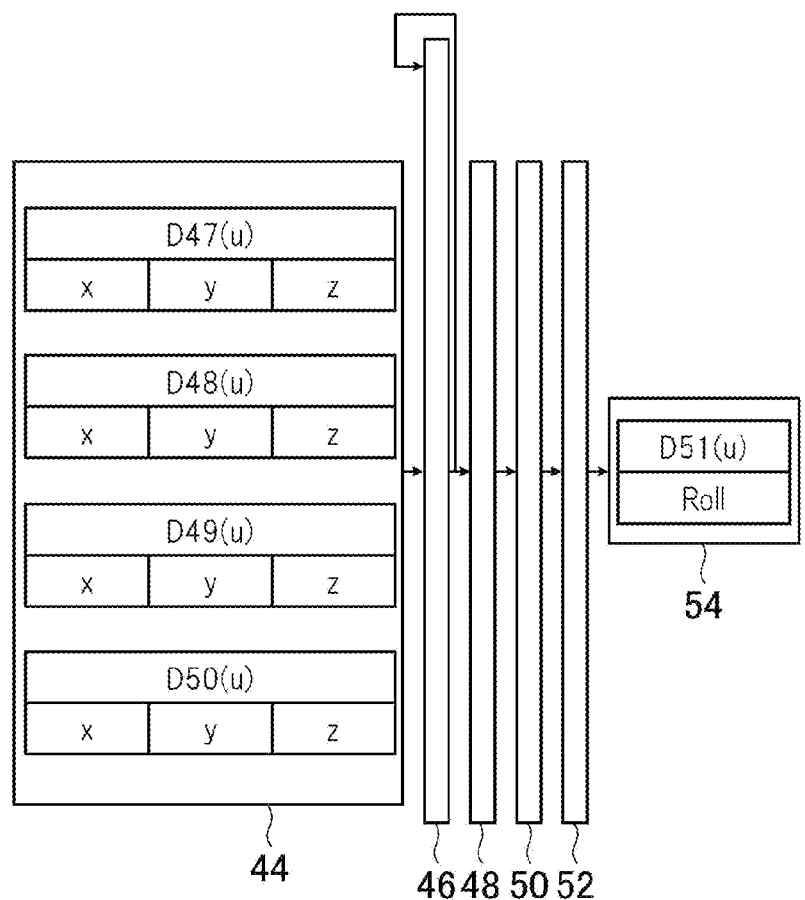
FIG. 26 is a diagram depicting an example of estimation of the rotation of the chest node using the machine learning model depicted in FIG. 25.

FIG. 26 is a diagram depicting an example of the estimation of the rotation of the chest node 42f using the learned machine learning model.

It is assumed herein that region data is generated on the basis of the data indicating the transmitted position and the transmitted direction of each tracker 12, for example. It is assumed that each region data contains, the right hand direction data D47 indicating the direction of the right hand offset by the rotation of the lumbar node 42g, the left hand direction data D48 indicating the direction of the left hand offset by the rotation of the lumbar node 42g, the right-hand-based chest position data D49 indicating the position of the chest based on the position of the right hand and offset by the rotation of the lumbar node 42g, and the left-hand-based chest position data D50 indicating the position of the chest based on the position of the left hand and offset by the rotation of the lumbar node 42g. Furthermore, as described above, in the present embodiment, the region data is repeatedly generated.

In the present embodiment, the latest region data (last generated region data), for example, is input to the input layer 44. In FIG. 26, pieces of data D47 to D50 contained in the latest region data are expressed as D47(u) to D50(u), respectively.

As described above, the right hand direction data D47(u) contains three elements that are x, y, and z. The three elements correspond to an x coordinate value, a y coordinate value, and a z coordinate value, respectively of a unit vector representing the direction of the right hand offset by the rotation of the lumbar (lumbar node 42g) estimated in the processing (1). The left hand direction data D48(u) contains three elements that are x, y, and z. The three elements correspond to an x coordinate value, a y coordinate value, and a z coordinate value, respectively of a unit vector representing the direction of the left hand offset by the rotation of the lumbar (lumbar node 42g) estimated in the processing (1).

Furthermore, the right-hand-based chest position data D49(u) contains three elements that are x, y, and z. The three elements correspond to an x coordinate value, a y coordinate value, and a z coordinate value, respectively of the position of the chest based on the position of the right hand and offset by the rotation of the lumbar (lumbar node 42g) estimated in the processing (1). Furthermore, the left-hand-based chest position data D50(u) contains three elements that are x, y, and z. The three elements correspond to an x coordinate value, a y coordinate value, and a z coordinate value, respectively of the position of the chest based on the position of the left hand and offset by the rotation of the lumbar (lumbar node 42g) estimated in the processing (1).

As described above, chest rotation data D51(u) corresponding to an estimation result of the rotation of the chest at the timing is then finally output from the output layer 52 as the output 54.

Next, (5) estimation of directions of the left wrist node 42j and the right wrist node 42m will be described.

Figure 27:
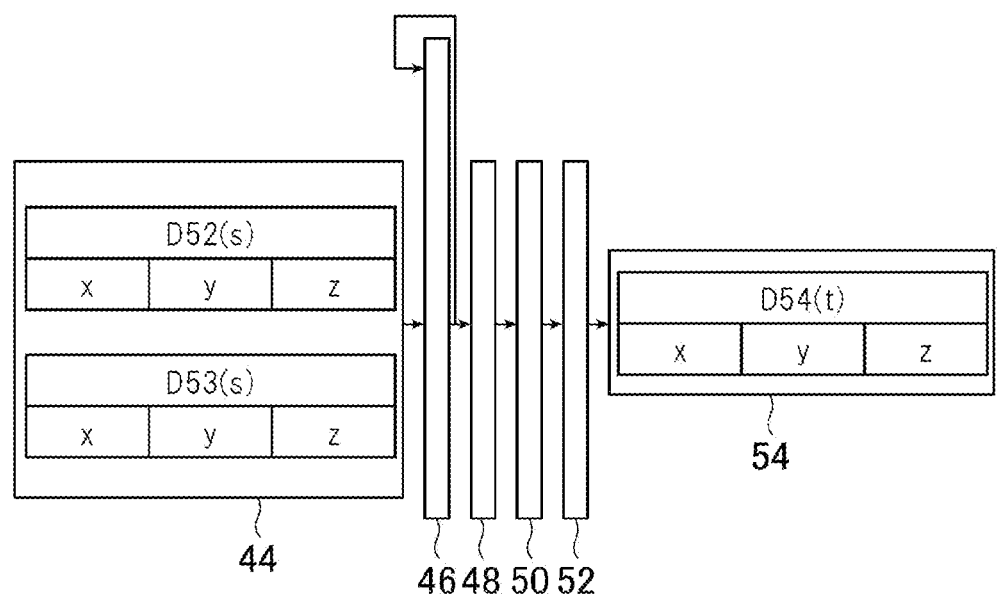
FIG. 27 is a diagram depicting an example of learning of a machine learning model used in estimation of a direction of the left wrist node.

FIG. 27 is a diagram depicting an example of learning of a machine learning model used in estimation of the direction of the left wrist node 42j. As depicted in FIG. 27, the machine learning model used in the estimation of the direction of the left wrist node 42j includes the input layer 44, the intermediate block 46, the first intermediate layer 48, the second intermediate layer 50, and the output layer 52.

In the present embodiment, in learning of the machine learning model depicted in FIG. 27, learning data containing, for example, t pieces of region data made to correspond to respective timings which are different from one another and each indicating a position of the chest based on the position of the left hand and a direction of the left hand, both of which are offset by the rotation of the chest node 42f (based on the rotation of the chest node 420, at the corresponding timing, and supervisory data is acquired.

For example, the supervisory data may be herein data indicating, for example, a direction of the left wrist. In addition, the supervisory data may be generated in a similar manner as that described above on the basis of, for example, the sensing data output from each of the trackers 12 attached to the left hand, the left wrist, and the chest of the user making various motions, and an image sequence containing t frames of the user making various motions captured from the external camera.

As described above, the t pieces of region data contained in the learning data are then sequentially input to the input layer 44 in chronological order of the corresponding timings. It is assumed herein that each region data contains, for example, left-hand-based chest position data D52 indicating the position of the chest based on the position of the left hand and offset by the rotation of the chest node 42f, and left hand direction data D53 indicating the direction of the left hand offset by the rotation of the chest node 42f.

Pieces of data D52 and D53 at the corresponding timing that is the s-th oldest are herein expressed as, for example, D52(s) and D53(s), respectively, similarly to the data described above. A value s is herein an integer equal to or greater than 1 and equal to or smaller than t.

Furthermore, in the present embodiment, as depicted in FIG. 27, the left-hand-based chest position data D52(s) contains three elements that are x, y, and z. The three elements correspond to an x coordinate value, a y coordinate value, and a z coordinate value, respectively of the position of the chest based on the position of the left hand and offset by the rotation of the chest (chest node 42f. Moreover, the left hand direction data D53(s) contains three elements that are x, y, and z. The three elements correspond to an x coordinate value, a y coordinate value, and a z coordinate value, respectively of a unit vector representing the direction of the left hand offset by the rotation of the chest (chest node 42f).

In the present embodiment, the pieces of region data containing six elements described above are input to the input layer 44.

Left wrist direction data D54(t) corresponding to an estimation result of the direction of the left wrist at the latest timing (t-th timing) is then finally output from the output layer 52 as the output 54 as described above. As depicted in FIG. 27, the left wrist direction data D54(t) contains three elements that are x, y, and z. The three elements correspond to an x coordinate value, a y coordinate value, and a z coordinate value, respectively of a unit vector representing the direction of the left wrist offset by the rotation of the chest (chest node 42f).

It is noted that the supervisory data described above also contains, for example, three elements corresponding to an x coordinate value, a y coordinate value, and a z coordinate value, respectively of a unit vector representing the direction of the left wrist offset by the rotation of the chest (chest node 42f), similarly to the left wrist direction data D54(t).

In the present embodiment, learning of the intermediate block 46, the first intermediate layer 48, the second intermediate layer 50, and the output layer 52 is then executed on the basis of, for example, the left wrist direction data D54(t) indicating the estimation result. A difference between, for example, the supervisory data contained in the learning data that contains the series of region data described above and the left wrist direction data D54(t) indicating the estimation result may be identified herein. Supervised learning for updating values of parameters of the intermediate block 46, the first intermediate layer 48, the second intermediate layer 50, and the output layer 52 may be then executed on the basis of the identified difference.

In the present embodiment, learning is performed by, for example, the learning data containing the t pieces of region data from the first region data to the t-th region data. Learning may be performed herein by, for example, the learning data containing the t pieces of region data from the first region data to the t-th region data and the supervisory data made to correspond to the t-th region data. The estimation of the direction of the left wrist is then executed using the learned machine learning model completed with learning by, for example, a plurality of pieces of different learning data.

Figure 28:
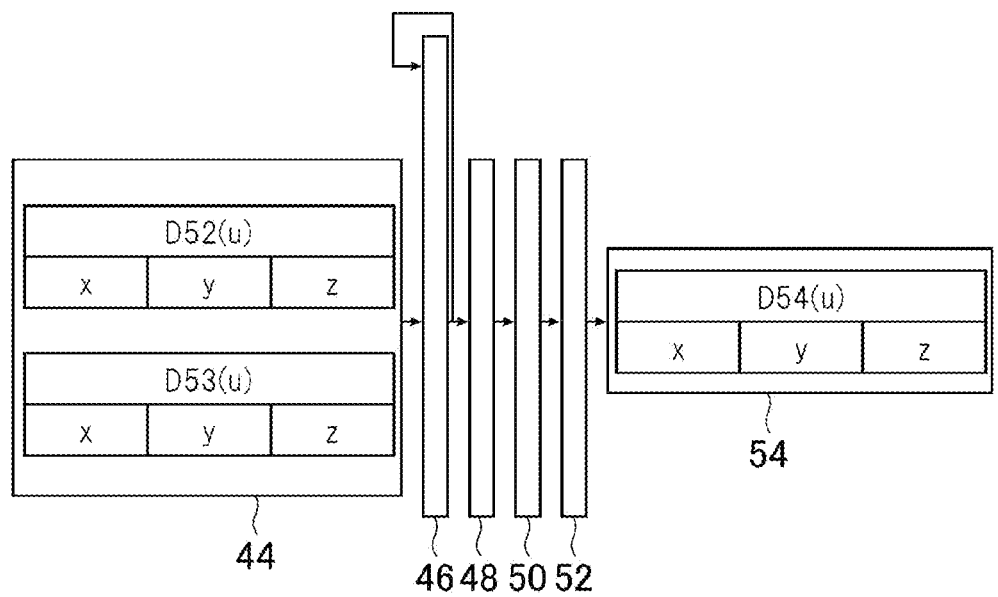
FIG. 28 is a diagram depicting an example of estimation of the direction of the left wrist node using the machine learning model depicted in FIG. 27.

FIG. 28 is a diagram depicting an example of the estimation of the direction of the left wrist using the learned machine learning model.

It is assumed herein that region data is generated on the basis of the data indicating the transmitted position and the transmitted direction of each tracker 12. It is assumed that each region data contains, for example, the left-hand-based chest position data D52 indicating the position of the chest based on the position of the left hand and offset by the rotation of the chest node 42f, and the left hand direction data D53 indicating the direction of the left hand offset by the rotation of the chest node 42f. Furthermore, as described above, in the present embodiment, the region data is repeatedly generated.

In the present embodiment, the latest region data (last generated region data), for example, is input to the input layer 44. In FIG. 28, pieces of data D52 and D53 contained in the latest region data are expressed as D52(u) and D53(u), respectively.

As described above, the left-hand-based chest position data D52(u) contains three elements that are x, y, and z. The three elements correspond to an x coordinate value, a y coordinate value, and a z coordinate value, respectively of the position of the chest based on the position of the left hand and offset by the rotation of the chest (chest node 420 estimated in the processing (4). Moreover, the left hand direction data D53(u) contains three elements that are x, y, and z. The three elements correspond to an x coordinate value, a y coordinate value, and a z coordinate value, respectively of a unit vector representing the direction of the left hand offset by the rotation of the chest (chest node 420 estimated in the processing (4).

Left wrist direction data D54(u) corresponding to an estimation result of the direction of the left wrist at the timing is then finally output from the output layer 52 as the output 54 as described above.

It is noted that a similar method is also applicable to estimation of the direction of the right wrist node 42m.

<Example of Estimation of Whether User Is in Seated Posture or Standing Posture>

Furthermore, in the present embodiment, different learned machine learning models may be prepared depending on whether the user is in a seated posture or a standing posture.

Whether the user is in a seated posture or a standing posture may be estimated herein using learned machine learning models. Estimation of the position, the direction, and the like of each of the regions described above may be executed using the machine learning model selected on the basis of a result of the estimation.

Figure 29:
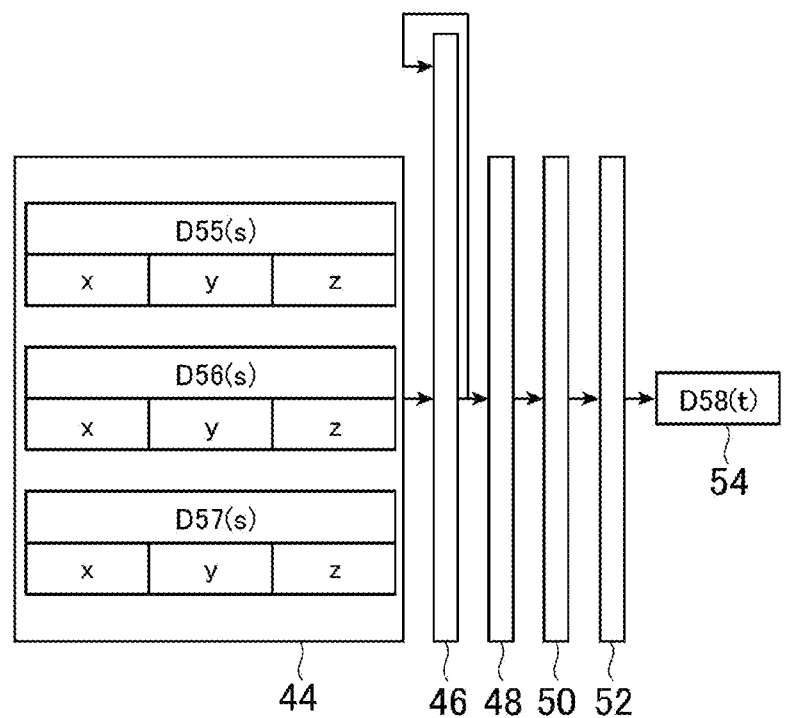
FIG. 29 is a diagram depicting an example of learning of a machine learning model used in estimation of whether a user is in a seated posture or a standing posture.

FIG. 29 is a diagram depicting an example of a machine learning model used in estimation of whether the user is in a seated posture or a standing posture. As depicted in FIG. 29, the machine learning model used in the estimation of whether the user is in a seated posture or a standing posture includes the input layer 44, the intermediate block 46, the first intermediate layer 48, the second intermediate layer 50, and the output layer 52.

In the present embodiment, in learning of the machine learning model depicted in FIG. 29, learning data containing, for example, a plurality of pieces of region data made to correspond to respective timings which are different from one another and each indicating a direction of the head, a position of the head based on a position of the right foot, and a position of the head based on a position of the left foot, all of which are offset by the rotation of the lumbar (lumbar node 42g) (based on the rotation of the lumbar), at the corresponding timing is acquired.

On the basis of, for example, the sensing data output from each of the trackers 12 attached to the head, the right foot, the left foot, and the lumbar when the user having the trackers 12 attached thereto makes various motions in the seated posture, a series of pieces of region data corresponding to the seated posture may be generated herein. Alternatively, on the basis of, for example, an image sequence containing t frames of the user making various motions in the seated posture captured from the external camera, a series of pieces of region data corresponding to the seated posture may be generated. In another alternative, a series of pieces of region data corresponding to the seated posture may be generated on the basis of an operation by an operator viewing such an image sequence.

Learning data containing, for example, the series of pieces of region data corresponding to the seated posture described above and supervisory data having a value set to 1 may be then generated.

Furthermore, on the basis of, for example, the sensing data output from the trackers 12 attached to the head, the right foot, the left foot, and the lumbar, respectively when the user having the trackers 12 attached thereto makes various motions in the standing posture, a series of pieces of region data corresponding to the standing posture may be generated. Alternatively, on the basis of, for example, an image sequence containing t frames of the user making various motions in the standing posture captured from the external camera, a series of pieces of region data corresponding to the standing posture may be generated. In another alternative, a series of pieces of region data corresponding to the standing posture may be generated on the basis of an operation by the operator viewing such an image sequence.

Learning data containing, for example, the series of pieces of region data corresponding to the standing posture described above and supervisory data having a value set to 0 may be then generated.

The pieces of region data contained in the learning data are sequentially input to the input layer 44 in chronological order of the corresponding timings. It is assumed herein that each region data contains, for example, head direction data D55 indicating a direction of the head offset by the rotation of the lumbar, right-foot-based head position data D56 indicating a position of the head based on a position of the right foot and offset by the rotation of the lumbar, and left-foot-based head position data D57 indicating a position of the head based on a position of the left foot and offset by the rotation of the lumbar.

The head direction data at the corresponding timing that is the s-th oldest is herein expressed as D55(s). Furthermore, the right-foot-based head position data at the corresponding timing that is the s-th oldest is expressed as D56(s). Moreover, the left-foot-based head position data at the corresponding timing that is the s-th oldest is expressed as D57(s). A value s is herein an integer equal to or greater than 1 and equal to or smaller than t.

Moreover, in the present embodiment, as depicted in FIG. 29, the head direction data D55(s) contains three elements that are x, y, and z. The three elements correspond to an x coordinate value, a y coordinate value, and a z coordinate value, respectively of the vector representing the direction of the head offset by the rotation of the lumbar. The vector representing the direction of the head offset by the rotation of the chest may be herein, for example, a unit vector representing the direction of the head (head node 42a) (for example, a line-of-sight direction of the head) offset by the rotation of the chest. It is noted that in a case in which the skeleton model 40 further includes a neck node corresponding to a neck, the vector representing the direction of the head offset by the rotation of the chest may be a vector representing a position of the head (head node 42a) based on a position of the neck (neck node). The neck node may be herein, for example, a node present between the head node 42a and the chest node 42f and connected to the head node 42a and the chest node 42f via a link. In this case, the region data contained in the learning data may be generated on the basis of the sensing data output from the trackers 12 attached to the head, the right foot, the left foot, the lumbar, and the neck, respectively when the user having the trackers 12 attached thereto makes various motions.

Furthermore, the right-foot-based head position data D56(s) contains three elements that are x, y, and z. The three elements correspond to an x coordinate value, a y coordinate value, and a z coordinate value, respectively of the position of the head based on the position of the right foot and offset by the rotation of the lumbar.

Moreover, the left-foot-based head position data D57(s) contains three elements that are x, y, and z. The three elements correspond to an x coordinate value, a y coordinate value, and a z coordinate value, respectively of the position of the head based on the position of the left foot and offset by the rotation of the lumbar.

In the present embodiment, the pieces of region data each containing nine (3×3) elements are input to the input layer 44.

As described above, seating probability data D58(t) corresponding to an estimation result of whether the user is in the seated posture or the standing posture at the latest timing (t-th timing) is then finally output from the output layer 52 as the output 54. The seating probability data is data expressed by a real number, for example, equal to or greater than 0 and equal to or smaller than 1. A probability of the user in the seated posture is higher as a value of the seating probability data is greater, and the probability of the user in the seated posture is lower as the value of the seating probability data is smaller.

In the present embodiment, learning of the intermediate block 46, the first intermediate layer 48, the second intermediate layer 50, and the output layer 52 is then executed on the basis of, for example, the seating probability data D58(t) indicating the estimation result. A difference between, for example, the supervisory data contained in the learning data that contains the series of region data described above and the seating probability data D58(t) indicating the estimation result may be identified herein. Supervised learning for updating values of parameters of the intermediate block 46, the first intermediate layer 48, the second intermediate layer 50, and the output layer 52 may be then executed on the basis of the identified difference.

In the present embodiment, learning is performed by, for example, the learning data containing the t pieces of region data from the first region data to the t-th region data. Learning may be performed herein by, for example, the learning data containing the t pieces of region data from the first region data to the t-th region data and the supervisory data made to correspond to the t pieces of region data. The estimation of whether the user in the seated posture or the standing posture is then executed using the learned machine learning models completed with the learning by, for example, a plurality of pieces of different learning data corresponding to the seated posture and a plurality of pieces of different learning data corresponding to the standing posture.

Figure 30:
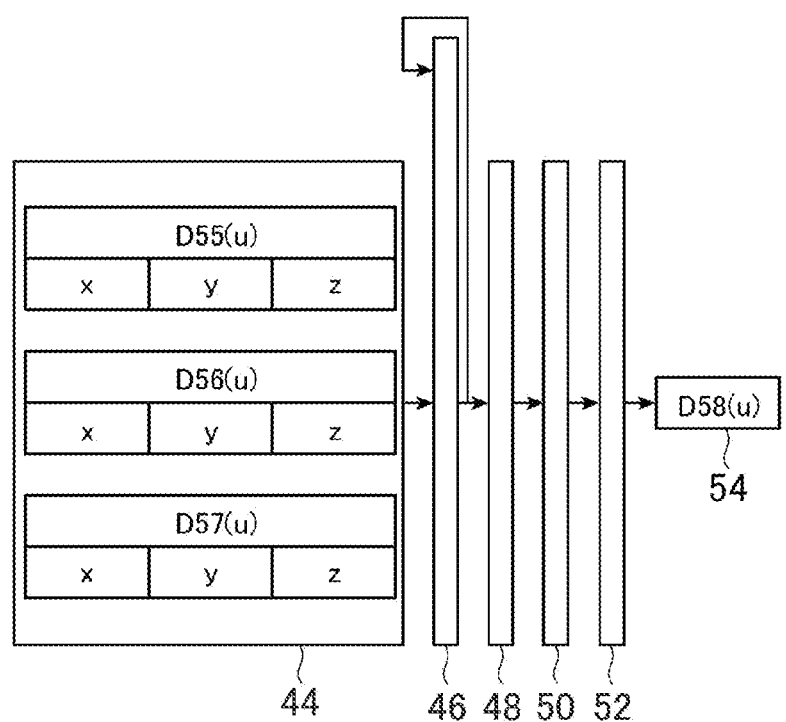
FIG. 30 is a diagram depicting an example of estimation of whether the user is in a seated posture or a standing posture using the learned machine learning model depicted in FIG. 29.

FIG. 30 is a diagram depicting an example of estimation of whether the user is in the seated posture or the standing posture using the learned machine learning model.

It is assumed herein that region data is generated on the basis of the data indicating the transmitted position and the transmitted direction of each tracker 12.

As described above, it is assumed that each region data contains the head direction data D55 indicating the direction of the head offset by the rotation of the lumbar, the right-foot-based head position data D56 indicating the position of the head based on the position of the right foot and offset by the rotation of the lumbar, and the left-foot-based head position data D57 indicating the position of the head based on the position of the left foot and offset by the rotation of the lumbar. Furthermore, as described above, in the present embodiment, the region data is repeatedly generated. It is noted that in a case in which the head direction data D55 is the vector representing the position of the head (head node 42a) based on the position of the neck (neck node), the head direction data D55 may be generated on the basis of latest positions of the neck node and the head node 42a.

In the present embodiment, the latest region data (last generated region data), for example, is input to the input layer 44. In FIG. 30, the head direction data contained in the latest region data is expressed as D55(u). Furthermore, the right-foot-based head position data contained in the latest region data is expressed as D56(u). Moreover, the left-foot-based head position data contained in the latest region data is expressed as D57(u).

As described above, the head direction data D55(u) contains three elements that are x, y, and z. The three elements correspond to an x coordinate value, a y coordinate value, and a z coordinate value, respectively of the vector representing the direction of the head offset by the rotation of the lumbar.

Furthermore, the right-foot-based head position data D56 (u) contains three elements that are x, y, and z. The three elements correspond to an x coordinate value, a y coordinate value, and a z coordinate value, respectively of the position of the head based on the position of the right foot and offset by the rotation of the lumbar.

Moreover, the left-foot-based head position data D57(u) contains three elements that are x, y, and z. The three elements correspond to an x coordinate value, a y coordinate value, and a z coordinate value, respectively of the position of the head based on the position of the left foot and offset by the rotation of the lumbar.

As described above, seating probability data D58(u) corresponding to an estimation result of whether the user is in the seated posture or the standing posture at the timing is then finally output from the output layer 52 as the output 54.

In a case in which the value of the seating probability data D58(u) is herein, for example, equal to or greater than 0.5, the user may be estimated to be in the seated posture; otherwise, the user may be estimated to be in the standing posture.

Estimation of the position, the direction, and the like of each of the regions described above may be executed using the learned machine learning model selected on the basis of a result of the estimation.

It is noted that it is not always necessary to estimate whether the user is in the seated posture or the standing posture using the machine learning model. For example, it may be estimated whether the user is in the seated posture or the standing posture using a given created logic.

Furthermore, values obtained by dividing, by a body size, relative values based on the body size, that is, measurement results by the sensors provided in the trackers 12 may be used as a value of the right-hand-based head position data D14, a value of the left-hand-based head position data D15, a value of the left-hand-based chest position data D17, a value of the right hand height data D20, a value of the left hand height data D21, a value of the right-hand-based head position data D30, a value of the left-hand-based head position data D31, a value of the right-hand-based head position data D35, a value of the left-hand-based head position data D36, a value of the right-foot-based head position data D37, a value of the left-foot-based head position data D38, a value of the right-hand-based head position data D42, a value of the left-hand-based head position data D43, a value of the left-foot-based head position data D44, a value of the right-foot-based head position data D45, a value of the right-hand-based chest position data D49, a value of the left-hand-based chest position data D50, a value of the left-hand-based chest position data D52, a value of the right-foot-based head position data D56, and a value of the left-foot-based head position data D57.

<Example of Estimation of Body Size>

The body size may be herein one input by the user in advance, which is, for example, a body size sequentially estimated on the basis of the positions of the trackers 12 whenever the estimation described above is performed.

Figure 31:
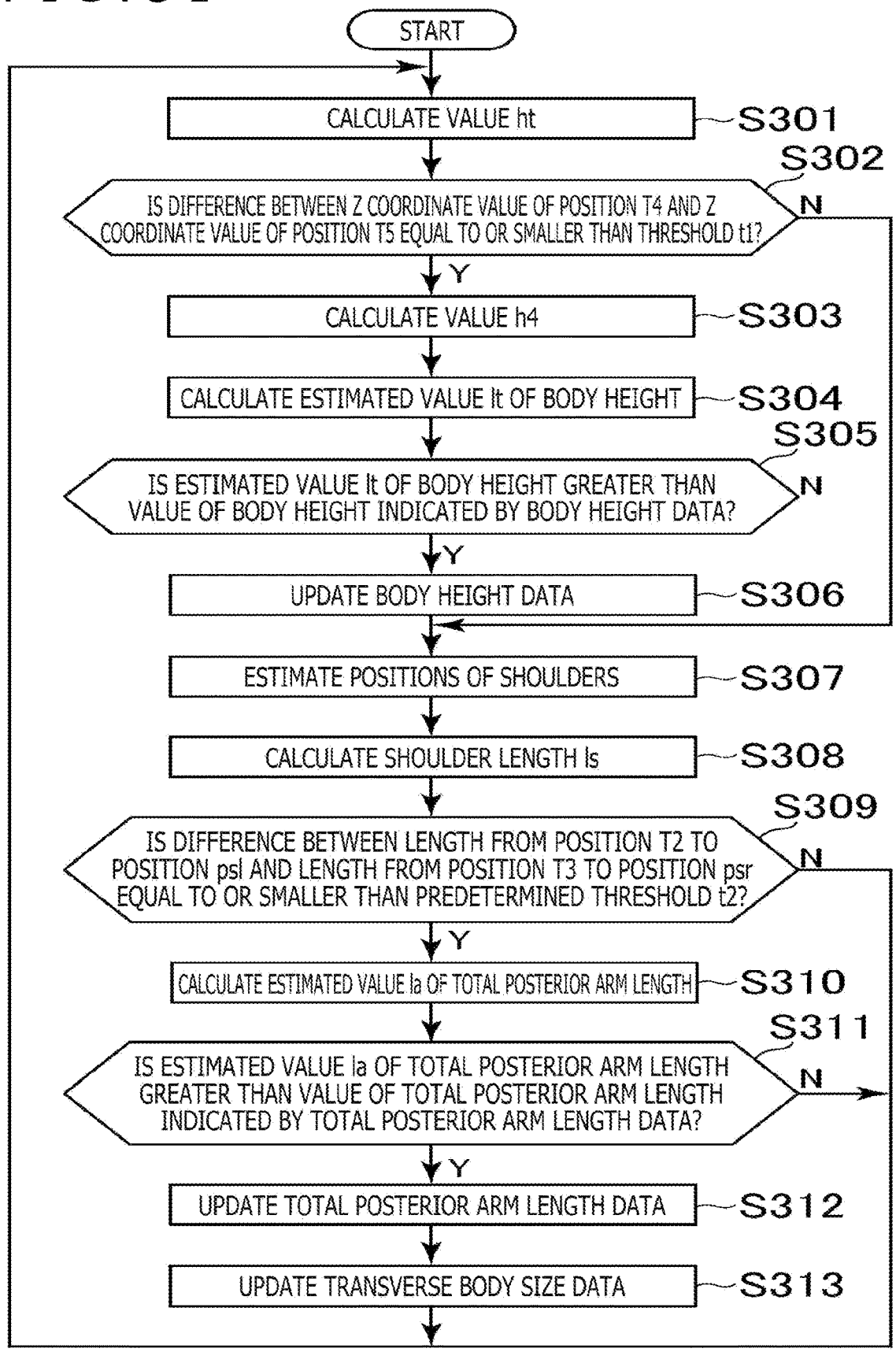
FIG. 31 is a flowchart depicting an example of a flow of processing performed by the entertainment apparatus according to one embodiment of the present invention.
Figure 32:
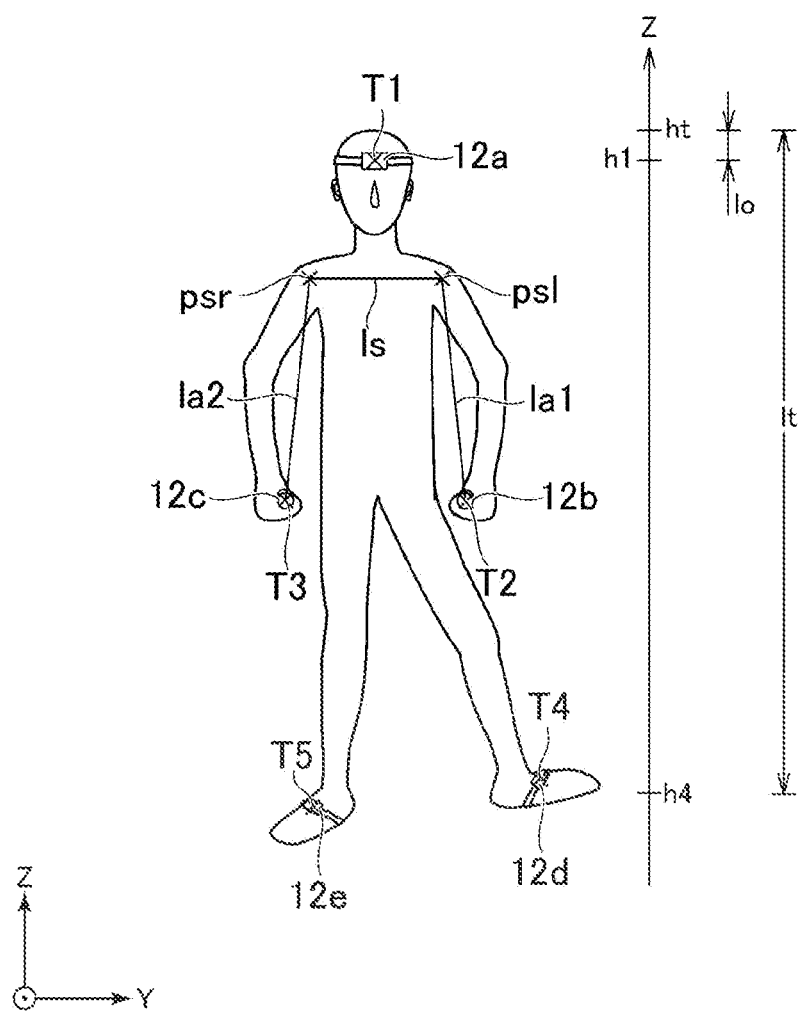
FIG. 32 is a schematic diagram depicting an example of a user's game playing state.

An example of a flow of body size estimation processing performed by the entertainment apparatus 14 according to the present embodiment will be described herein with reference to a flowchart exemplarily depicted in FIG. 31 and a schematic diagram depicted in FIG. 32. FIG. 32 is a schematic diagram depicting an example of a user's game playing state. In the present processing example, the following processing illustrated in S301 to S313 is repeatedly executed at a predetermined sampling rate. The processing depicted in the present processing example may be executed just before execution of the various types of estimation processing described above. It is also assumed that a user's longitudinal direction is an X-axis direction, a user's transverse direction is a Y-axis direction, and a height direction is a Z-axis direction.

In addition, in the following description, positions of the trackers 12a, 12b, 12c, 12d, and 12e indicated by the posture data acquired in the processing illustrated in S201 are expressed as T1, T2, T3, T4, and T5, respectively, as depicted in FIG. 32.

Furthermore, it is assumed in the following description that body size data indicating a body size of the user is stored in the posture data storage section 82. A predetermined value may be set herein as, for example, an initial value of the body size data. Alternatively, a value according to a user's age may be set as the initial value of the body size data. Since the body size data is updated so that the body size indicated by the body size data gradually grows as described later, it is desirable to set a value slightly smaller than a value indicating a general body size of the user as the initial value of the body size data.

It is noted that the posture data storage section 82 may store body height data indicating a body height of the user. In addition, the posture data storage section 82 may store total posterior arm length data indicating a length of a total posterior arm length. Furthermore, the posture data storage section 82 may store transverse body size data indicating a body size of the user in the transverse direction.

First, the entertainment apparatus 14 calculates a value obtained by adding a predetermined offset value lo to a Z coordinate value h1 of the position T1 as a Z coordinate value ht of a vertex of the head (S301).

The entertainment apparatus 14 then confirms whether or not a difference between a Z coordinate value of the position T4 and a Z coordinate value of the position T5 is equal to or smaller than a predetermined threshold t1 (S302).

In a case of confirming that the difference between the Z coordinate value of the position T4 and the Z coordinate value of the position T5 is equal to or smaller than the threshold t1 (S302: Y), the entertainment apparatus 14 calculates a Z coordinate value h4 that is an average value of the Z coordinate value of the position T4 and the Z coordinate value of the position T5 (S303).

The entertainment apparatus 14 then calculates a difference between the Z coordinate value ht of the vertex of the head calculated in the processing illustrated in S301 and the Z coordinate value h4 calculated in the processing illustrated in S303 as an estimated value lt of the body height (S304).

The entertainment apparatus 14 then confirms whether or not the estimated value lt of the body size calculated in the processing illustrated in S304 is greater than a value of the body height indicated by body height data stored in the posture data storage section 82 (S305).

It is assumed to be confirmed that the value lt is greater than the value of the body height indicated by the body height data stored in the posture data storage section 82 (S305: Y). In this case, the entertainment apparatus 14 updates the body height data stored in the posture data storage section 82 so that the body height data indicates the estimated value lt of the body size calculated in the processing illustrated in S304 (S306).

The entertainment apparatus 14 then estimates positions of shoulders of the user (S307). The entertainment apparatus 14 may estimate herein a value indicating a position psr of the right shoulder by adding a predetermined offset value psro to a value indicating the position T1. In addition, for example, the entertainment apparatus 14 may estimate a value indicating a position psl of the left shoulder by adding another predetermined offset value pslo to the value indicating the position T1. It is noted that the processing illustrated in S307 is executed even in a case in which it is confirmed that the difference between the Z coordinate value of the position T4 and the Z coordinate value of the position T5 is not equal to or smaller than the threshold t1 in the processing illustrated in S303 (S302: N). In this case, the processing illustrated in S303 to S306 is skipped since there is a high probability that the value indicating the position T4 and the value indicating the position T5 are abnormal values based on an error. Furthermore, the processing illustrated in S307 is executed even in a case in which it is confirmed that the value lt is not greater than the value of the body height indicated by the body height data stored in the posture data storage section 82 in the processing illustrated in S305 (S305: N).

The entertainment apparatus 14 then calculates a length between the position psr of the right shoulder and the position psl of the left shoulder estimated in the processing illustrated in S307 as a shoulder length is (S308).

The entertainment apparatus 14 then confirms whether or not a difference between a length from the position T2 to the position psl and a length from the position T3 to the position psr is equal to or smaller than a predetermined threshold t2 (S309).

It is assumed to be confirmed that the difference between a length la1 from the position T2 to the position psl and a length la2 from the position T3 to the position psr is equal to or smaller than a predetermined threshold t2 (S309: Y). In this case, the entertainment apparatus 14 calculates an average value between a value indicating the length la1 from the position T2 to the position psr and a value indicating the length la2 from the position T3 to the position psl as an estimated value la of a total posterior arm length (S310).

The entertainment apparatus 14 then confirms whether or not the estimated value la calculated in the processing illustrated in S310 is greater than a value of the total posterior arm length indicated by total posterior arm length data stored in the posture data storage section 82 (S311).

It is assumed to be confirmed that the value la is greater than the value indicated by the total posterior arm length data stored in the posture data storage section 82 (S311: Y). In this case, the entertainment apparatus 14 updates the total posterior arm length data stored in the posture data storage section 82 so that the total posterior arm length data indicates the estimated value la of the total posterior arm length calculated in the processing illustrated in S310 (S312).

The entertainment apparatus 14 then updates the transverse body size data stored in the posture data storage section 82 so that the transverse body size data indicates a sum of a double of the value of the total posterior arm length data and the value of the shoulder length is described above (S313). The entertainment apparatus 14 then returns to the processing illustrated in S301.

For example, as the values of the various types of data described above, values obtained by dividing values calculated on the basis of measurement results by the sensors provided in the trackers 12 by the value of the body height data, the value of the total posterior arm length, or the value of the transverse body size data stored in the posture data storage section 82 may be used.

<Example of Determination of Position of Foot>

Furthermore, in the present embodiment, the user may not attach the trackers 12d and 12e to the left foot and the right foot, respectively. Furthermore, a machine learning model may be used to determine a position and a direction of the left foot node 42d and a position and a direction of the right foot node 42e.

Figure 11:
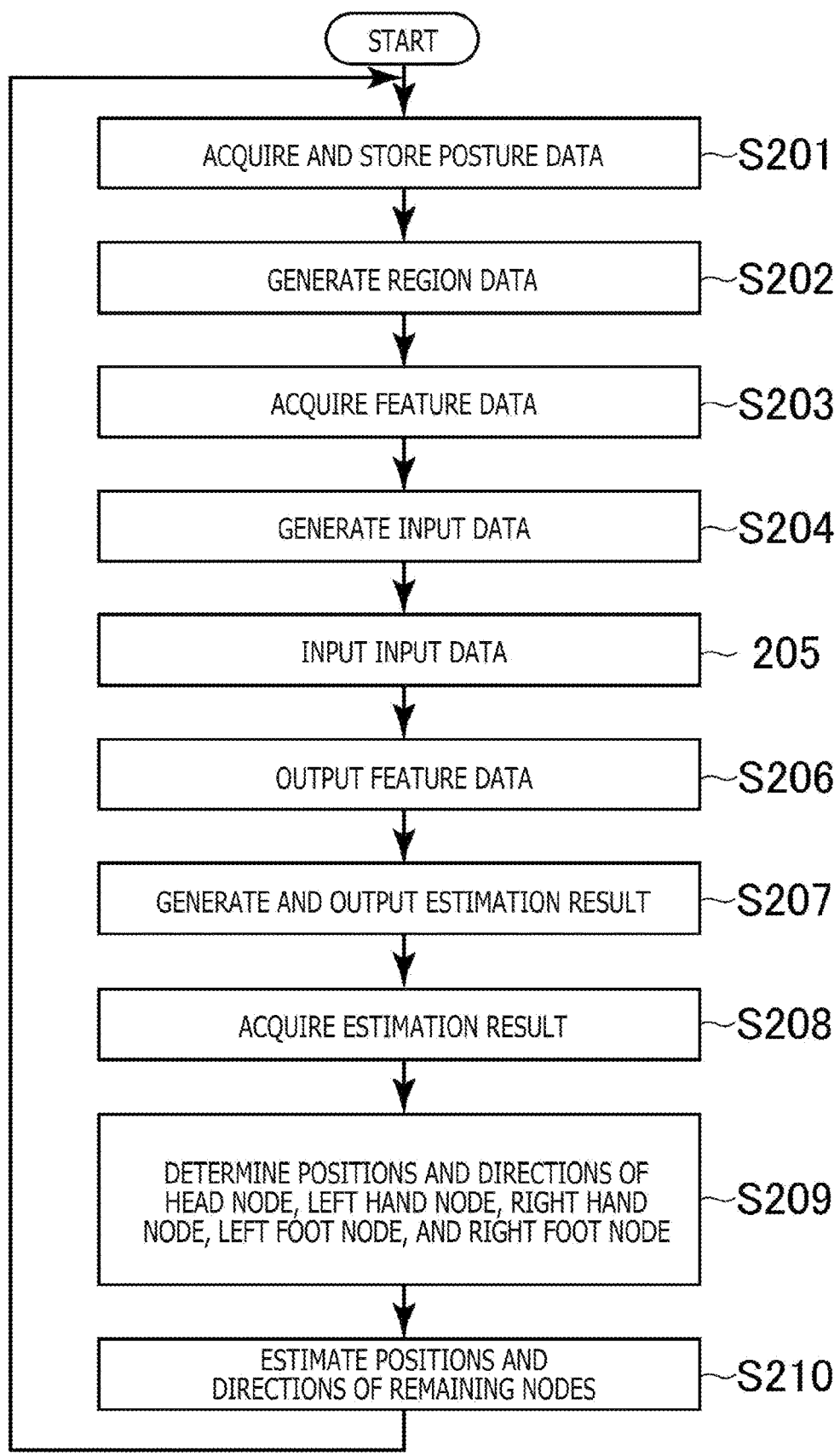
FIG. 11 is a flowchart depicting an example of a flow of processing performed by the entertainment apparatus according to one embodiment of the present invention.

In this case, for example, in the processing depicted in S201 depicted in FIG. 11, the posture data acquisition section 80 acquires posture data indicating positions and directions of the trackers 12 regarding the individual trackers 12a to 12c.

Then, on the basis of the posture data, a position and a direction of the left foot node 42d and a position and a direction of the right foot node 42e at the latest timing are determined.

Further, by the processing depicted in S202, region data is generated on the basis of the acquired posture data, the determined position and direction of the left foot node 42d, and the determined position and direction of the right foot node 42e.

After this, processing depicted in S203 to S209 is executed on the basis of the region data generated in this manner. It is noted that, by the processing depicted in S209, positions and directions of the left foot node 42d and the right foot node 42e are not determined.

Then, in the estimation of positions and directions of the nodes 42 by inverse kinetics in S210, as the positions and the directions of the left foot node 42d and the right foot node 42e, those determined in such a manner as described above on the basis of the individual posture data about the trackers 12a to 12c are used.

If the present embodiment is configured in such a manner as described above, then the user can perform body tracking of the overall body without attaching trackers to the feet. Therefore, when body tracking of the overall body is to be performed, there is no necessity for the user to perform cumbersome attachment of the trackers to the feet. Furthermore, motions of the overall body of the user can be represented precisely without the necessity for the user to attach the trackers to the feet.

In the following, determination of a position and a direction of the left foot node 42d and a position and a direction of the right foot node 42e in which a machine learning model is used is described furthermore.

In the present embodiment, specification of a position and a direction of a tracker is performed at a predetermined sampling rate as described hereinabove. In the following description, it is assumed that, for each of the trackers 12a to 12c, specification of a position and a direction of the tracker 12 is performed at a predetermined sampling rate. Then, in response to specification of positions and directions of the trackers 12a to 12c, such estimation of positions and directions of all nodes 42 included in the skeleton model 40 during one cycle as denoted by S201 to S210 described above is executed.

Here, in the present embodiment, after posture data indicating positions and directions of the trackers 12 at the latest specific timing generated by the trackers 12a to 12c are stored into the posture data storage section 82 by the processing in step S201 described hereinabove, a determination processing of positions and directions of the left foot node 42d and the right foot node 42e is executed.

The determination processing includes, for example, (1) operative foot specification processing, (2) foot posture determination processing, (3) tentative horizontal position estimation processing, (4) tentative height estimation processing, and (5) foot position updating processing. In the following, each processing is described.

(1) Operative Foot Specification Processing

Usually, a human being does not move the left foot and the right foot at the same time. Taking this into account, in the present embodiment, for example, one of the left foot and the right foot is set as an operative foot while the other foot is set as an inoperative foot in advance. It is assumed here that, in an initial state, the left foot is set as the operative foot.

Furthermore, in the present embodiment, for example, a direction and a magnitude of the speed of the tracker 12a attached to the head of the user is specified. Here, for example, a value obtained by dividing the difference between a value of data indicating a position of the tracker 12a at the immediately preceding timing and a value of data indicating a position at the relevant timing by an elapsed time period from the immediately preceding timing to the relevant timing is used as a value indicating the speed.

Then, it is decided whether or not the specified magnitude of the speed exceeds a predetermined threshold value. In a case where the specified magnitude of the speed exceeds the predetermined threshold value, it is specified whether the direction of the speed is a left foot direction or a right foot direction of the user.

Figure 33:
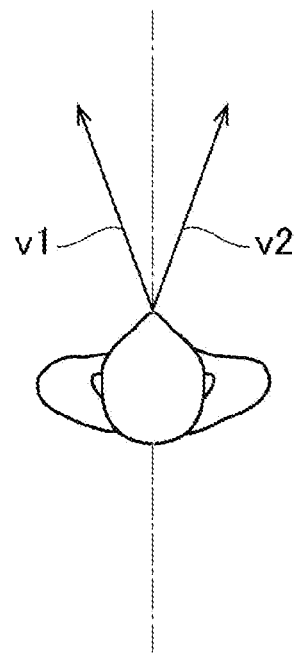
FIG. 33 is a diagram schematically depicting an example of determination, based on a direction of a speed of the head, of an operative foot.

For example, if the direction of the speed of the head is a direction on the left foot side as indicated by an arrow mark v1 with reference to the direction of the chest node 42f or the direction of the head node 42a as depicted in FIG. 33, then it is specified that the direction of the speed is the left foot direction. On the other hand, if the direction of the speed of the head is a direction on the right foot side as indicated by an arrow mark v2, then it is specified that the direction of the speed is the right foot direction.

Then, in a case where it is specified that the direction of the speed is the left foot direction, the left foot is determined as the operative foot. In a case where it is specified that the direction of the speed is the right foot direction, the right foot is determined as the operative foot.

Generally, the head of a human being moves in a direction of a foot to be operated. Taking this into account, by specifying the operative foot in such a manner as described, in the present embodiment, it becomes possible to precisely specify the operative foot.

On the other hand, in a case where the specified magnitude of the speed is equal to or smaller than the predetermined threshold value, the distance between the position of the operative foot specified in the (5) foot position updating processing at the immediately preceding timing (for example, in the immediately preceding cycle) and a tentative position of the operative foot estimated by the (3) tentative horizontal position estimation processing and the (4) tentative height estimation processing is specified. Then, in a case where the specified distance is equal to or smaller than a predetermined distance (for example, 1 cm), one of the operative foot and the inoperative foot is changed to the other, and the other is changed to the one. For example, in a case where the operative foot is the right foot, the right foot is changed to the inoperative foot, and the left foot is changed to the operative foot. On the contrary, in a case where the operative foot is the left foot, the left foot is changed to the inoperative foot, and the right foot is changed to the operative foot.

Generally, a human being moves the left and right feet alternately, for example, while walking. At this time, the left and right feet that are moved alternately repeat acceleration and deceleration. Taking this into account, by specifying the operative foot in such a manner as described above, in the present embodiment, the operative foot can be specified precisely.

Specification of the operative foot based on the speed of the tracker 12a is performed in such a manner as described above.

(2) Foot Posture Determination Process

In the present embodiment, for example, a rotation component of the direction of the chest node 42f or the lumbar node 42g estimated at the immediately preceding timing (for example, in the immediately preceding cycle) around an axis in the vertical direction (Z direction) is determined as a rotation component of the directions of the left foot and the right foot around an axis in the vertical direction (Z direction).

Then, on the basis of the distance, which was determined at the immediately preceding timing, from a line that passes the chest node 42f or the lumbar node 42g and extends in the vertical direction (Z direction), to the position of the left foot, a rotation component of the direction of the left foot around an axis in a left-right horizontal direction (line on the XY plane) when the direction of the chest node 42f or the lumbar node 42g is taken as the front is determined. Here, for example, the magnitude of the rotation component may be determined such that it increases as the distance increases.

Similarly, on the basis of the distance from a line passing the chest node 42f or the lumbar node 42g and extending in the vertical direction (Z direction) to the position of the right foot, a rotation component of the direction of the right foot around an axis in the left-right horizontal direction (line on the XY plane) when the direction of the chest node 42f or the lumbar node 42g is taken as the front is determined. Here, for example, the magnitude of the rotation component may be determined such that it increases as the distance increases.

The directions of the left foot and the right foot are determined in such a manner as described above.

(3) Tentative Horizontal Position Estimation Processing

In the present embodiment, tentative horizontal position estimation processing for estimating tentative positions (xy coordinate values) of the left foot and the right foot on a horizontal plane (each hereinafter referred to as a tentative horizontal position) is executed using a machine learning model.

Figure 34:
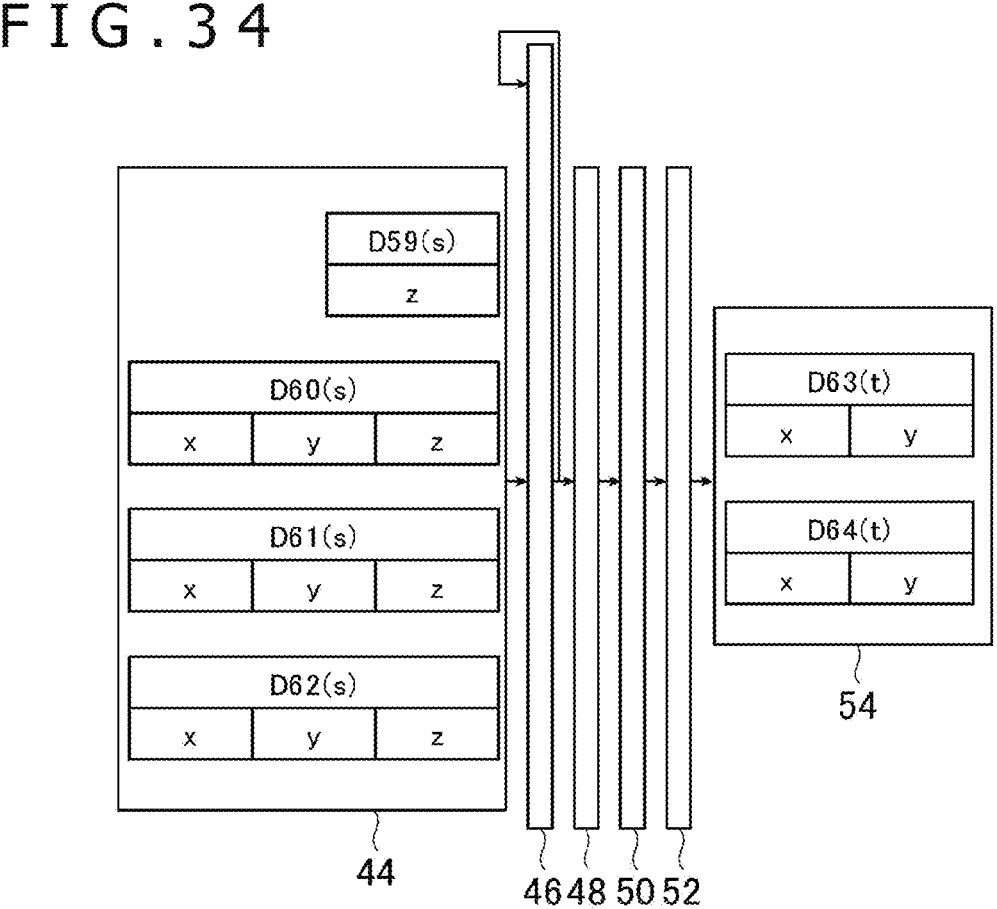
FIG. 34 is a diagram depicting an example of learning of a machine learning model used in estimation of a tentative horizontal position of a foot with reference to the position of the head.

FIG. 34 is a diagram depicting an example of learning of a machine learning model used for estimation of tentative horizontal positions of the left foot and the right foot. As depicted in FIG. 34, the machine learning model used for estimation of tentative horizontal positions of the left foot and the right foot includes an input layer 44, an intermediate block 46, a first intermediate layer 48, a second intermediate layer 50, and an output layer 52.

In the present embodiment, for example, in learning of the machine learning model depicted in FIG. 34, learning data including t pieces of region data individually associated with timings different from each other and teacher data are acquired. Each of the t pieces of region data indicates a height of the head, a direction of the head offset by rotation of the chest node 42f, a position of the head offset by rotation of the chest (chest node 42f) with reference to the position of the left hand, and a position of the head offset by rotation of the chest with reference to the position of the right hand at the timings.

Here, for example, the teacher data may be, for example, data indicating a tentative horizontal position of the left foot offset by rotation of the chest and taken with reference to the position of the head and a tentative horizontal position of the right foot offset by rotation of the chest and taken with reference to the position of the head. Further, the teacher data may be generated in such a manner as described hereinabove on the basis of sensing data output from the trackers 12 attached individually to the head, the left hand, the right hand, the left foot, the right foot, and the chest of a user that perform various movements, a moving image including t frames and obtained by imaging the user who performs various movements using an external camera, and so forth.

Then, region data included in the learning data are sequentially input to the input layer 44 in chronological order of the timings associated therewith as described hereinabove. Here, it is assumed that, for example, the region data include head height data D59 indicating a height of the head, head direction data D60 indicating a direction of the head offset by rotation of the chest, left hand reference head position data D61 indicating the position of the head with reference to the position of the left hand offset by rotation of the chest, and right hand reference head position data D62 indicating the position of the head with reference to the position of the right hand offset by rotation of the chest.

Here, for example, the data D59 to D62 whose associated timings are the s-th oldest timing are represented as D59(s) to D62(s), respectively, similarly to those described hereinabove. Here, the value s is an integer equal to or higher than 1 but equal to or lower than t.

Furthermore, in the present embodiment, each of the head height data D59(s) includes one element z. The element z corresponds to a value obtained by subtracting the z coordinate value of the reference position from the z coordinate value of the position of the head. Here, the reference position may be, for example, a predetermined position corresponding to the position of the floor. Alternatively, the reference position may be the position of the left foot, the position of the right foot, a midpoint position between the position of the left foot and the position of the right foot, or a like position.

Furthermore, in the present embodiment, the head direction data D60(s) includes three elements of x, y, and z as depicted in FIG. 34. The three elements correspond to an x coordinate value, a y coordinate value, and a z coordinate value of a unit vector representing a direction of the head offset by rotation of the chest, respectively.

Furthermore, in the present embodiment, the left hand reference head position data D61(s) includes three elements of x, y, and z as depicted in FIG. 34. The three elements correspond to an x coordinate value, a y coordinate value, and a z coordinate value of the position of the head with reference to the left hand offset by rotation of the chest, respectively. Further, the right hand reference head position data D62(s) includes three elements of x, y, and z. The three elements correspond to an x coordinate value, a y coordinate value, and a z coordinate value of the position of the head with reference to the position of the right hand offset by rotation of the chest, respectively.

In the present embodiment, region data including the ten elements described above is input to the input layer 44.

Then, as described hereinabove, left foot tentative horizontal position data D63(t) that corresponds to an estimation result of the tentative horizontal position of the left foot with reference to the position of the head at the latest timing (t-th timing) and right foot tentative horizontal position data D64(t) that corresponds to an estimation result of the tentative horizontal position of the right foot with reference to the position of the head at the latest timing (t-th timing) are output finally as an output 54 from the output layer 52. As depicted in FIG. 34, the left foot tentative horizontal position data D63(t) includes two elements of x and y. The two elements correspond to an x coordinate value and a y coordinate value of the position of the left foot with reference to the position of the head offset by rotation of the chest, respectively. As depicted in FIG. 34, the right foot tentative position data D64(t) includes two elements of x and y. The two elements correspond to an x coordinate value and a y coordinate value of the position of the right foot with reference to the position of the head offset by rotation of the chest, respectively.

Then, in the present embodiment, for example, on the basis of the left foot tentative horizontal position data D63(t) and the right foot tentative horizontal position data D64(t) indicating results of estimation, learning of the intermediate block 46, the first intermediate layer 48, the second intermediate layer 50, and the output layer 52 is executed. Here, for example, the difference between the teacher data included in the learning data including the sequence of region data described hereinabove and the left foot tentative horizontal position data D63(t) and the right foot tentative horizontal position data D64(t) indicating the estimation results may be specified. Then, supervised learning in which the values of the parameters of the intermediate block 46, the first intermediate layer 48, the second intermediate layer 50, and the output layer 52 are updated on the basis of the specified difference may be executed.

In the present embodiment, for example, learning with learning data including the t pieces of region data from the first region data to the t-th region data is performed. Here, for example, learning with the learning data including the t pieces of region data from the first region data to the t-th region data and the above-described teacher data associated with the t-th region data may be performed. Then, estimation of tentative horizontal positions of the left foot and the right foot is executed, for example, using a learned machine learning model for which learning with a plurality of learning data different from each other has been performed.

Figure 35:
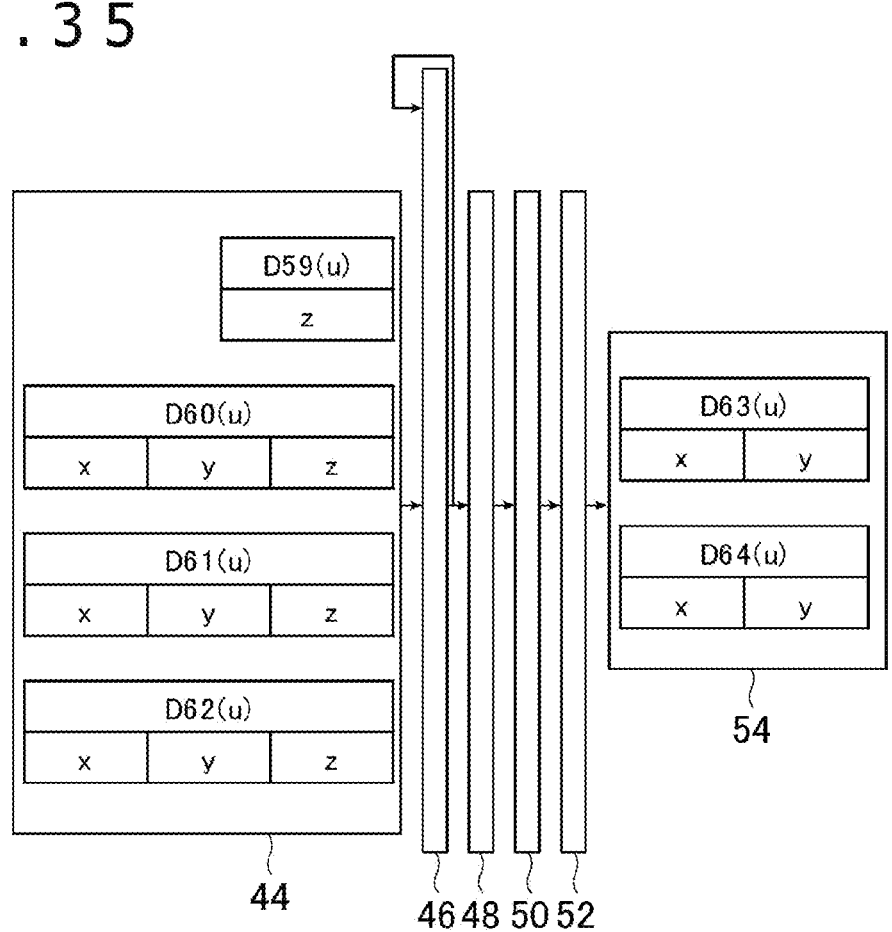
FIG. 35 is a diagram depicting an example of estimation of a tentative horizontal position of a foot with reference to the position of the head in which the machine learning model depicted in FIG. 34 is used.

FIG. 35 is a view depicting an example of estimation of tentative horizontal positions of the left foot and the right foot using a machine learning model learned already.

Here, it is assumed that region data is generated, for example, on the basis of data representing the positions and the directions of the trackers 12a to 12c to be transmitted. It is assumed that the region data includes head height data D59 indicating a height of the head, head direction data D60 indicating a direction of the head offset by rotation of the chest, left hand reference head position data D61 indicating a position of the head with reference to the position of the left hand offset by rotation of the chest, and right hand reference head position data D62 indicating a position of the head with reference to the position of the right hand offset by rotation of the chest. As described hereinabove, in the present embodiment, for example, region data is generated repeatedly.

Then, in the present embodiment, for example, the latest region data (region data generated last) is input to the input layer 44. In FIG. 35, the data D59 to D62 included in the latest region data are represented as D59($u$) to D62($u$), respectively.

As described hereinabove, the head height data D59($u$) includes one element z. The element z corresponds to a value obtained by subtracting a z coordinate value of a reference position from a z coordinate value of the position of the head. Here, the reference position may be, for example, a predetermined position corresponding to the position of the floor as described hereinabove. Alternatively, the reference position may be the position of the left foot determined by the (5) foot position updating processing at an immediately preceding timing to the latest timing, the position of the right foot determined by the (5) foot position updating processing at the immediately preceding timing, a midpoint position between the position of the left foot determined by the (5) foot position updating processing and the position of the right foot determined by the (5) foot position updating processing at the immediately preceding timing, or a like position as hereinafter described.

Meanwhile, the head direction data D60($u$) includes three elements of x, y, and z. The three elements correspond to an x coordinate value, a y coordinate value, and a z coordinate value of a unit vector representing a direction of the head offset by rotation of the chest, respectively.

Furthermore, the left hand reference head position data D61($u$) includes such three elements as x, y, and z. The three elements correspond to an x coordinate value, a y coordinate value, and a z coordinate value of a position of the head with reference to the position of the left hand offset by rotation of the chest, respectively. Meanwhile, the right hand reference head position data D62($u$) includes such three elements as x, y, and z. The three elements correspond to an x coordinate value, a y coordinate value, and a z coordinate value of a position of the head with reference to the position of the right hand offset by rotation of the chest, respectively.

Then, as described hereinabove, the left hand tentative horizontal position data D63($u$) corresponding to an estimation result of the tentative horizontal position of the left foot with reference to the position of the head at the timing and the right hand tentative horizontal position data D64($u$) corresponding to an estimation result of the tentative horizontal position of the right foot with reference to the position of the head at the timing are finally output as an output 54 from the output layer 52.

It is noted that the tentative horizontal position of the left foot on the global coordinate system can be specified on the basis of the left hand tentative horizontal position data D63($u$) and the position of the tracker 12a. Further, the tentative horizontal position of the right foot on the global coordinate system can be specified on the basis of the right hand tentative horizontal position data D64($u$) and the position of the tracker 12a.

The tentative horizontal positions of the left foot and the right foot are estimated in such a manner as described above.

(4) Tentative Height Estimation Processing

In the present embodiment, a magnitude and a direction of the speed of a foot are specified, for example, for each of the left foot and the right foot. Here, a magnitude and a direction of the speed of a foot may be specified on the basis of positions of the feet determined by the (5) foot position updating processing in the two immediately preceding cycles. Then, for each of the feet, a tentative height (z coordinate value) of the foot (hereinafter referred to as a tentative height) is estimated. For example, a tentative height of the left foot is estimated on the basis of the magnitude of the specified speed of the left foot. Further, a tentative height of the right foot is estimated on the basis of the specified magnitude of the speed of the right foot. The possibility is high that, as the magnitude of the speed of a foot increases, the foot may rise higher. Taking this into account, the tentative height of a foot may be estimated such that it increases (for example, the foot is spaced more away from the floor or the ground surface) as the specified magnitude of the speed of the foot increases.

(5) Foot Position Updating Processing

In the present embodiment, a tentative position of a foot (hereinafter referred to as a tentative position) is estimated, for example, on the basis of an estimated tentative horizontal position and an estimated tentative height. For example, a tentative position of the left foot is estimated on the basis of a tentative horizontal position of the left foot estimated by the (3) tentative horizontal position estimation processing and a tentative height of the left foot estimated by the (4) tentative height estimation processing. Further, a tentative position of the right foot is estimated on the basis of the (3) tentative horizontal position estimation processing and a tentative height of the right foot estimated by the (4) tentative height estimation processing.

In the present embodiment, with the operative foot and the inoperative foot, coefficients different from each other are individually associated in advance. In the following description, the coefficient associated with the operative foot is referred to as a first coefficient m1, and the coefficient associated with the inoperative foot is referred to as a second coefficient m2. Further, the first coefficient m1 and the second coefficient m2 are real numbers equal to or higher than 0 but equal to or lower than 1, and the first coefficient m1 is higher than the second coefficient m2.

Furthermore, in the present embodiment, for example, a position obtained by interpolating a tentative position of a foot estimated at the latest timing and a position of the foot determined by the position updating processing at a timing immediately preceding the latest timing is determined as a position of the foot at the latest timing.

Figure 36:
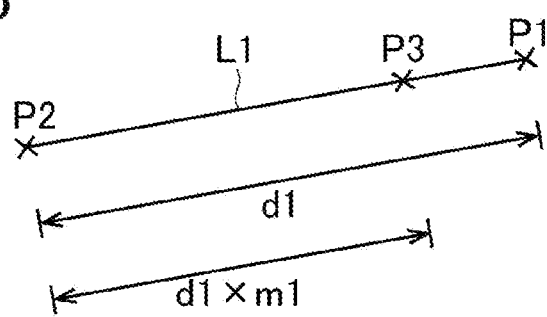
FIG. 36 is a diagram illustrating an example of a determination method of a position of an operative foot.

FIG. 36 depicts a position P1 that is a tentative position of the operative foot at the latest timing and a position P2 that is a position of the operative foot determined by the foot position updating processing at the timing immediately preceding the latest timing.

Here, for the operative foot, a position P3 that is a position on a line segment L1 interconnecting the position P1 and the position P2 and is spaced, by a distance obtained by multiplying a distance d1 between the position P1 and the position P2 by the first coefficient m1, from the position P2 is determined as a position of the operative foot at the latest timing.

Figure 37:
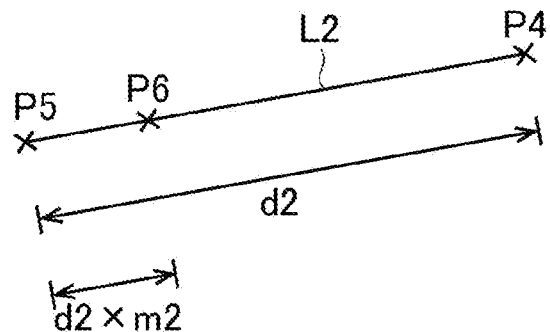
FIG. 37 is a diagram illustrating an example of a determination method of a position of an inoperative foot.

FIG. 37 depicts a position P4 that is a tentative position of the inoperative foot at the latest timing and a position P5 that is a position of the inoperative foot determined by the foot position updating processing at a timing immediately preceding the latest timing.

Here, for the inoperative foot, a position P6 that is a position on a line segment L2 interconnecting the position P4 and the position P5 and is spaced away from the position P5 by a distance obtained by multiplying a distance d2 between the position P4 and the position P5 by the second coefficient m2 is determined as a position of the inoperative foot at the latest timing.

In the present embodiment, the positions of the left foot and the right foot are updated to the positions determined in such a manner as described above.

It is to be noted that the position of the operative foot indicated in the description of the operative foot specification processing corresponds to the position P3 described above, and the tentative position of the operative foot corresponds to the position P1. In particular, in a case where the specified speed is equal to or lower than a predetermined threshold value and the distance between the position P1 and the position P3 at the immediately preceding timing is equal to or smaller than a predetermined distance (for example, 1 cm), one of the operative foot and the inoperative foot is changed to the other and the other is changed to the one.

Positions and directions of the left foot and the right foot are determined by the processing indicated by (1) to (5) described hereinabove.

As described hereinabove, the position and the direction of the left foot determined in this manner may be used in place of the position and the direction of the tracker 12d. For example, the position and the direction of the left foot determined in this manner may be used as the position and the direction of the left foot node 42d. Furthermore, the position and the direction of the right foot determined in this manner may be used in place of the position and the direction of the tracker 12e. For example, the position and the direction of the left foot determined in this manner may be used as the position and the direction of the right foot node 42e.

Further, in the present embodiment, whether or not region data is to be input to the input layer 44 may be controlled according to a magnitude of a change of the position of the head (for example, with a magnitude of a speed specified by the operative foot specification processing). For example, in a case where the specified magnitude of the speed is smaller than a predetermined magnitude, region data may be inhibited from being input to the input layer 44. Furthermore, in this case, a new position of the foot may be determined on the basis of an immediately preceding estimation result used already for determination of the position of the foot.

For example, in determination of the position P3 at the latest timing, the position P1 having been used at the immediately preceding timing may be used. Further, for example, in determination of the position P6 at the latest timing, the position P4 having been used at the immediately preceding timing may be used.

The learning processing of a machine learning model used in the tentative horizontal position estimation processing is executed, for example, by a learning apparatus that includes functions similar to those of the learning data storage section 60, the learning data acquisition section 62, the input data generation section 64, the input section 66, the feature extraction section 68, the feature data holding section 70, the estimation section 72, the output acquisition section 74, and the learning section 76 depicted in FIG. 8.

Here, for example, the learning data storage section 60 may store a plurality of learning data each including t pieces of region data, each of which indicates a height of the head, a direction of the head offset by rotation of the chest node 42f, a position of the head with reference to the position of the left hand offset by rotation of the chest (chest node 42f) and a position of the head with reference to the position of the right hand offset by rotation of the chest, and teacher data. The teacher data may be, for example, data that indicates a tentative horizontal position of the left foot with reference to the position of the head offset by rotation of the chest and a tentative horizontal position of the right foot with reference to the position of the head offset by rotation of the chest.

Then, the learning data acquisition section 62, the input data generation section 64, the input section 66, the feature extraction section 68, the feature data holding section 70, the estimation section 72, the output acquisition section 74, and the learning section 76 may execute processing similar to the processing described hereinabove, on the basis of the learning data described above such that learning of at least one of the feature extraction section 68 and the estimation section 72 is executed.

Here, for example, the input data generation section 64 generates input data including region data, which indicates a height of the head of the user, a direction of the head of the user, a position of the head of the user with reference to the position of the right hand of the user and a position of the head of the user with reference to the position of the right hand of the user, and feature data indicating a feature of a time series transition of the region data.

Furthermore, for example, the feature extraction section 68 outputs feature data indicating a feature of a time series transition of region data occurred until the latest timing, in response to input of input data including region data at the latest timing and feature data indicating a feature of a time series transition of the region data.

Furthermore, for example, the estimation section 72 estimates a position of the left foot of the user with reference to the position of the head of the user and a position of the right foot of the user with reference to the position of the head of the user at the latest timing, the positions of the left foot and the right foot of the user being obtained on the basis of the feature data indicating a feature of a time series transition of region data occurred until the latest timing.

Furthermore, for example, the learning section 76 learns at least one of the feature extraction section 68 and the estimation section 72 on the basis of results of estimation of the position of the right foot of the user with reference to the position of the head of the user and the position of the left foot of the user with reference to the position of the head of the user at the latest timing on the basis of feature data indicating a feature of a time series transition of region data occurred until the latest timing, by the estimation section 72.

Figure 38:
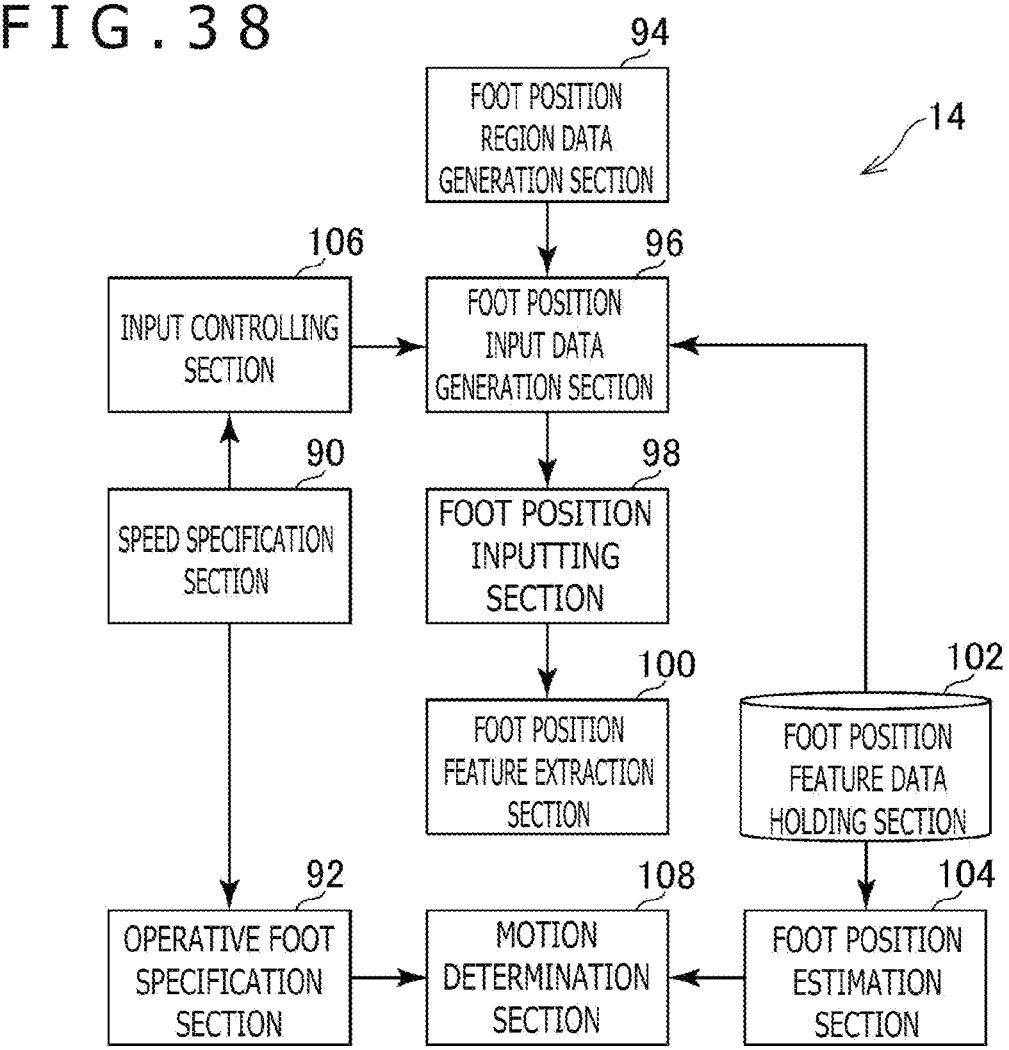
FIG. 38 is a functional block diagram depicting an example of functions to be added to the functions depicted in FIG. 38.

On the other hand, the processing indicated by (1) to (5) described hereinabove may be executed, for example, by an additional function group depicted in FIG. 38. The additional function group depicted in FIG. 38 is added, for example, to the entertainment apparatus 14 including the function group depicted in FIG. 9. It is noted that all of the functions depicted in FIG. 38 need not be incorporated in the entertainment apparatus 14 according to the present embodiment, and a function other than the functions depicted in FIG. 38 may be incorporated in the entertainment apparatus 14.

As depicted in FIG. 38, the function group that executes the processing indicated in (1) to (5) described hereinabove includes, for example, a speed specification section 90, an operative foot specification section 92, a foot position region data generation section 94, a foot position input data generation section 96, a foot position input section 98, a foot position feature extraction section 100, a foot position feature data holding section 102, a foot position estimation section 104, an input controlling section 106, and a motion determination section 108.

The speed specification section 90, the operative foot specification section 92, the foot position region data generation section 94, the foot position input data generation section 96, the foot position input section 98, the input controlling section 106, and the motion determination section 108 are implemented mainly in the processor 30. The foot position feature extraction section 100 and the foot position estimation section 104 are implemented mainly in the processor 30 and the storage section 32. The foot position feature data holding section 102 is implemented mainly in the storage section 32.

The speed specification section 90 specifies, in the present embodiment, for example, directions and magnitudes of speeds of regions of the upper body of a user on the basis of sensing data output from the trackers 12 attached to the regions. Here, a magnitude and a direction of the speed of the head of a user is specified, for example, on the basis of posture data acquired by the posture data acquisition section 80 and indicating a position and a direction of the tracker 12a attached to the head.

The operative foot specification section 92 specifies one of the left foot and the right foot of the user as the operative foot and specifies the other as the inoperative foot, for example, on the basis of a direction of the speed specified by the speed specification section 90.

The operative foot specification section 92 may hold, for example, an operative foot flag indicating whether or not the operative foot is the left foot. Then, in a case where the left foot is the operative foot, the value of the operative foot flag may be set to 1, but in a case where the right foot is the operative foot, the value of the operative foot flag may be set to 0.

Here, the operative foot specification section 92 may specify the left foot of the user as the operative foot in a case where the specified direction of the speed is the left foot direction of the user as described hereinabove. In this case, the value of the operative foot flag is set to 1. On the other hand, in a case where the specified direction of the speed is the right foot direction of the user as described hereinabove, the right foot of the user may be specified as the operative foot. In this case, the value of the operative foot flag is set to 0.

On the other hand, in a case where the specified speed exceeds a predetermined threshold value as described hereinabove and the specified direction of the speed is the left foot direction of the user, the left foot of the user may be specified as the operative foot. Meanwhile, in a case where the specified speed exceeds the predetermined threshold value and the specified direction of the speed is the right foot direction of the user, the right foot of the user may be specified as the operative foot.

Then, in a case where the specified speed is equal to or lower than the predetermined threshold value and the distance between the position of a foot estimated just before and the position of the foot determined just before on the basis of the relevant position is equal to or smaller than a predetermined distance, one of the operative foot and the inoperative foot may be changed to the other while the other is changed to the one. In this case, for example, in a case where the value of the operative foot flag is 1, the value is changed to 0, but in a case where the value is 0, the value is changed to 1.

The foot position region data generation section 94 generates, for example, region data indicating a height of the head of the user, a direction of the head of the user, a position of the head of the user with reference to the position of the left hand of the user, and a position of the head of the user with reference to the position of the right hand of the user. For example, the region data is generated on the basis of posture data acquired by the posture data acquisition section 80.

The foot position input data generation section 96 generates, in the present embodiment, input data including, for example, region data at the latest timing and feature data indicating a feature of a time series transition of the region data.

The foot position input section 98 inputs, in the present embodiment, for example, input data generated by the foot position input data generation section 96 to the foot position feature extraction section 100.

The foot position feature extraction section 100 outputs, in the present embodiment, for example, feature data indicating a feature of a time series transition of region data occurred until the latest timing, in response to input of input data that includes region data at the latest timing and feature data indicating a feature of a time series transition of the region data.

The foot position feature data holding section 102 holds, in the present embodiment, for example, feature data output from the foot position feature extraction section 100. In the present embodiment, feature data held in the foot position feature data holding section 102 is used as feature data to be included in the input data for next estimation.

The foot position estimation section 104 estimates, in the present embodiment, for example, a tentative position of the left foot of the user and a tentative position of the right foot of the user.

Here, the foot position estimation section 104 may estimate a tentative horizontal position of the left foot of the user with reference to the position of the head of the user and a tentative horizontal position of the right foot of the user with reference to the position of the head of the user at the latest timing, the positions of the left foot and the right foot of the user being obtained on the basis of feature data indicating a feature of a time series transition occurred until the timing.

Alternatively, the foot position estimation section 104 may estimate a tentative height of a foot on the basis of the magnitude of the speed of the foot at the immediately preceding timing. Here, the tentative height of the foot may be estimated such that it increases as the magnitude of the speed of the foot at the immediately preceding timing increases.

The input controlling section 106 controls, in the present embodiment, for example, whether or not input data is to be input to the foot position feature extraction section 100 according to the magnitude of the speed specified by the speed specification section 90. For example, in a case where the magnitude of the speed specified by the speed specification section 90 is smaller than a predetermined magnitude, the input controlling section 106 performs control such that input data is not input to the foot position feature extraction section 100. Here, in a case where the magnitude of the speed specified by the speed specification section 90 is smaller than the predetermined magnitude, the input controlling section 106 may perform control such that generation of input data by the foot position input data generation section 96 is not performed.

The motion determination section 108 determines, in the present embodiment, for example, for each of the left foot and the right foot, a motion of the foot on the basis of whether the foot is the operative foot or the inoperative foot. Here, the motion determination section 108 may determine the motions of the left foot and the right foot such that the movement of the operative foot is greater than the movement of the inoperative foot.

Further, for example, for each of the left foot and the right foot, the position of the foot may be updated by determining the position of the foot at the latest timing on the basis of a tentative position of the foot estimated by the foot position estimation section 104 at the latest timing and a coefficient associated with the foot. It is noted that the operative foot and the inoperative foot are individually associated with coefficients different from each other as described hereinabove.

Alternatively, the motion determination section 108 may determine a position obtained by interpolating a tentative position of a foot estimated by the foot position estimation section 104 at the latest timing and a position of the foot determined by the motion determination section 108 at a timing immediately preceding the latest timing as the position of the foot at the latest timing as described hereinabove.

For example, as depicted in FIG. 36, the position P3 that is spaced away from the position P2 of the operative foot determined at the immediately preceding time by a distance obtained by multiplying the distance d1 between the position P1 that is a tentative position of the operative foot estimated at the latest timing and the position P2 that is a position of the operative foot determined at the immediately preceding timing is multiplied by the first coefficient m1 may be determined as the position of the operative foot at the latest timing.

On the other hand, as depicted in FIG. 37, the position P6 spaced away from the position P5 of the inoperative foot determined at the immediately preceding timing by a distance obtained by multiplying the distance d2 between the position P4 that is a tentative position of the inoperative foot estimated at the latest timing and the position P5 that is a position of the inoperative foot determined at the immediately preceding timing by the second coefficient m2 may be determined as the position of the inoperative foot at the latest timing.

Here, the first coefficient m1 is greater than the second coefficient m2 as described hereinabove.

Here, when the input controlling section 106 performs control such that input data is not input to the foot position feature extraction section 100, the motion determination section 108 may determine a position of a foot at the latest timing on the basis of an immediately preceding estimation result by the foot position estimation section 104 having already been used for determination of the position of the foot.

For example, the position P3 spaced away from the position P2 of the operative foot determined at the immediately preceding timing by a distance obtained by multiplying the distance d1 between the position P1 of the operative foot estimated at the immediately preceding timing and the position P2 of the operative foot determined at the immediately preceding timing by the first coefficient m1 may be determined as the position of the operative foot at the latest timing.

Further, the position P6 spaced away from the position P5 of the operative foot determined at the immediately preceding timing by a distance obtained by multiplying the distance d2 between the position P4 of the inoperative foot estimated at the immediately preceding timing and the position P5 of the inoperative foot determined at the immediately preceding timing by the second coefficient m2 may be determined as the position of the inoperative foot at the latest timing.

Furthermore, the motion determination section 108 determines, in the present example, for example, a direction of a foot of the user. At this time, the motion determination section 108 may determine rotation of a foot around a horizontal axis which serves as a reference, on the basis of the distance from a line that extends in the vertical direction and serves as a reference to the position of the foot as described hereinabove.

The (1) operative foot specification processing described hereinabove corresponds to the processing executed by the speed specification section 90 and the operative foot specification section 92.

Meanwhile, the (2) foot posture determination processing corresponds to the processing executed by the motion determination section 108.

Furthermore, the (3) tentative horizontal position estimation processing corresponds to the processing executed by the foot position region data generation section 94, the foot position input data generation section 96, the foot position input section 98, the foot position feature extraction section 100, the foot position feature data holding section 102, the foot position estimation section 104, and the input controlling section 106.

Furthermore, the (4) tentative height estimation processing corresponds to the processing executed by the foot position estimation section 104.

Furthermore, the (5) foot position updating processing corresponds to the processing executed by the foot position estimation section 104 and the motion determination section 108.

Figure 39:
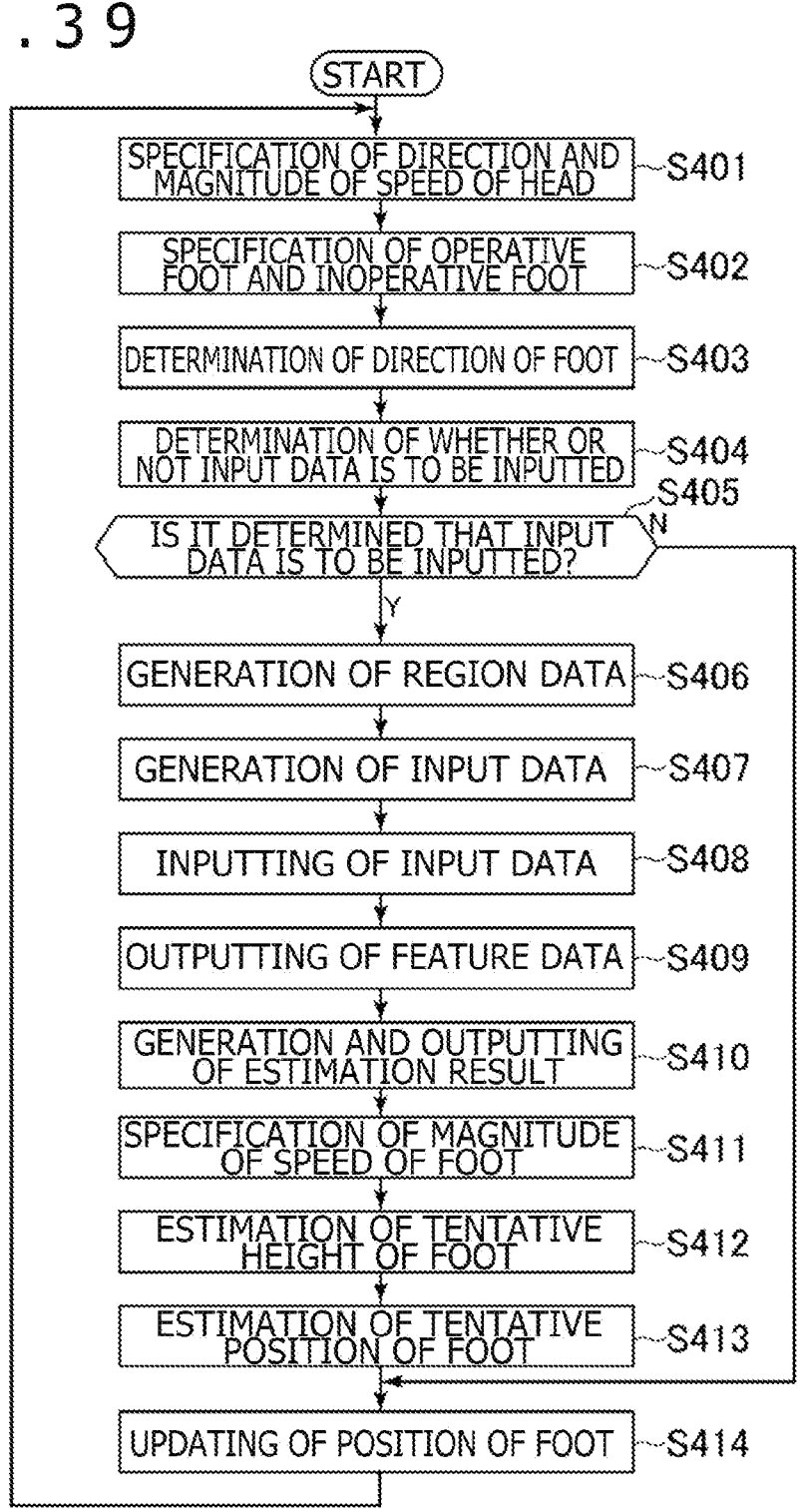
FIG. 39 is a flowchart depicting an example of a flow of processing performed by an entertainment apparatus according to the embodiment of the present invention.

Here, an example of a flow of updating processing of the positions of the left foot and the right foot performed by the entertainment apparatus 14 according to the present embodiment is described with reference to a flow chart exemplified in FIG. 39.

First, the speed specification section 90 specifies a direction and a magnitude of the speed of the head of the user on the basis of posture data in the present cycle (S401).

Then, the operative foot specification section 92 specifies an operative foot and an inoperative foot on the basis of the direction and the magnitude of the speed specified by the processing indicated in S401 (S402). In a case where the operative foot is to be changed by the processing indicated in S402, the value of the operative foot flag held in the operative foot specification section 92 is changed.

Then, the motion determination section 108 determines a direction of the left foot and a direction of the right foot (S403).

Then, the input controlling section 106 determines, on the basis of the magnitude of the speed specified by the processing indicated in S401, whether or not input data is to be input to the foot position feature extraction section 100 (S404).

In a case where it is determined by the processing indicated in S404 that input data is to be input (S405: Y), the foot position region data generation section 94 generates region data on the basis of the posture data in the present cycle (S406).

Then, the foot position input data generation section 96 generates input data on the basis of the region data generated by the processing indicated in S406 and feature data held in the foot position feature data holding section 102 (S407).

Then, the foot position input section 98 inputs the input data generated by the processing indicated in S407 to the foot position feature extraction section 100 (S408).

Then, the foot position feature extraction section 100 outputs feature data according to the input in the processing indicated in S408 to the foot position feature data holding section 102 (S409).

Then, the foot position estimation section 104 generates an estimation result according to the feature data that are feature data having been output to the foot position feature data holding section 102 by the processing indicated in S409 and are held in the foot position feature data holding section 102 and output last from the foot position feature extraction section 100, and outputs the estimation result (S410). Here, for example, the left foot tentative horizontal position data D63 and the right foot tentative horizontal position data D64 are output.

Then, the foot position estimation section 104 specifies, for each of the right foot and the left foot, a magnitude of the speed of the foot on the basis of positions of the foot determined in the two immediately preceding cycles (S411).

Then, the foot position estimation section 104 estimates a tentative height of the left foot and a tentative height of the right foot on the basis of the magnitude of the speed of the foot specified by the processing indicated in S411 (S412).

Then, the foot position estimation section 104 estimates a tentative position of the left foot and a tentative position of the right foot on the basis of the estimation result output by the processing in S410 and the tentative height of the left foot and the tentative height of the right foot estimated by the processing indicated in S412 (S413).

Then, the motion determination section 108 updates the position of the foot to a position determined on the basis of the position of the foot determined in the immediately preceding cycle and the tentative position of the foot estimated by the processing indicated in S412 in the present cycle (S414), and returns to the processing indicated in S401.

Also in a case where it is determined by the processing indicated in S404 that input data is not to be input (S405: N), the processing indicated in S414 is executed. In this case, the position of the foot is updated to a position determined on the basis of the position of the foot determined in the immediately preceding cycle and the tentative position of the foot estimated in the immediately preceding cycle. Then, the entertainment apparatus returns to the processing indicated in S401.

In the processing indicated by the processing example described above, the execution order of the steps is not limited to that described above.

Further, also in a case in which it is determined by the processing indicated in S404 that input data is not to be input (S405: N), the processing indicated in S411 to S413 may be executed. In this case, in the processing indicated in S413, a tentative position of the foot may be estimated on the basis of the tentative estimation direction position of the foot estimated in the immediately preceding cycle and the tentative height of the foot estimated in the relevant cycle.

As described above, in the present embodiment, the processing indicated in S401 to S414 is executed, for example, using the acquisition (S201) of posture data indicating positions and directions of the trackers 12a to 12c at the latest specific timing generated by the trackers 12 as a trigger. Then, the generation processing of region data indicated in S202 may be executed on the basis of the latest positions of the feet updated by the processing indicated in S413, and thereafter, the body tracking by the processes indicated in S203 to S210 may be executed.

It is noted that the motion determination section 108 may determine motions of the operative foot and the inoperative foot by a method other than the method described above. For example, motion data corresponding to the operative foot and motion data corresponding to the inoperative foot may be stored in advance. Then, for example, the motion determination section 108 may reproduce, for the operative foot, the motion data corresponding to the operative foot and reproduce, for the inoperative foot, the motion data corresponding to the inoperative foot.

Furthermore, although, in the example described above, motions of the left foot and the right foot are determined on the basis of the speed of the tracker 12a attached to the head, motions of the left foot and the right foot may be determined otherwise on the basis of the speed of a tracker attached to a different region of the upper body.

In the present embodiment, on the basis of a direction of the speed of the upper body of the user, one of the left foot and the right foot of the user is specified as the operative foot and the other is specified as the inoperative foot. Then, for each of the left foot and the right foot, a motion of the foot is determined on the basis of whether the foot is the operative foot or the inoperative foot. In this manner, according to the present embodiment, motions of the whole body of the user can be represented precisely while the user does not attach trackers to the feet.

<Modifications>

It is noted that the present invention is not limited to the embodiment described above.

For example, the feature extraction section 68, the estimation section 72, the foot position feature extraction section 100, and the foot position estimation section 104 need not be implemented by a machine learning model but may be implemented, for example, by general software or by hardware such as a circuit.

Furthermore, for example, the tracker 12a may be a head-mounted display (HMD). In this case, the HMD may be configured such that an image according to a result of various kinds of processing such as game processing according to positions or directions of a plurality of regions included in the user is displayed, for example, on a display section of the HMD.

Furthermore, for example, part or all of the functions depicted in FIG. 9 or FIG. 38 may be implemented by the trackers 12.

Furthermore, particular character strings and numerical values given hereinabove and particular character strings and numerical values given in the drawings are exemplary, and those character strings and numerical values are not restrictive.

The invention claimed is:

1. A motion determination apparatus comprising:
a speed specification section that specifies, on a basis of sensing data output from a tracker attached to region of an upper body of a user, a direction of a speed of the region;
an operative foot specification section that specifies, on a basis of the specified direction of the speed of the head, one of a left foot and a right foot of the user as an operative foot and specifies the other as an inoperative foot;
a motion determination section that determines, for each of the left foot and the right foot, a motion of the foot on a basis of whether the foot is the operative foot or the inoperative foot;
an input data generation section that generates input data that includes region data indicating a height of a head of the user, a direction of the head of the user, a position of the head of the user with reference to a position of a left hand of the user, and a position of the head of the user with reference to a position of a right hand of the user and feature data indicating a feature of a time series transition of the region data;
a feature extraction section that outputs new feature data in response to input of the input data; and
an estimation section that estimates, on a basis of the feature data, a position of the left foot of the user with reference to the position of the head of the user and a position of the right foot of the user with reference to the position of the head of the user, wherein
the feature extraction section outputs, in response to input of the input data that includes the region data at a latest timing and the feature data indicating the feature of the time series transition of the region data, the feature data indicating the feature of the time series transition, of the region data, occurred until the latest timing,
the estimation section estimates, on a basis of the feature data indicating the feature of the time series transition, of the region data, occurred until the latest timing, a position of the left foot of the user with reference to the position of the head of the user and a position of the right foot of the user with reference to the position of the head of the user at the latest timing,
the operative foot and the inoperative foot are individually associated with coefficients different from each other, and the
motion determination section determines, for each of the left foot and the right foot, a position of the foot at the latest timing on a basis of the position of the foot estimated by the estimation section at the latest timing and the coefficient associated with the foot.

2. The motion determination apparatus according to claim 1, wherein the motion determination section determines a position obtained by interpolating the position of the foot estimated by the estimation section at the latest timing and the position of the foot determined by the motion determination section at a timing immediately preceding the latest timing as the position of the foot at the latest timing.

3. The motion determination apparatus according to claim 2, wherein the motion determination section determines a position spaced away from the position of the operative foot determined at the immediately preceding timing by a distance obtained by multiplying a distance between the position of the operative foot estimated at the latest timing and the position of the operative foot determined at the immediately preceding timing by a first coefficient as the position of the operative foot,
the motion determination section determines a position spaced away from the position of the inoperative foot determined at the immediately preceding timing by a distance obtained by multiplying a distance between the position of the inoperative foot estimated at the latest timing and the position of the inoperative foot determined at the immediately preceding timing by a second coefficient as the position of the inoperative foot, and
the first coefficient is greater than the second coefficient.

4. The motion determination apparatus according to claim 1, wherein
the estimation section estimates, on a basis of the feature data indicating a feature of the time series transition occurred until the latest timing, a position on a horizontal plane of the left foot of the user with reference to the position of the head of the user and a position on the horizontal plane of the right foot of the user with reference to the position of the head of the user at the latest timing, and
the estimation section estimates a position of the foot in a heightwise direction on a basis of a magnitude of the speed of the foot at a timing immediately preceding the latest timing.

5. The motion determination apparatus according to claim 1, wherein,
in a case where a specified magnitude of the speed exceeds a predetermined threshold value and a specified direction of the speed is a left foot direction of the user, the left foot of the user is specified as the operative foot,
in a case where the specified magnitude of the speed exceeds the threshold value and the specified direction of the speed is a right foot direction of the user, the right foot of the user is specified as the operative foot, and,
in a case where the specified magnitude of the speed is equal to or smaller than the threshold value and a distance between the position of the foot estimated immediately before by the estimation section and a position of the foot determined immediately before by the motion determination section on a basis of the position is equal to or smaller than a predetermined distance, one of the operative foot and the inoperative foot is changed to the other, and the other is changed to the one.

6. The motion determination apparatus according to claim 1, further comprising:
an input controlling section that controls whether or not the input data is to be input to the feature extraction section, in response to a specified magnitude of the speed, wherein,
when control is performed such that the input data is not input to the feature extraction section, the motion determination section determines the position of the foot at the latest timing on a basis of an estimation result obtained immediately before by the estimation section having been used already for determination of the position of the foot.

7. The motion determination apparatus according to claim 1, wherein the motion determination section determines rotation of the foot around a horizontal axis that serves as a reference, on a basis of a distance from a line that extends in a vertical direction and serves as a reference to the position of the foot.

8. A learning apparatus comprising: an input data generation section that generates input data that includes region data that indicates a height of a head of a user, a direction of the head of the user, a position of the head of the user with reference to a position of a left hand of the user, and a position of the head of the user with reference to a position of a right hand of the user and feature data indicating a feature of a time series transition of the region data; a feature extraction section that outputs new feature data in response to input of the input data;
an estimation section that estimates, on a basis of the feature data, a position of a left foot of the user with reference to the position of the head of the user and a position of a right foot of the user with reference to the position of the head of the user; and
a learning section that learns at least one of the feature extraction section and the estimation section on a basis of a result of the estimation, wherein
the feature extraction section outputs, in response to input of the input data including the region data at a latest timing and the feature data indicating the feature of the time series transition, of the region data, the feature data indicating the feature of the time series transition, of the region data, occurred until the latest timing, and
the learning section executes the learning on a basis of results of estimation, by the estimation section, of the position of the left foot of the user with reference to the position of the head of the user and the position of the right foot of the user with reference to the position of the head of the user at the latest timing, the positions of the left foot and the right foot of the user being obtained on a basis of the feature data indicating the feature of the time series transition, of the region data, occurred until the latest timing.

9. A learning method comprising:
generating input data that includes region data that indicates a height of a head of a user, a direction of the head of the user, a position of the head of the user with reference to a position of a left hand of the user, and a position of the head of the user with reference to a position of a right hand of the user and feature data indicating a feature of a time series transition of the region data;
outputting the new feature data in response to input of the input data;
estimating, on a basis of the feature data, a position of a left foot of the user with reference to the position of the head of the user and a position of a right foot of the user with reference to the position of the head of the user; and
learning at least one of the feature extraction section and the estimation section on a basis of a result of the estimation, wherein
the outputting includes outputting, by the feature extraction section, in response to input of the input data including the region data at a latest timing and the feature data indicating the feature of the time series transition of the region data, the feature data indicating the feature of the time series transition, of the region data, occurred until the latest timing, and
the learning includes executing the learning on a basis of results of estimation, by the estimation section, of the position of the left foot of the user with reference to the position of the head of the user and the position of the right foot of the user with reference to the position of the head of the user at the latest timing, the positions of the left foot and the right foot of the user being obtained on a basis of the feature data indicating the feature of the time series transition, of the region data, occurred until the latest timing.

10. A non-transitory, computer readable storage medium containing a program, which when executed by a computer, causes the computer to perform a learning method by carrying out actions, comprising:
generating input data that includes region data that indicates a height of a head of a user, a direction of the head of the user, a position of the head of the user with reference to a position of a left hand of the user, and a position of the head of the user with reference to a position of a right hand of the user and feature data indicating a feature of a time series transition of the region data;
outputting the new feature data in response to input of the input data;
estimating, on a basis of the feature data, a position of a left foot of the user with reference to the position of the head of the user and a position of a right foot of the user with reference to the position of the head of the user; and
learning at least one of the feature extraction section and the estimation section on a basis of a result of the estimation, wherein
the outputting includes outputting, by the feature extraction section, in response to input of the input data including the region data at a latest timing and the feature data indicating the feature of the time series transition of the region data, the feature data indicating the feature of the time series transition, of the region data, occurred until the latest timing, and
the learning includes executing the learning on a basis of results of estimation, by the estimation section, of the position of the left foot of the user with reference to the position of the head of the user and the position of the right foot of the user with reference to the position of the head of the user at the latest timing, the positions of the left foot and the right foot of the user being obtained on a basis of the feature data indicating the feature of the time series transition, of the region data, occurred until the latest timing.

* * * * *